(12) United States Patent
Oh

(10) Patent No.: US 10,501,114 B2
(45) Date of Patent: Dec. 10, 2019

(54) STEERING INPUT APPARATUS AND VEHICLE

(71) Applicant: LG ELECTRONICS INC., Seoul (KR)

(72) Inventor: Hyungseok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 15/339,395

(22) Filed: Oct. 31, 2016

(65) Prior Publication Data

US 2017/0197656 A1 Jul. 13, 2017

(30) Foreign Application Priority Data

Jan. 8, 2016 (KR) .................. 10-2016-0002370

(51) Int. Cl.
*B62D 6/00* (2006.01)
*B62D 15/02* (2006.01)
*B60R 1/00* (2006.01)
*B62D 5/04* (2006.01)
*B62D 5/06* (2006.01)
*B62D 6/04* (2006.01)

(52) U.S. Cl.
CPC .................. *B62D 6/00* (2013.01); *B60R 1/00* (2013.01); *B62D 5/0457* (2013.01); *B62D 5/06* (2013.01); *B62D 6/007* (2013.01); *B62D 6/008* (2013.01); *B62D 6/04* (2013.01); *B62D 15/025* (2013.01); *B62D 15/0255* (2013.01); *B60R 2300/804* (2013.01)

(58) Field of Classification Search
None
See application file for complete search history.

(56) References Cited

U.S. PATENT DOCUMENTS

| 5,709,281 | A  | * | 1/1998 | Sherwin | B62D 5/0466 |
| | | | | | 180/169 |
| 6,959,970 | B2 | * | 11/2005 | Tseng | B60T 8/1708 |
| | | | | | 188/112 R |
| 7,070,247 | B2 | * | 7/2006 | Offerle | B60G 17/016 |
| | | | | | 303/146 |
| 7,165,644 | B2 | * | 1/2007 | Offerle | B60T 8/1755 |
| | | | | | 180/244 |
| 7,229,139 | B2 | * | 6/2007 | Lu | B60T 8/1755 |
| | | | | | 180/204 |
| 7,401,870 | B2 | * | 7/2008 | Tseng | B60G 17/0162 |
| | | | | | 180/6.2 |

(Continued)

FOREIGN PATENT DOCUMENTS

| CN | 1522910 A | 8/2004 |
| CN | 101016058 A | 8/2007 |

(Continued)

*Primary Examiner* — Jean Paul Cass
(74) *Attorney, Agent, or Firm* — Birch, Stewart, Kolasch & Birch, LLP

(57) ABSTRACT

A steering input apparatus includes a steering input apparatus including a power provision unit for providing power to rotation input through a steering wheel, an interface unit for receiving object information indicating an object located in front of or around a vehicle, and a processor for adjusting manipulation sensitivity to the rotation input of the steering wheel by controlling the power provision unit based on the object information.

22 Claims, 47 Drawing Sheets

(56) References Cited

U.S. PATENT DOCUMENTS

| | | | |
|---|---|---|---|
| 7,401,871 B2* | 7/2008 | Lu | B60T 7/20 180/6.24 |
| 7,690,737 B2* | 4/2010 | Lu | B60T 7/12 303/146 |
| 7,950,751 B2* | 5/2011 | Offerle | B60T 8/1708 188/112 R |
| 8,380,416 B2* | 2/2013 | Offerle | B60T 8/1755 303/152 |
| 9,586,591 B1* | 3/2017 | Fields | B60W 40/09 |
| 9,663,047 B2* | 5/2017 | Bande Martinez | G08B 21/06 |
| 2009/0222170 A1* | 9/2009 | Scherl | B62D 15/025 701/44 |
| 2010/0264620 A1* | 10/2010 | Miles | A61G 5/045 280/236 |
| 2011/0118936 A1 | 5/2011 | Hong | |
| 2011/0190972 A1* | 8/2011 | Timmons | G01C 21/34 701/31.4 |
| 2015/0029014 A1* | 1/2015 | Bande Martinez | G08B 21/06 340/439 |
| 2015/0329141 A1 | 11/2015 | Preijert | |
| 2016/0001781 A1* | 1/2016 | Fung | B60W 40/08 701/36 |
| 2016/0020910 A1* | 1/2016 | Jones | H04L 12/10 370/218 |
| 2017/0016740 A1* | 1/2017 | Cui | G01C 21/30 |
| 2017/0113512 A1* | 4/2017 | Park | B60H 1/00849 |
| 2017/0113664 A1* | 4/2017 | Nix | G07C 5/0891 |
| 2017/0277189 A1* | 9/2017 | Johnson | G05D 1/0206 |
| 2018/0022358 A1* | 1/2018 | Fung | B60W 40/08 701/36 |

FOREIGN PATENT DOCUMENTS

| | | |
|---|---|---|
| CN | 101443227 A | 5/2009 |
| CN | 104512451 A | 4/2015 |
| DE | 102006043149 A1 | 3/2008 |
| DE | 102013009082 A1 | 12/2013 |
| EP | 1950115 A2 | 7/2008 |
| EP | 2944544 A1 | 11/2015 |
| JP | 2008-146515 A | 6/2008 |
| JP | 4231423 B2 | 2/2009 |
| KR | 10-2005-0111019 A | 11/2005 |
| KR | 10-0764180 B1 | 10/2007 |
| KR | 10-2015-0057576 A | 5/2015 |

* cited by examiner

200a

200d

200f

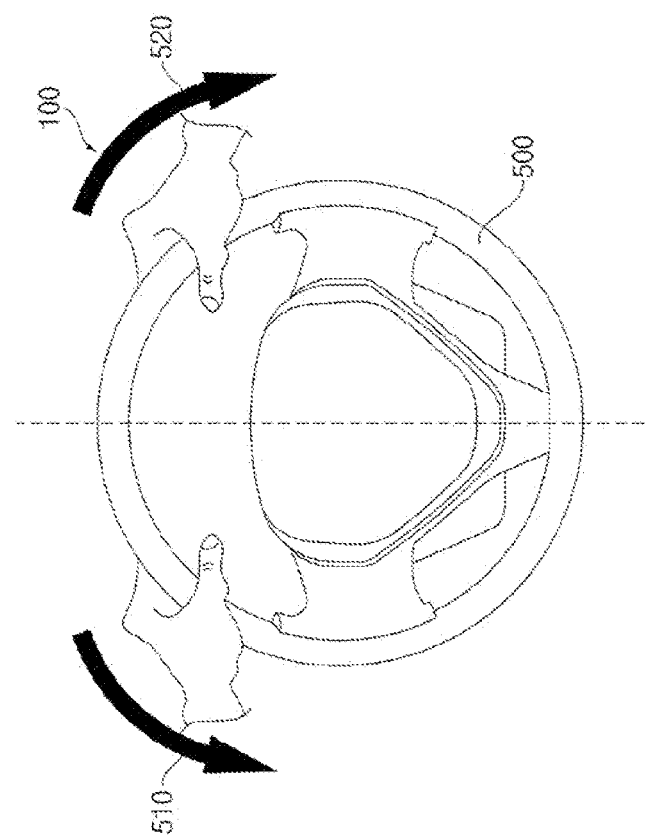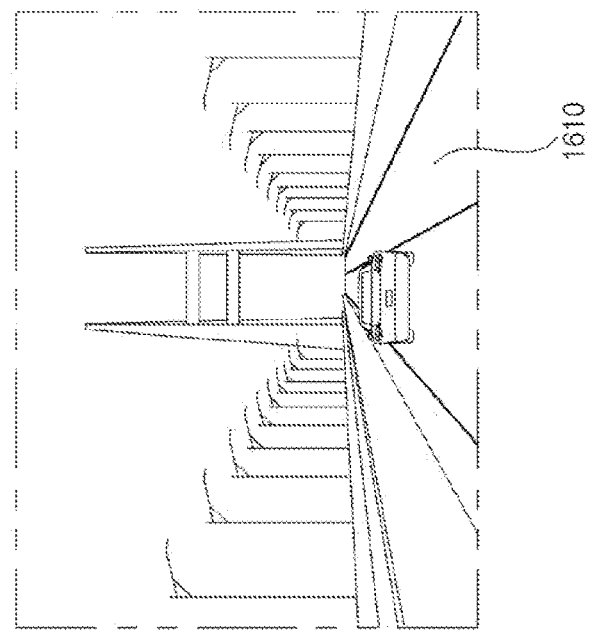
FIG. 16

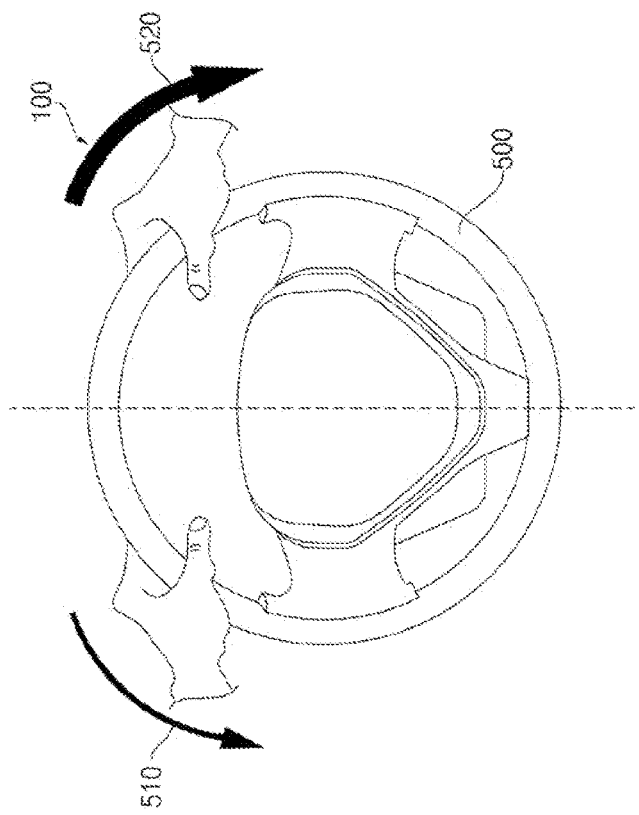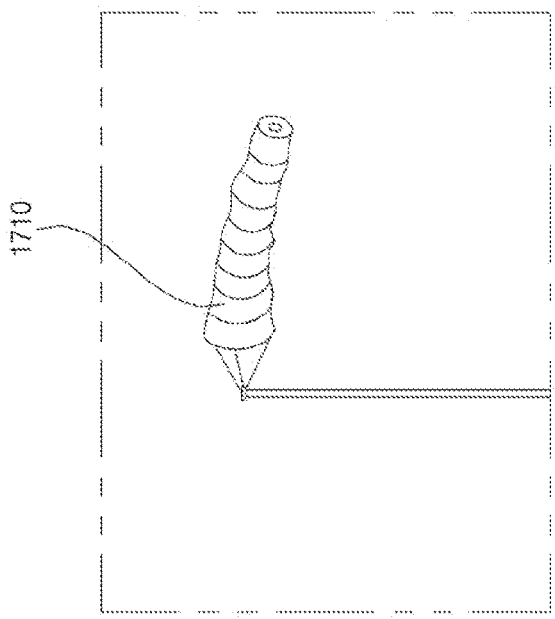
FIG. 17

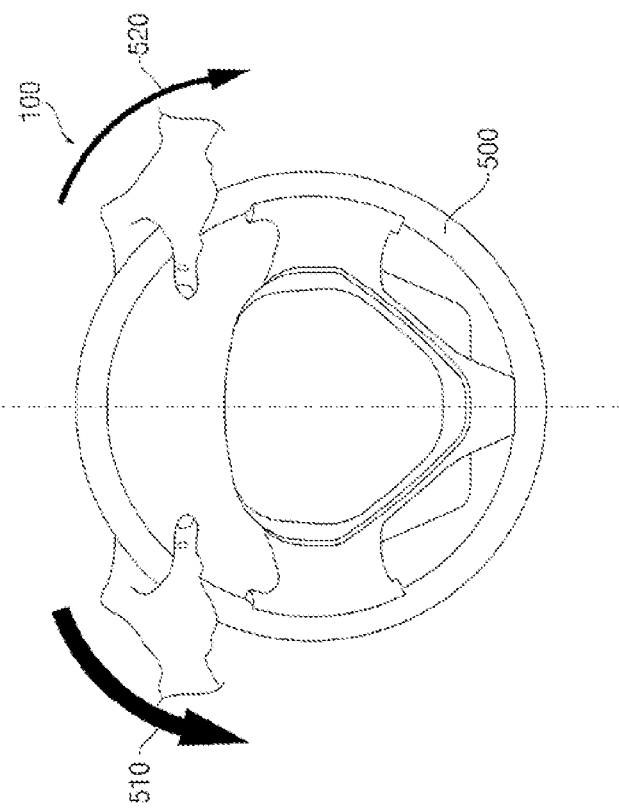
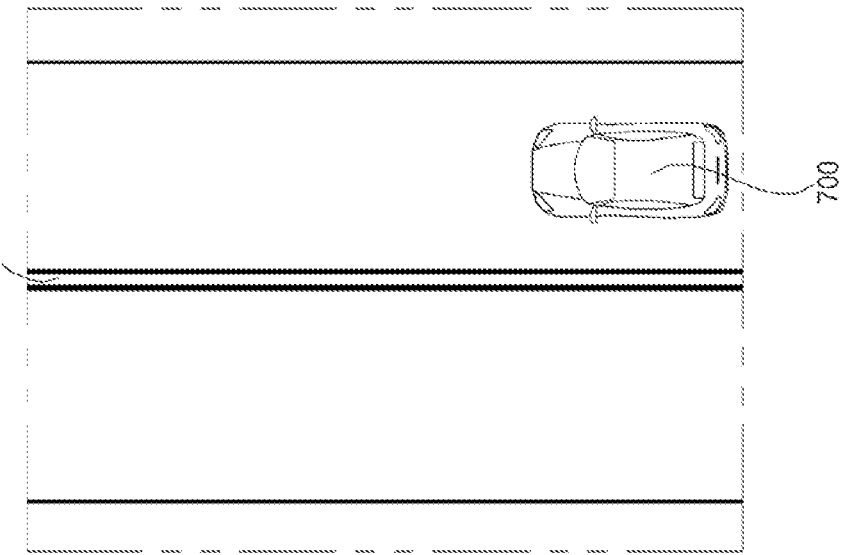
FIG. 18C

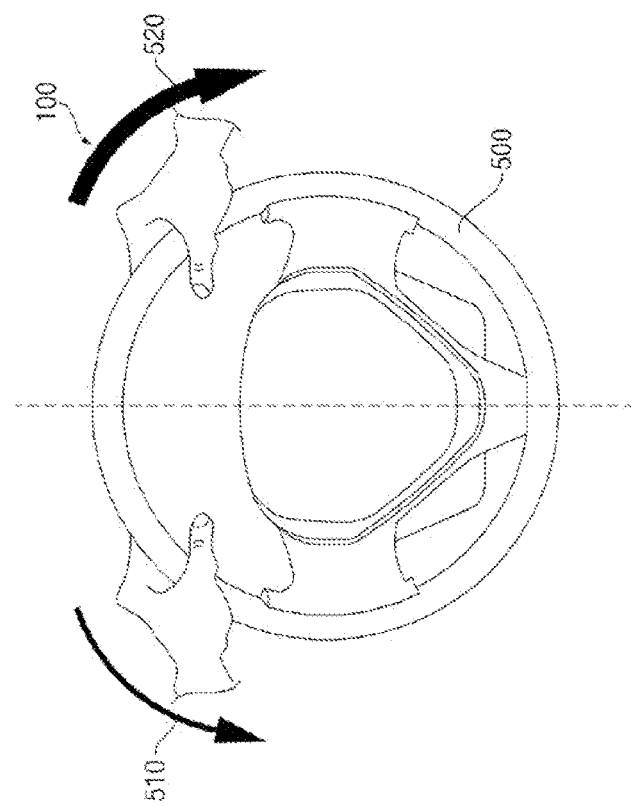
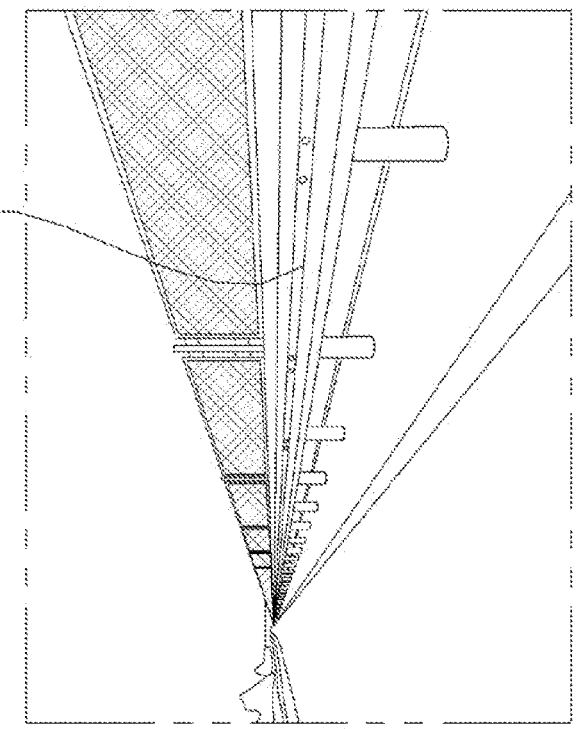
FIG. 18D

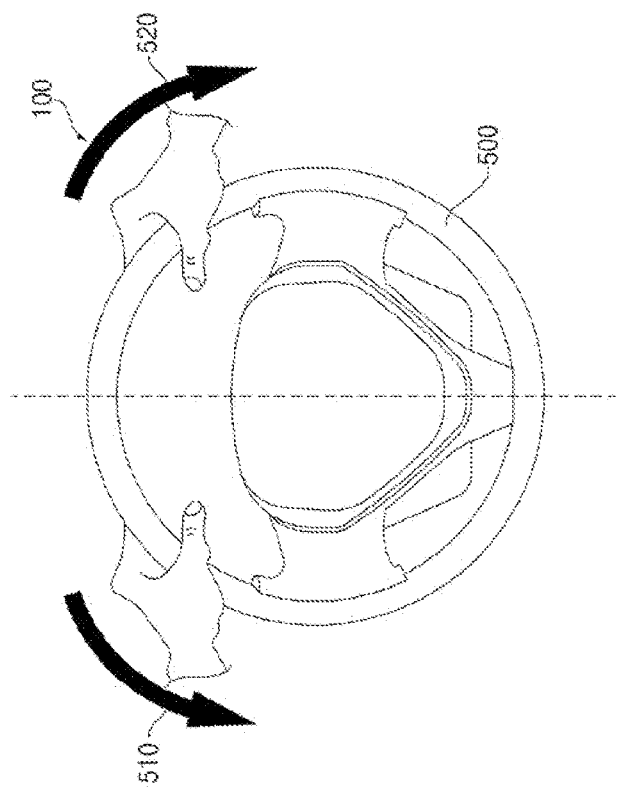
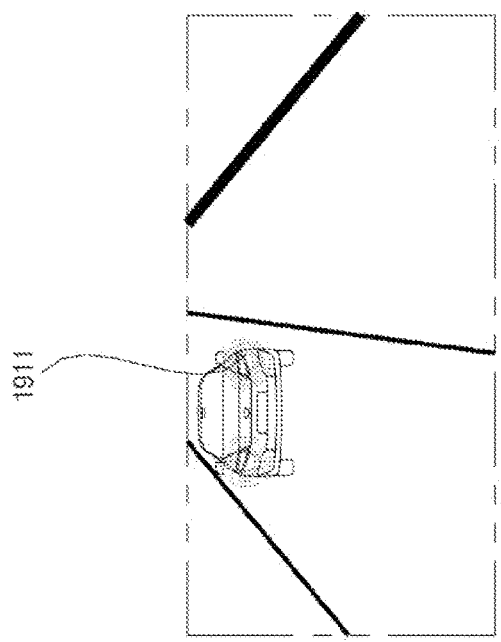
FIG. 19A

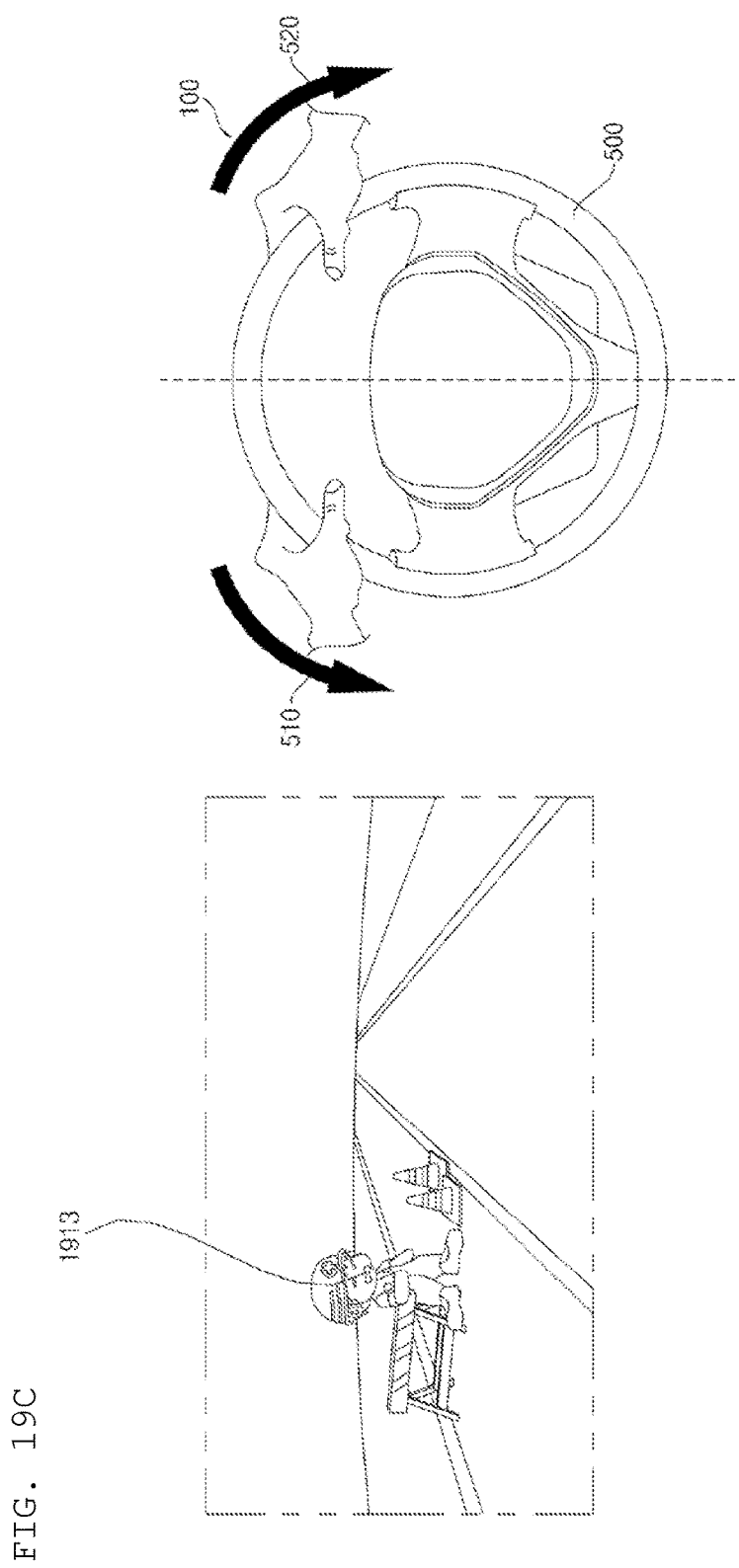

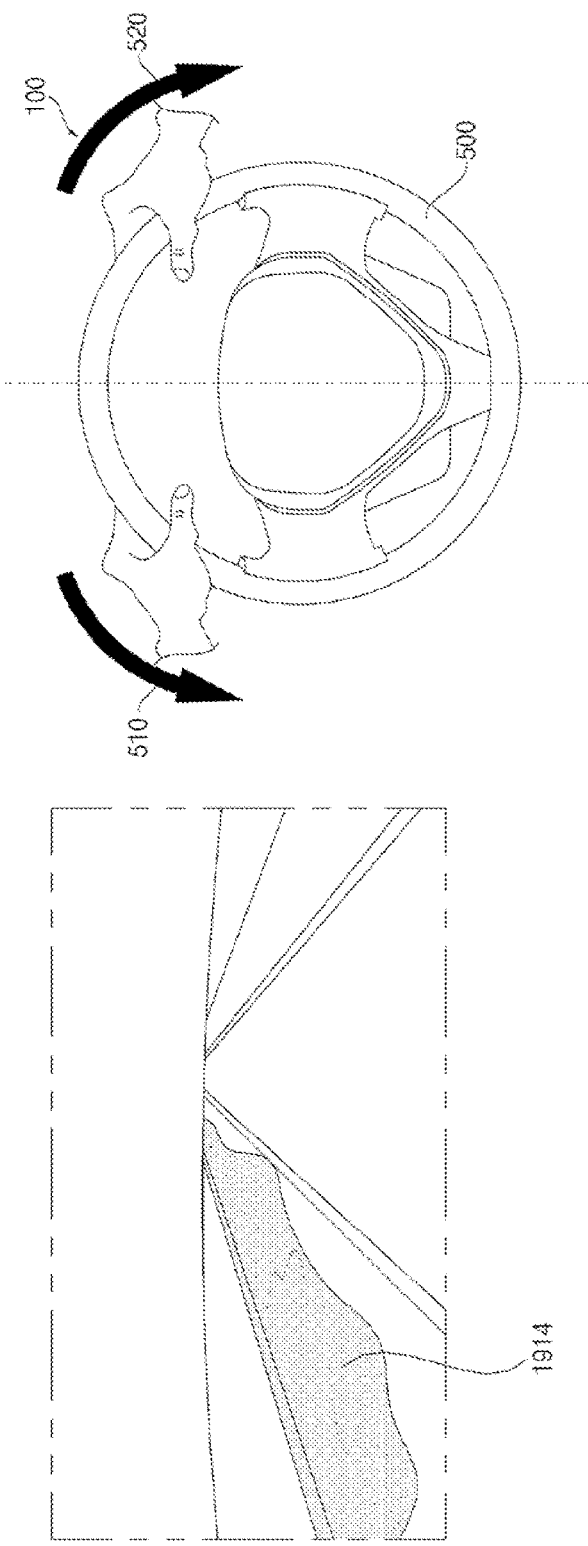

FIG. 26
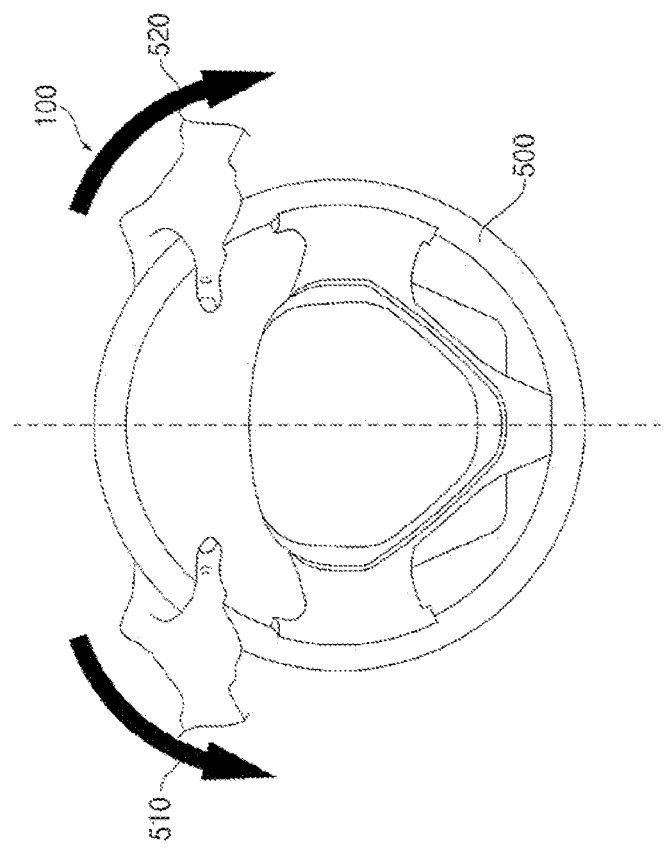
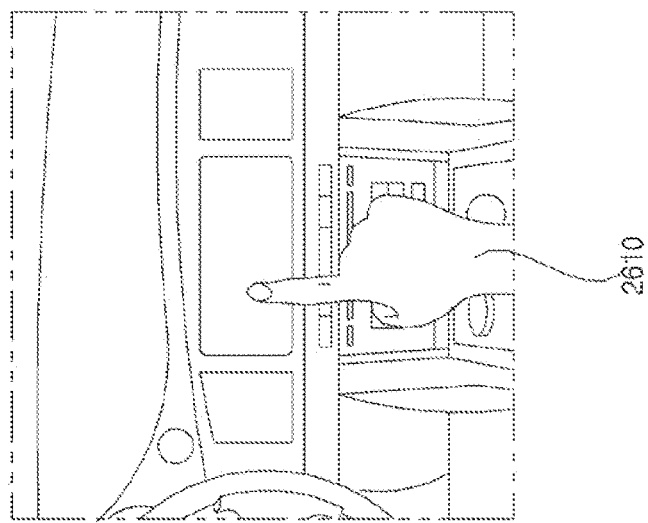

STEERING INPUT APPARATUS AND VEHICLE

CROSS-REFERENCE TO RELATED APPLICATION

Pursuant to 35 U.S.C. § 119(a), this application claims the benefit of an earlier filing date and right of priority to Korean Patent Application No. 10-2016-0002370, filed on Jan. 8, 2016 in the Korean Intellectual Property Office, the disclosure of which is incorporated herein by reference.

BACKGROUND

1. Field of the Invention

The present invention relates to a steering input apparatus and a vehicle.

2. Description of the Related Art

A vehicle is an apparatus that is moved in a desired direction by a user riding therein. A typical example of the vehicle may be an automobile.

Vehicles have been increasingly equipped with various sensors and electronic devices to provide user convenience. In particular, various apparatuses for driver convenience are under development.

A steering input apparatus is included in a vehicle. The driver provides an input for steering the vehicle through the steering input apparatus. A typical example of the steering input apparatus is a steering wheel.

A driver may excessively manipulate the steering wheel in a specific situation, thereby invading a neighboring lane or causing collision with a median barrier, a guardrail, a street tree, or a streetlight.

SUMMARY

Therefore, the present invention has been made in view of the above problems, and it is an object of the present invention to provide a steering input apparatus capable of controlling power provided for turning input through a steering wheel based on the detected object information and adjusting a change of manipulation sensitivity to a rotation input of the steering wheel.

Other objects of the present invention are to provide a vehicle including the steering input apparatus, and a method of steering a vehicle.

Objects of the present invention are not limited to the aforementioned objects, and other objects of the present invention which are not mentioned above will become apparent to those having ordinary skill in the art upon examination of the following description.

In accordance with an aspect of the present invention, the above and other objects can be accomplished by the provision of a steering input apparatus including a power provision unit for providing power to a rotation input through a steering wheel, an interface unit for receiving object information indicating an object located in front of or around a vehicle, and a processor for adjusting a change of manipulation sensitivity to the rotation input of the steering wheel by controlling the power provision unit based on the object information.

Other details of embodiments are included in the following detailed description and accompanying drawings.

BRIEF DESCRIPTION OF THE DRAWINGS

FIGS. 16 and 17 illustrate an operation of adjusting the manipulation sensitivity to a rotation input of the steering wheel based on wind information according to an embodiment of the present invention;

FIGS. 24 to 26 illustrate an operation of adjusting manipulation sensitivity to rotation input of the steering wheel based on driver status information according to an embodiment of the present invention;

DETAILED DESCRIPTION OF THE PREFERRED EMBODIMENTS

Figure 1:
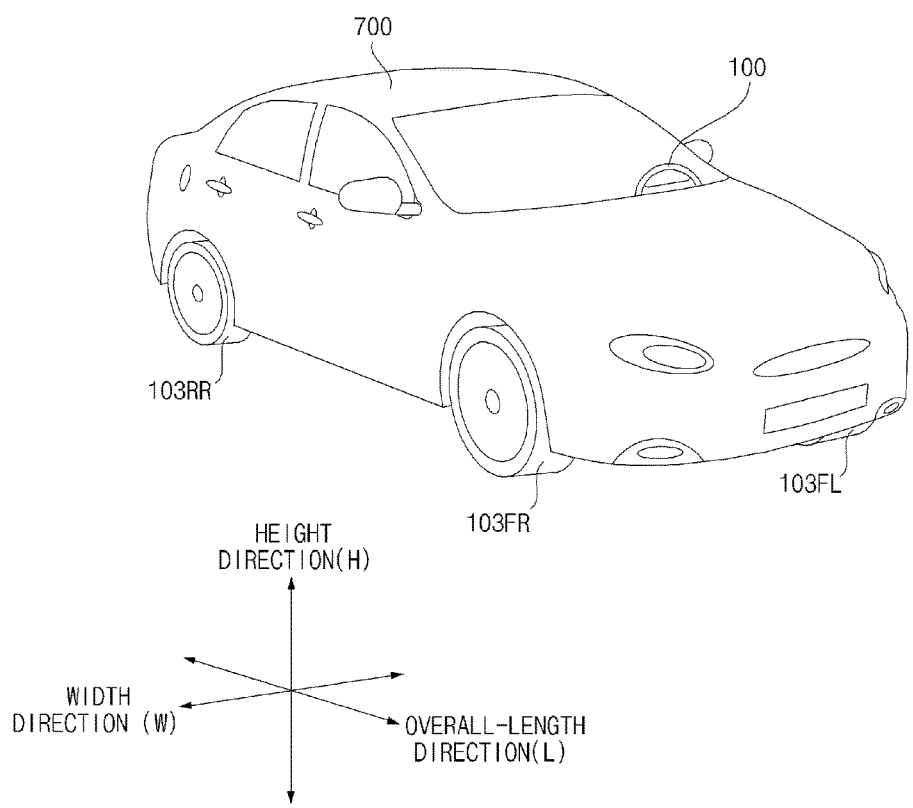
FIG. 1 is a diagram illustrating the exterior of a vehicle according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

Vehicles according to embodiments of the present invention may conceptually include an automobile and a motorcycle. Hereinafter, description will be given mainly focusing on an automobile.

A vehicle according to embodiments of the present invention may conceptually include a vehicle equipped with an internal combustion engine as a power source, a hybrid vehicle equipped with both an engine and an electric motor as a power source, and an electric vehicle equipped with an electric motor as a power source.

The vehicle according to embodiments of the present invention may be an autonomous vehicle.

In the description, the left side of the vehicle refers to the left side with respect to the travel direction of the vehicle and the right side of the vehicle refers to the right side with respect to the travel direction of the vehicle.

The term "front" refers to the forward driving direction of the vehicle, and the term "rear" refers to a reverse driving direction of the vehicle.

FIG. 1 shows the exterior of a vehicle according to an embodiment of the present invention.

Referring to FIG. 1, a vehicle 700 may include wheels 103FR, 103FL, 103RL, . . . , which are rotated by a power source and a steering input apparatus 100 for adjusting the travel direction of the vehicle 700.

The steering input apparatus 100 may include a steering wheel. The user may determine the travel direction of the vehicle 700 using the steering wheel.

A steering input received through the steering input apparatus 100 may be delivered to steered wheels. The steering input apparatus 100 may be electrically or mechanically connected to the steered wheels. Preferably, the steered wheels are front wheels 103FL and 103FR. It is also possible that the front wheels 103FL and 103FR and the rear wheels 103RR all operate as steered wheels.

FIGS. 2A to 2G are views illustrating various examples of a camera module included in an assistance apparatus for vehicles according to an embodiment of the present invention.

Figure 2A:
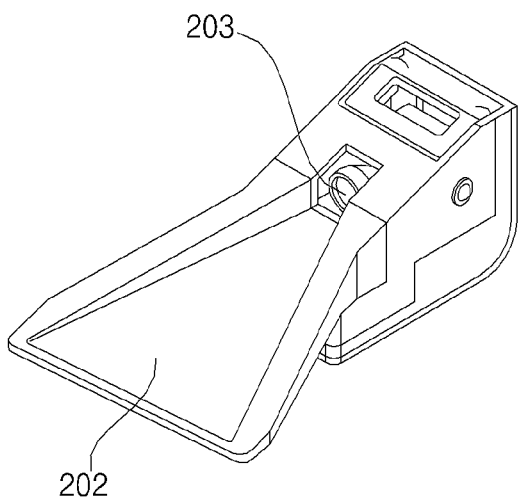
FIGS. 2A to 2G are diagrams illustrating various examples of a camera module included in an assistance apparatus for vehicles according to an embodiment of the present invention.

Referring to FIG. 2A, a camera unit 200a may include an image sensor (e.g., CMOS or CCD), a lens 203, and a light shield 202 adapted to block a portion of light incident on the lens 203.

The camera unit 200a may be a structure detachably attached to the indoor ceiling or windshield of the vehicle 700.

The camera unit 200a may acquire an image of surroundings of the vehicle. For example, the camera unit 200a may acquire a vehicle front view image or a vehicle rear view image. The image acquired through the camera unit 200a may be transmitted to an image processor 202 (see FIG. 2G).

An image acquired through the mono camera unit 200a may be referred to as a mono image.

The camera unit 200a illustrated in FIG. 2A may be referred to as a mono camera unit or a single camera unit.

Figure 2B:
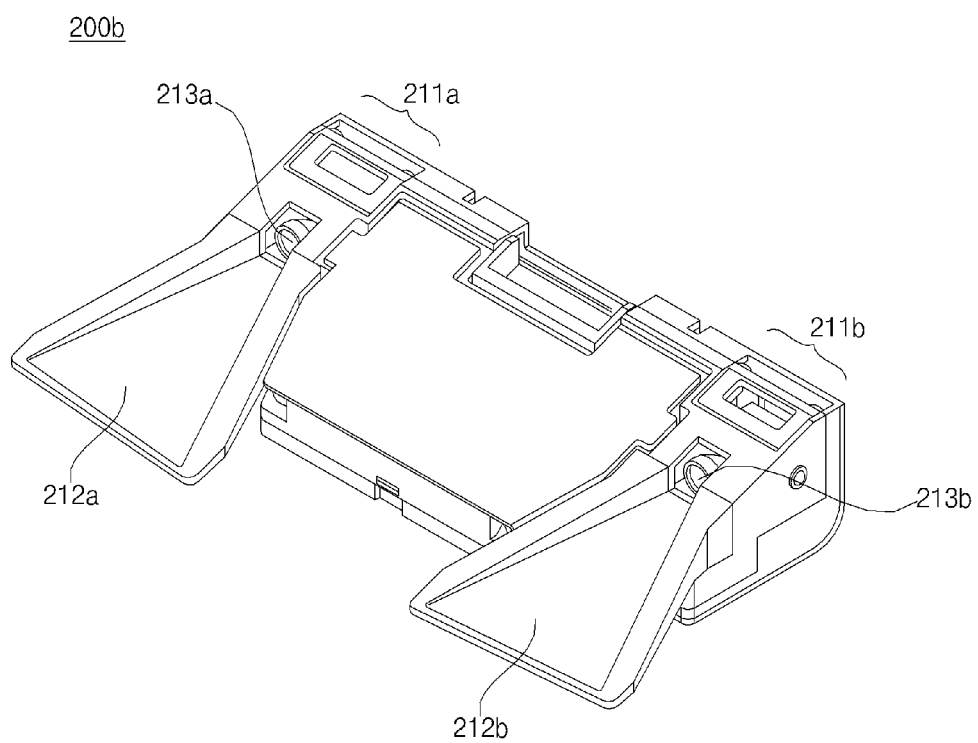

Referring to FIG. 2B, a camera unit 200b may include a first camera 211a and a second camera 211b. The first camera 211a may include a first image sensor (e.g., CCD or CMOS) and a first lens 213a. The second camera 211b may include a second image sensor (e.g., CCD or CMOS) and a second lens 213b.

The camera unit 200b may include a first light shield 212a and a second light shield 212b, which serve to block a portion of light incident on the first lens 213a and the second lens 213b.

The camera unit 200b may be a structure detachably attached to the indoor ceiling or windshield of the vehicle 700.

The camera unit 200b may acquire an image of surroundings of the vehicle. For example, the camera unit 200b may acquire a vehicle front view image or a vehicle rear view image. The image acquired through the camera unit 200b may be transmitted to an image processor 202 (see FIG. 2G).

An image acquired through the first camera 211a and the second camera 211b may be referred to as a stereo image.

The camera unit 200b illustrated in FIG. 2B may be referred to as a stereo camera unit.

Figure 2C:
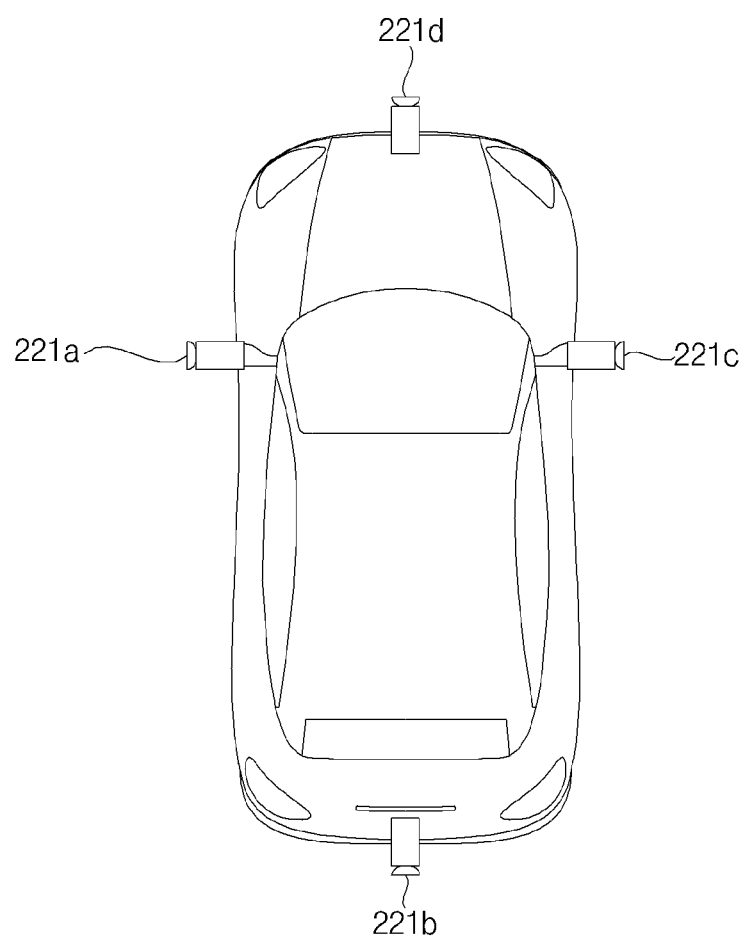

Referring to FIG. 2C, a camera unit 200c may include a plurality of cameras 221a, 221b, 221c and 221d.

For example, the left camera 221a may be disposed in a case surrounding the left side-view mirror. The right camera 221c may be disposed in a case surrounding the right side-view mirror. The front camera 221d may be disposed in one area of the front bumper. The rear camera 221b may be disposed in one area of the trunk door.

The cameras 221a, 221b, 221c and 221d may be disposed at the left, back, right and front of the vehicle, respectively. Each of the cameras 221a, 221b, 221c and 221d may include an image sensor (e.g., CCD or CMOS) and a lens.

The camera unit 200c may acquire images of surroundings of the vehicle. For example, the camera unit 200c may acquire a front view image, a rear view image, a left side view image and a right side view image of the vehicle. Images acquired through the camera unit 200c may be transmitted to the image processor 202 (see FIG. 2G).

The images acquired through the cameras 221a, 221b, 221c and 221d) or an image produced by synthesizing the acquired images may be referred to as an around view image.

The camera unit 200c illustrated in FIG. 2C may be referred to as an around view camera unit.

Figure 2D:
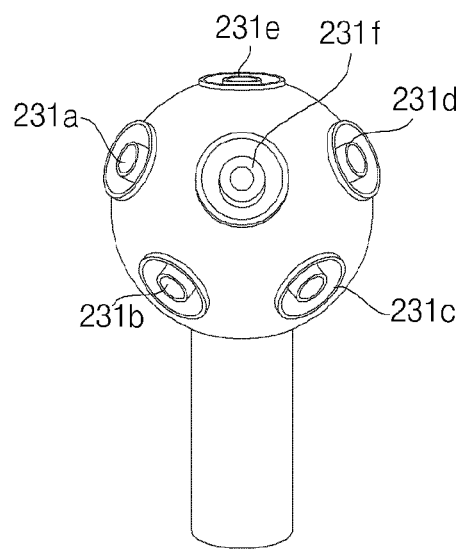

Referring to FIG. 2D, a camera unit 200d may include a plurality of cameras 231a, 231b, 231c, 231d, 231e, 231f, . . . . The overall exterior of the camera unit 200d may have a spherical shape. The cameras 231a, 231b, 231c, 231d, 231e, 231f, . . . , may be disposed at a predetermined distance from each other to face in different directions.

The camera unit 200d may be disposed in one area of the body of the vehicle 700. For example, the camera unit 200d may be disposed on the roof of the vehicle 700.

The camera unit 200d may acquire an omnidirectional image of surroundings of the vehicle 700. The camera unit 200d may acquire a front view image, a rear view image, a left side-view image, a right side-view image, a downward view image, and an upward view image with respect to the vehicle 700.

Each of the cameras 231a, 231b, 231c, 231d, 231e, 231f, . . . , may include an image sensor (e.g., CCD or CMOS) and a lens.

The camera unit 200d may acquire images of surroundings of the vehicle. The cameras 231a, 231b, 231c, 231d, 231e, 231f, . . . , may acquire images in a plurality of directions. For example, the camera unit 200d may acquire a front view image, a rear view image, a left side-view image, a right side-view image, a downward view image, and an upward view image of the vehicle 700. The images acquired through the camera unit 200d may be transmitted to the image processor 202 (see FIG. 2G).

The images acquired through the cameras 231a, 231b, 231c, 231d, 231e, 231f, . . . , of FIG. 2D or an image produced by synthesizing the acquired images may be referred to as an omnidirectional image.

The number and positions of the cameras 231a, 231b, 231c, 231d, 231e, 231f, . . . , included in the camera unit 200d may be properly determined so as to acquire an omnidirectional image of the surroundings of the vehicle 700. Each of the cameras 231a, 231b, 231c, 231d, 231e, 231f, . . . , may be provided with a proper viewing angle such that an image acquired through each of the cameras can partially overlap an image acquired through a neighboring camera.

Figure 2E:
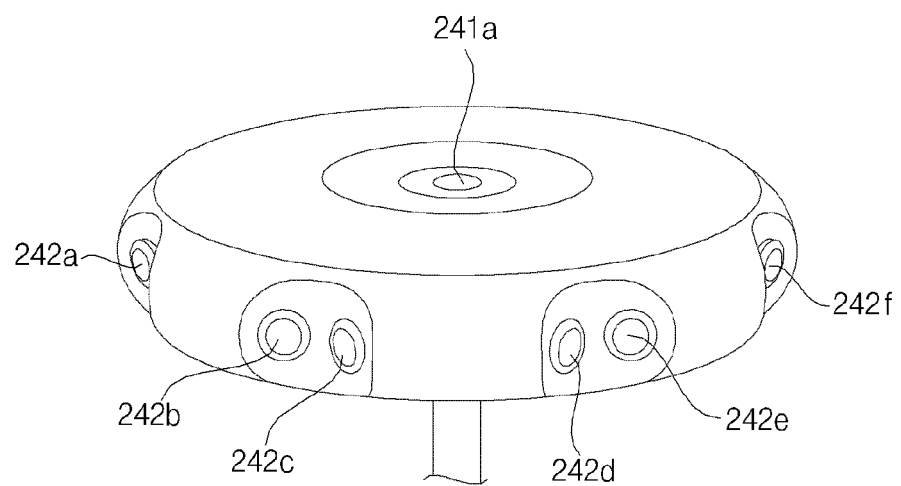

Referring to FIG. 2E, a camera unit 200e may include a plurality of cameras 241a, 242a, 242b, 242c, 242d, 242e, 242f, . . . . The exterior of the camera unit 200e may be formed in a disc shape. The cameras 241a, 242a, 242b, 242c, 242d, 242e, 242f, . . . , may be disposed at a predetermined distance from each other to face in different directions.

The camera unit 200e may be disposed in one area of the body of the vehicle 700. For example, the camera unit 200e may be disposed on the roof of the vehicle 700.

The camera unit 200e may acquire an omnidirectional image of surroundings of the vehicle 700. The camera unit 200e may acquire a front view image, a rear view image, a left side-view image, a right side-view image, a downward view image, and an upward view image with respect to the vehicle 700.

Each of the cameras 241a, 242a, 242b, 242c, 242d, 242e, 242f, . . . , may include an image sensor (e.g., CCD or CMOS) and a lens.

The camera unit 200e may acquire images of surroundings of the vehicle. The cameras 241a, 242a, 242b, 242c, 242d, 242e, 242f, . . . , may acquire images in a plurality of directions. For example, the camera unit 200e may acquire a front view image, a rear view image, a left side-view image, a right side-view image, a downward view image, and an upward view image of the vehicle. The images acquired through the camera unit 200e may be transmitted to the image processor 202 (see FIG. 2G).

The images acquired through the cameras 231a, 231b, 231c, 231d, 231e, 231f, . . . , of FIG. 2E or an image produced by synthesizing the acquired images may be referred to as an omnidirectional image.

The number and positions of the cameras 241a, 242a, 242b, 242c, 242d, 242e, 242f, . . . , included in the camera unit 200e may be properly determined so as to acquire an omnidirectional image of the surroundings of the vehicle 700. For example, a first camera 241a of the cameras 241a, 242a, 242b, 242c, 242d, 242e, 242f, . . . , may acquire an upward view image of the vehicle 700. In this case, the first camera 241a is preferably a pantoscopic camera. All the cameras 242a, 242b, 242c, 242d, 242e, 242f, . . . , except the first camera 241a may acquire side-view images and a downward view image of the vehicle 700.

Figure 2F:
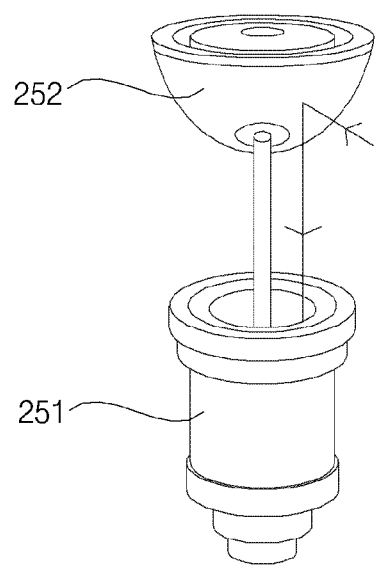

Referring to FIG. 2F, a camera unit 200f may include a camera 252 and a parabolic mirror 251.

The camera unit 200f may be disposed in one area of the body of the vehicle 700. For example, the camera unit 200f may be disposed on the roof of the vehicle 700.

The camera unit 200f may acquire an omnidirectional image of surroundings of the vehicle 700. The camera unit 200f may acquire a front view image, a rear view image, a left side-view image, a right side-view image, a downward view image, and an upward view image with respect to the vehicle 700.

The camera 252 may include an image sensor (e.g., CCD or CMOS) and a lens. The camera unit 200f may acquire an image of surroundings of the vehicle. The camera 252 may acquire an image reflected from the parabolic mirror 251. The image acquired through the camera 252 may be delivered to the image processor 202 (see FIG. 2G) and processed according to a predetermined image processing algorithm.

Figure 2G:
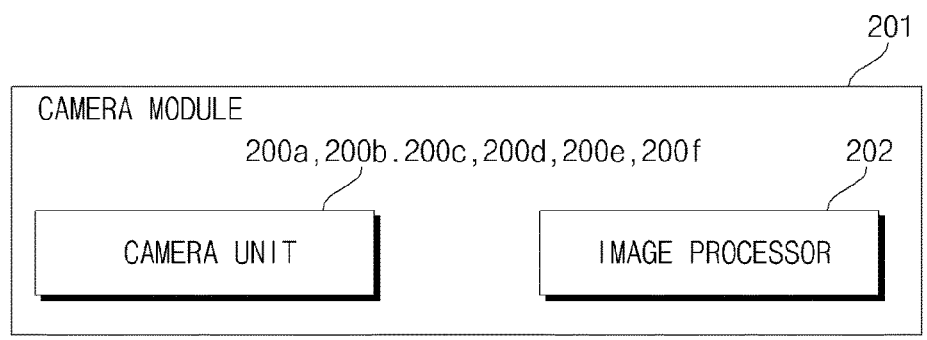

The image acquired by the camera 252 of FIG. 2G or an image obtained by performing image processing on the acquired image may be referred to as an omnidirectional image.

The camera units 200d, 200e and 200f illustrated in FIGS. 2D to 2F may be referred to as omnidirectional camera units.

Referring to FIG. 2G, a camera module 201 may include camera units 200a, 200b, 200c, 200d, 200e and 200f and the image processor 202.

The image processor 202 may perform image processing on images of surroundings of the vehicle acquired by the camera units 200a to 200f. The image processor 202 may perform computer vision-based signal processing on the images of the surroundings of the vehicle.

The image processor 202 may synthesize a plurality of images received from the around view camera unit 200c of FIG. 2C. Herein, the plurality of images is images received from a plurality of cameras (cameras 221a, 221b, 221c and 221d of FIG. 2C). The image processor 202 may create an around view image by synthesizing the images. For example, the around view image may be a top view image.

The image processor 202 may detect at least one object based on the respective images acquired by the cameras 221a, 221b, 221c and 221d of FIG. 2C. Alternatively, the image processor 202 may detect at least one object based on the around view image.

The image processor 202 may synthesize a plurality of images received from the omnidirectional camera unit 200d of FIG. 2D. Herein, the plurality of images is images received from the cameras 231a, 231b, 231c, 231d, 231e, 231f, . . . , of FIG. 2D.

The image processor 202 may synthesize all images acquired through the cameras 231a, 231b, 231c, 231d, 231e, 231f, . . . , of FIG. 2D based on feature points detected in parts of the acquired images overlapping each other. For example, the image processor 202 may detect a common feature point in overlapping regions of a first image acquired by the first camera 231a and a second image acquired by the second camera 231b. The image processor 202 may synthesize the first image and the second image based on the detected feature point. By synthesizing a plurality of images received from the cameras 231a, 231b, 231c, 231d, 231e, 231f, . . . , of FIG. 2D in this way, the image processor 202 may create an omnidirectional image.

The image processor 202 may detect at least one object based on the respective images acquired by the cameras 231a, 231b, 231c, 231d, 231e, 231f, . . . , of FIG. 2D. Alternatively, the image processor 202 may detect at least one object based on the omnidirectional image.

The image processor 202 may synthesize a plurality of images received from the omnidirectional camera unit 200e of FIG. 2E. Herein, the plurality of images may be images received from the plurality of cameras 241a, 242a, 242b, 242c, 242d, 242e, 242f, . . . , of FIG. 2E.

An image acquired by a first camera (the camera 241a of FIG. 2E) may partially overlap respective images acquired by the other cameras (the cameras 242a, 242b, 242c, 242d, 242e, 242f, . . . , of FIG. 2E) except the first camera (the camera 241a of FIG. 2E). The image processor 202 may synthesize the images based on a predetermined feature point detected in overlapping parts of the images.

Further, the images acquired by the cameras 242a, 242b, 242c, 242d, 242e, 242f, . . . , of FIG. 2E except the first camera 241a from among the cameras 241a, 242a, 242b, 242c, 242d, 242e, 242f, . . . , may partially overlap each other. The image processor 202 may synthesize the images based on a predetermined feature point detected in overlapping parts of the images.

The image processor 202 may create an omnidirectional image by synthesizing the plurality of images received from the cameras 241a, 242a, 242b, 242c, 242d, 242e, 242f, . . . , of FIG. 2E.

The image processor 202 may detect at least one object based on the respective images acquired by the cameras 241a, 242a, 242b, 242c, 242d, 242e, 242f, . . . . Alternatively, the image processor 202 may detect at least one object based on the omnidirectional image. The vehicle assistance apparatus 100 may track motion of the detected object.

The image processor 202 may detect at least one object based on the respective images acquired by the omnidirectional camera unit 200f. Alternatively, the vehicle assistance apparatus 100 may detect at least one object based on an omnidirectional image. The vehicle assistance apparatus 100 may track motion of the detected object.

The image processor 202 may detect an object from a surroundings-of-vehicle image. In detecting objects, the image processor 202 may perform lane detection (LD), vehicle detection (VD), pedestrian detection (PD), bright-spot detection (BD), traffic sign recognition (TSR), and road surface detection, structure detection, and the like.

For example, the image processor 202 may detect at least one object based on at least one of the intensity, color, histogram, feature point, shape, spatial position and motion.

The image processor 202 may verify the detected object. The image processor 202 may verify the detected object using a verification technique such as neural network, support vector machine (SVM), AdaBoost using Haar-like features, and histograms of oriented gradients (HOG). In this case, the image processor 202 may perform the verification operation by comparing the detected object in the surroundings-of-vehicle image with data stored in the memory 140.

The image processor 202 may track the verified object. The image processor 202 may calculate motion of the verified object or motion vectors of the verified object, and track movement of the object based on the calculated motion or motion vectors.

Figure 3A:
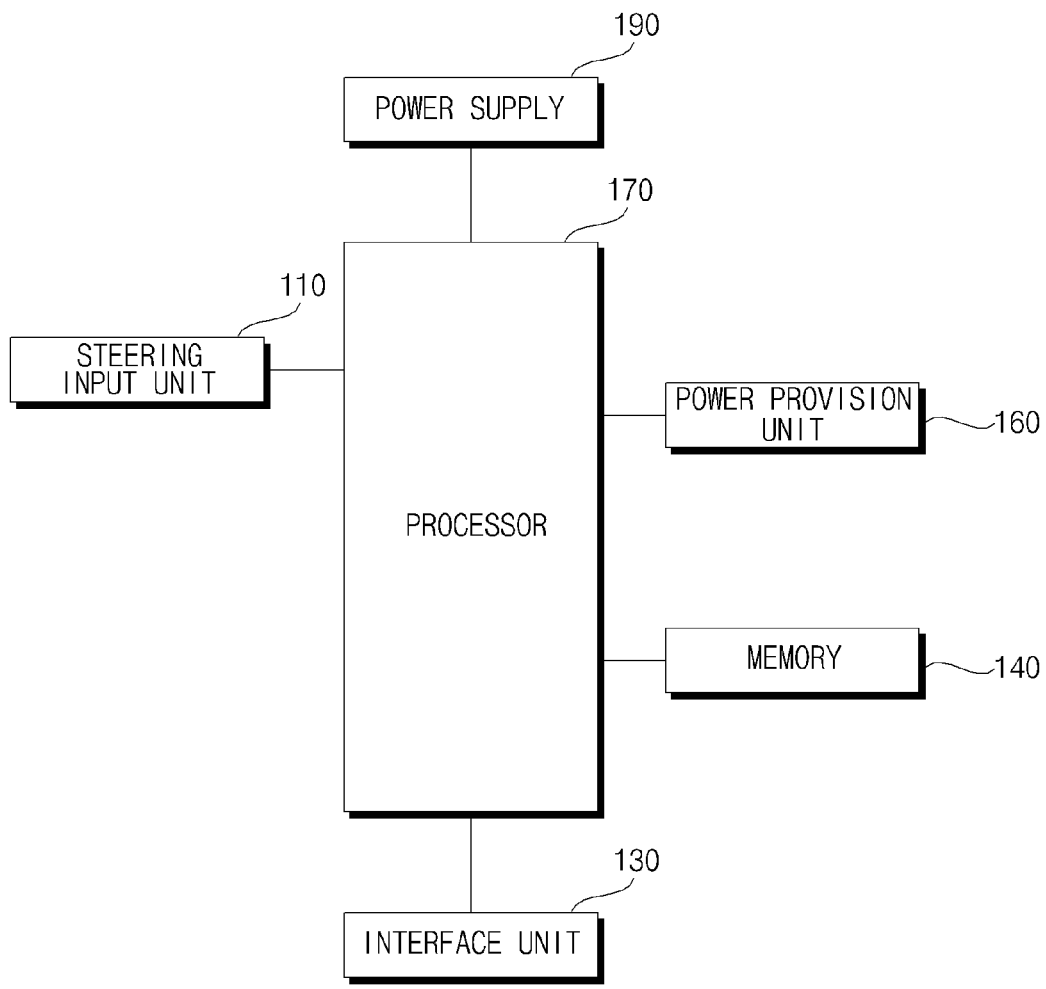
FIGS. 3A to 3C are block diagrams illustrating a steering input apparatus according to an embodiment of the present invention.
Figure 3B:
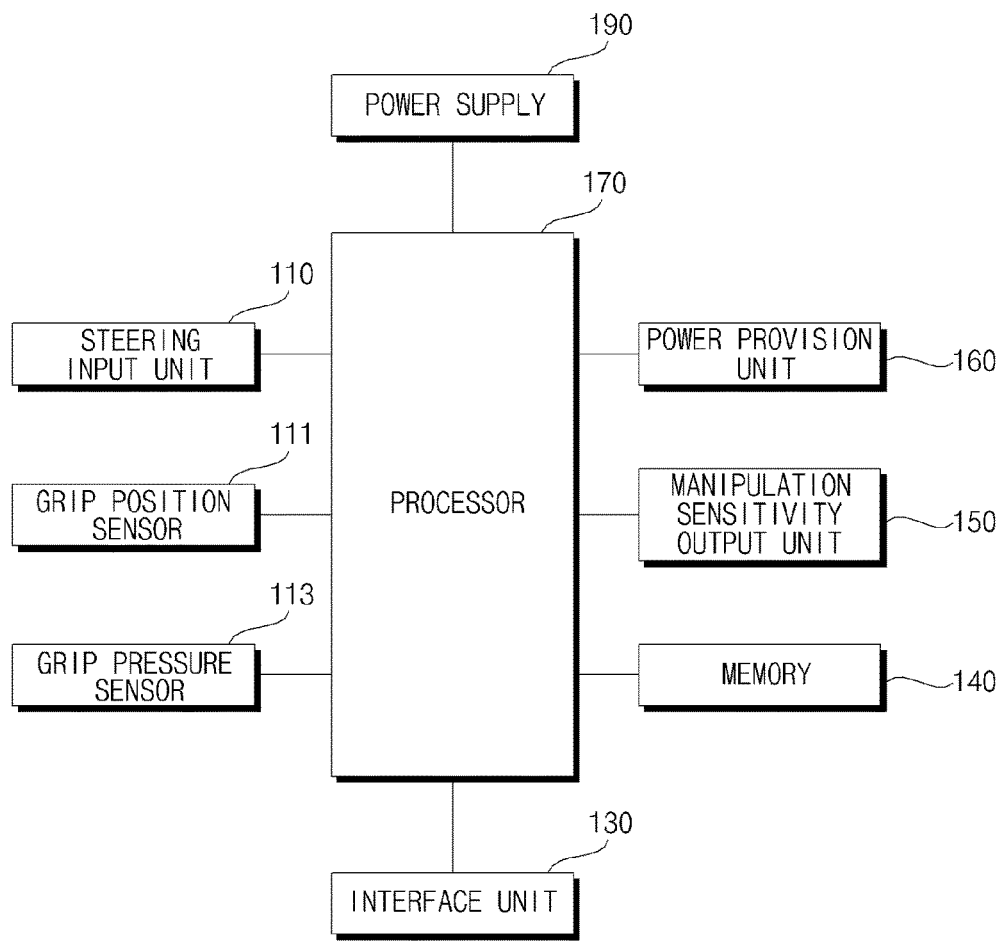
Figure 3C:
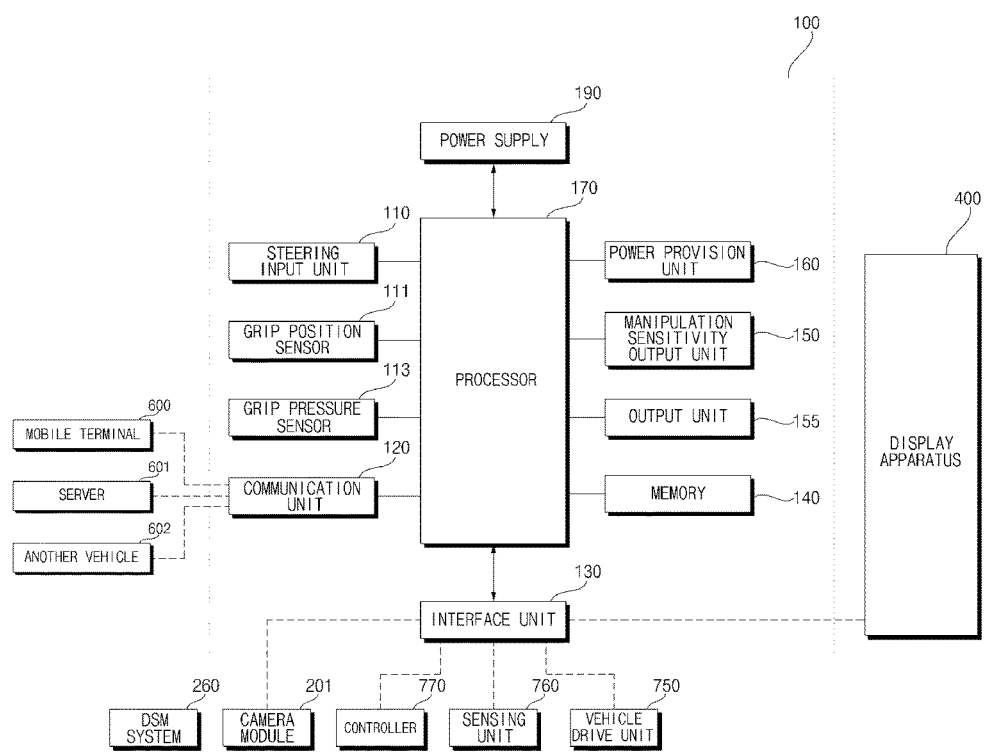

FIGS. 3A to 3C are block diagrams illustrating a steering input apparatus according to an embodiment of the present invention.

Referring to FIG. 3A, the steering input apparatus 100 may include a steering input unit 110, an interface unit 130, a memory 140, a power provision unit 160, a processor 170, and a power supply 190.

The steering input unit 110 may receive steering input. The steering input unit 110 may include an angular speed sensor.

For example, when the steering input apparatus 100 includes a steering wheel, the steering input unit 110 may receive first-direction rotation input and second-direction rotation input. The angular speed sensor may sense steering speed, steering direction, steering angle and the like according to the first-direction or the second-direction rotation input. The sensed steering speed, steering direction and steering angle information may be transmitted to the processor 170.

The interface unit 130 may receive data from a system, a unit or an apparatus in the vehicle or transmit a signal processed or generated by the processor 170. To this end, the interface unit 130 may perform data communication with the controller 770, a display apparatus 400 for vehicles, a sensing unit 760, a vehicle drive unit 750, the camera module 201, a DSM system 260 and the like, which are included in the vehicle, through wired or wireless communication. For example, the interface unit 130 may exchange data with a system, a unit or an apparatus in the vehicle through CAN communication.

The interface unit 130 may receive navigation information through communication with the controller 770, the display apparatus 400 or a separate navigation apparatus. Herein, the navigation information may include designated destination information, route information according to the destination, map information, and location information about the vehicle (e.g., GPS information), wherein the map information and location information are related to traveling of the vehicle.

The interface unit 130 may receive sensor information from the controller 770 or the sensing unit 760.

Herein, the sensor information may include at least one of vehicle direction information, vehicle location information (GPS information), vehicle orientation information, vehicle travel speed information, vehicle acceleration information, vehicle inclination information, vehicle drive/reverse information, battery information, fuel information, tire information, vehicle lamp information, vehicle interior temperature information, vehicle interior humidity information, and information about whether or not it is raining.

The interface unit 130 may receive information about an object in front of or around the vehicle.

For example, the interface unit 130 may receive object information detected in a vehicle front view image from the camera module configured to acquire front view images of the vehicle.

For example, the interface unit 130 may receive the object information detected in a surroundings-of-vehicle image from the camera module 201 configured to acquire images of surroundings of the vehicle.

The object information may include information indicating whether or not an object is present, location information about the object, information about the distance to the object, and speed information about the object.

The interface unit 130 may receive travel speed information about the vehicle 700.

The interface unit 130 may receive position information about the vehicle from the sensing unit 760 or the controller 770.

The interface unit 130 may receive wind direction information from the sensing unit 760, the controller 770 or the camera module 201.

The interface unit 130 may receive lane change information corresponding to a construction section from the camera module 201.

The interface unit 130 may receive driver status information from the DSM system 260.

The interface unit 130 may provide a signal to the controller 770 or the vehicle drive unit 750. Herein, the signal may be a control signal.

The interface unit 130 may receive turn signal input information.

The memory 140 is electrically connected to the processor 170. The memory 730 may store basic data for each unit, control data for controlling operation of each unit, and input/output data.

The memory 140 may store various kinds of data for overall operation of the steering input apparatus 100 including a program for processing or control of the processor 170.

The memory 140 may correspond to various storage devices such as a ROM, RAM, EPROM, flash drive, and hard drive in terms of hardware. The memory 140 may store various kinds of data for overall operation of the display apparatus 100 including a program for processing or control the processor 170.

According to an embodiment, the memory 140 may be integrated with the processor 170.

The power provision unit 160 may provide power for rotation input provided through the steering wheel. The power may assist in steering manipulation of the steering wheel.

The power provision unit 160 may include a hydraulic power provision apparatus, an electrohydraulic power provision apparatus or a motor-driven power provision apparatus.

The hydraulic power provision apparatus serves to lessen load caused by manipulation of the steering wheel in a manner that a hydraulic pump operated by a belt connected to the engine supplies hydraulic pressure to the steering column to provide power through the supplied hydraulic pressure. The hydraulic power provision apparatus may be controlled by the processor 170.

The electrohydraulic power provision apparatus serves to lessen load caused by manipulation of the steering wheel without use of the power of the engine but by operating the hydraulic pump through an independent electric motor to supply hydraulic pressure to the steering column to provide power through the supplied hydraulic pressure. The electrohydraulic power provision apparatus may be controlled by the processor 170.

The motor-driven power provision apparatus serves to lessen load caused by manipulation of the steering wheel by driving an electric motor by sensing the direction of rotation and rotation speed of the steering wheel through a sensor (e.g., an angular speed sensor) and providing power through operation of the electric motor. The motor-driven power provision apparatus may be controlled by the processor 170.

The processor 170 controls overall operation of each unit in the steering input apparatus 100.

The processor 170 may receive, through the interface unit 130, information about objects located in front of or around the vehicle.

The object information may include information indicating whether or not an object is present, location information about the object, information about the distance to the object, and speed information about the object.

The object may include one of a lane, another vehicle, a pedestrian, a light, a traffic sign, a road surface and a structure.

The processor 170 may control the power provision unit 160 based on the object information to adjust the manipulation sensitivity to rotation input provided through the steering wheel.

As the power provision unit is controlled based on the object information to change the manipulation sensitivity of the steering wheel, steering input suitable for a driving situation may be realized.

The manipulation sensitivity may be set to fit a user.

When vehicle driving is performed in a manipulation sensitivity setting mode, the processor 170 may receive an extent of a steering wheel rotation input from the user through the steering input unit 110. The processor 170 may receive the extent to which the steering wheel rotation input is applied by the user during straight forward driving or driving along a curve.

When vehicle driving is performed in the manipulation sensitivity setting mode, the processor 170 may receive grip position information from a grip position sensor 111 (see FIG. 3B).

When vehicle driving is performed in the manipulation sensitivity setting mode, the processor 170 may receive grip pressure information from a grip pressure sensor 113 (see FIG. 3B).

The manipulation sensitivity setting mode may be set according to initial driving after production of the vehicle 700 or by user input.

The processor 170 may receive the steering wheel rotation input information, the grip position information or the grip pressure information. The processor 170 may set a reference manipulation sensitivity to rotation input of the steering wheel based on the steering wheel rotation input information, the grip position information or the grip pressure information. Herein, the reference manipulation sensitivity may refer to a manipulation sensitivity for driving on a road in a straight forward driving section at a speed within a reference range.

The processor 170 may adjust the manipulation sensitivity such that the manipulation sensitivity of the steering wheel to first-direction rotation input is different from the manipulation sensitivity of the steering wheel to second-direction rotation input.

The processor 170 may adjust the manipulation sensitivity such that the manipulation sensitivity of the steering wheel to the second-direction rotation input is lower than the manipulation sensitivity of the steering wheel to the first-direction rotation input.

For example, the processor 170 may adjust the manipulation sensitivity such that the manipulation sensitivity of the steering wheel to the second-direction rotation input is lower than the manipulation sensitivity of the steering wheel to the first-direction rotation input with respect to a centerline dividing the steering wheel into left and right halves (arranged in, for example, the width direction of the vehicle).

For example, if the second-direction rotation input is received with the steering wheel rotated by a first rotational displacement in a first direction, the processor 170 may adjust the manipulation sensitivity such that the manipulation sensitivity to the second-direction rotation input is lower than the manipulation sensitivity to the first-direction rotation input with respect to the first rotational displacement.

The processor 170 may adjust the manipulation sensitivity of the steering wheel such that the manipulation sensitivity of the steering wheel to the first-direction rotation input is lower than the manipulation sensitivity of the steering wheel to the second-direction rotation input.

For example, the processor 170 may adjust the manipulation sensitivity such that the manipulation sensitivity of the steering wheel to the first-direction rotation input is lower than the manipulation sensitivity of the steering wheel to the second-direction rotation input with respect to a centerline dividing the steering wheel into left and right halves (arranged in, for example, the width direction of the vehicle).

For example, if the first-direction rotation input is received with the steering wheel rotated by the first rotational displacement in a second direction, the processor 170 may adjust the manipulation sensitivity such that the manipulation sensitivity to the first-direction rotation input is lower than the manipulation sensitivity to the second-direction rotation input with respect to the first rotational displacement.

By adjusting the manipulation sensitivity such that the manipulation sensitivity to leftward rotation input is different from that to rightward rotation input as described above, an incorrect steering input may be prevented, and a guide on safe driving may be provided.

The processor 170 may adjust the manipulation sensitivity to rotation input of the steering wheel according to object information by dividing the manipulation sensitivity into a plurality of different levels. The levels may be distinguished from each other based on the degree of stiffness felt by the user providing steering wheel input.

For example, the processor 170 may adjust the manipulation sensitivity to rotation input of the steering wheel according to the type of the detected object by providing a plurality of different levels of manipulation sensitivity. For example, when a first object is detected, the processor 170 may adjust the manipulation sensitivity of the steering wheel to a first level.

For example, the processor 170 may divide the manipulation sensitivity to rotation input of the steering wheel into a plurality of levels according to location information about the detected object. For example, if an object is located at a first point with respect to the vehicle 700, the processor 170 may adjust the manipulation sensitivity of the steering wheel to the first level.

For example, the processor 170 may adjust the manipulation sensitivity to rotation input of the steering wheel by dividing the manipulation sensitivity into a plurality of different levels according to information indicating the distance to the detected object. For example, if the distance to the object is within a first range, the processor 170 may adjust the manipulation sensitivity of the steering wheel to a first level.

For example, the processor 170 may adjust the manipulation sensitivity to rotation input of the steering wheel by dividing the manipulation sensitivity into a plurality of different levels according to speed information about the detected object. For example, if the relative speed of the object is within a first range, the processor 170 may adjust the steering wheel manipulation sensitivity to a first level.

As described above, the manipulation sensitivity can be adjusted according to the object information. Accordingly, the manipulation sensitivity to input of the steering wheel may be properly changed depending on the driving situation. Thereby, proper manipulation input may be realized.

When the rotational displacement of the steering wheel increases according to rotation input provided through the steering wheel, the processor 170 may lower the manipulation sensitivity to rotation input of the steering wheel.

For example, if the steering wheel is rotated by a first rotational displacement in a first direction of rotation or a second direction of rotation by rotation input provided through the steering wheel, the processor 170 may adjust the manipulation sensitivity of the steering wheel to the first level.

For example, if the steering wheel is rotated by a second rotational displacement in the first direction or the second direction of rotation by rotation input provided through the steering wheel, the processor 170 may adjust the manipulation sensitivity of the steering wheel to a second level.

According to an embodiment, the processor 170 may adjust the manipulation sensitivity of the steering wheel such that the manipulation sensitivity of the steering wheel according to rotational displacement in the first direction of rotation is different from the manipulation sensitivity of the steering wheel according to rotational displacement in the second direction of rotation.

For example, if the steering wheel is rotated by a first rotational displacement in the first direction of rotation by rotation input provided through the steering wheel, the processor 170 may adjust the manipulation sensitivity of the steering wheel to the first level. In addition, if the steering wheel is rotated by the first rotational displacement in the second direction of rotation by rotation input provided through the steering wheel, the processor 170 may adjust the manipulation sensitivity of the steering wheel to the second level.

Meanwhile, as the rotational displacement of the steering wheel increases according to rotation input provided through the steering wheel, the processor 170 may increase the manipulation sensitivity of the steering wheel.

Adjusting the manipulation sensitivity in different manners according to rotational displacements as described above may allow the user to recognize an extent to which rotation input is applied and prevent sudden steering input, thereby preventing an accident.

If the magnitude of rotational displacement of the steering wheel in the first direction is greater than or equal to a reference value, the processor 170 may control the power provision unit 160 to rotate the steering wheel by a predetermined displacement in the second direction.

If the magnitude of rotational displacement of the steering wheel in the second direction is greater than or equal to a reference value, the processor 170 may control the power provision unit 160 such that the steering wheel rotates by a predetermined displacement in the first direction.

By causing the steering wheel to rotate in the opposite direction when the magnitude of the rotational displacement in one direction is greater than or equal to a reference value as described above, various accidents caused by sudden steering input may be prevented.

If the rotational speed of the steering wheel according to rotation input is greater than or equal to a reference value, the processor 170 may control the power provision unit 160 to rotate the steering wheel only by a predetermined rotational displacement. Herein, the predetermined rotational displacement may be referred to as a rotational displacement limit.

As the rotational displacement limit for the rotational speed is set as described above, various accidents caused by sudden steering input may be prevented.

The processor 170 may receive, through the interface unit 130, information about an object detected in front of the vehicle from the camera module 201 configured to acquire front view images of the vehicle. Herein, the camera unit included in the camera module 201 may be one of the camera units 200a to 200f described above with reference to FIGS. 2A to 2F.

The processor 170 may control the manipulation sensitivity to rotation input of the steering wheel based on the object information.

The processor 170 may receive travel speed information about the vehicle through the interface unit 130. The processor 170 may receive information about a driving lane ahead of the vehicle 700 as the object information. The processor 170 may adjust the manipulation sensitivity to rotation input of the steering wheel based on the driving lane information and travel speed information.

If the driving lane is a straight lane, and the travel speed is higher than or equal to a reference speed, the processor 170 may adjust the manipulation sensitivity to rotation input of the steering wheel according to the travel speed. For example, if the driving lane is a straight lane, and the travel speed is higher than or equal to a reference speed, the processor 170 may adjust the manipulation sensitivity to rotation input of the steering wheel in proportion to the travel speed. As the travel speed increases, the processor 170 may lower the manipulation sensitivity to rotation input of the steering wheel.

By adjusting the manipulation sensitivity according to the travel speed in a manner that the manipulation sensitivity to rotation inputs provided through the steering wheel is lowered for high-speed travel as described above, stability of high-speed driving may be enhanced.

If the driving lane is a curved lane, the processor 170 may adjust the manipulation sensitivity to rotation input of the steering wheel according to the curvature of the curved lane.

The processor 170 may acquire driving lane information from the image processor 202. Alternatively, the processor 170 may acquire the driving lane information through the navigation information.

The processor 170 may receive position information about the vehicle 700 through the interface unit 130. For example, the processor 170 may receive "oversteer" or "understeer" status information about the vehicle 700 through the interface unit 130.

If oversteer occurs during travel of the vehicle 700 along a curved lane, the processor 170 may adjust the manipulation sensitivity to rotation input of the steering wheel such that the manipulation sensitivity to rotation input of the steering wheel corresponding to a direction in which oversteer occurs becomes lower than the manipulation sensitivity to rotation input of the steering wheel corresponding to the opposite direction.

If understeer occurs during travel of the vehicle 700 along a curved lane, the processor 170 may adjust the manipulation sensitivity to rotation input of the steering wheel such that the manipulation sensitivity to rotation input of the steering wheel corresponding to a direction in which understeer occurs becomes lower than the manipulation sensitivity to rotation input of the steering wheel corresponding to the opposite direction.

As such, when oversteer or understeer occurs, a steering input for overcoming the oversteer or understeer may be induced by adjusting the manipulation sensitivity to rotation input of the steering wheel.

The processor 170 may receive information indicating a strong wind section through the interface unit 130.

When the vehicle 700 travels in a strong wind section, the processor 170 may adjust the manipulation sensitivity of the steering wheel such that the manipulation sensitivity to rotation input of the steering wheel is lowered from the manipulation sensitivity of the steering wheel provided on the road which is not in the strong wind section. For example, the strong wind section may correspond to a bridge or a tunnel entrance or exit.

The processor 170 may receive wind direction information or wind speed information through the interface unit 130.

The processor 170 may adjust the manipulation sensitivity to rotation input of the steering wheel such that the manipulation sensitivity to rotation input of the steering wheel corresponding to the windward side of the vehicle becomes lower than the manipulation sensitivity to rotation input of the steering wheel corresponding to the opposite side of the vehicle.

The processor 170 may adjust the manipulation sensitivity to rotation input of the steering wheel based on the wind speed. For example, the processor 170 may decrease the manipulation sensitivity to rotation input of the steering wheel as the wind speed increases.

By adjusting the manipulation sensitivity to rotation input of the steering wheel according to wind strength, wind direction or wind speed, a guide on steering input may be provided such that stable driving can be performed despite the wind.

The processor 170 may adjust the manipulation sensitivity to rotation input of the steering wheel such that the manipulation sensitivity to rotation input of the steering wheel corresponding to a direction in which the vehicle 700 faces an object becomes lower than the manipulation sensitivity to rotation input of the steering wheel corresponding to the opposite direction. Herein, the object information may include location information about a large vehicle, a median, a guardrail, a street tree, or a streetlight.

By adjusting the manipulation sensitivity of the steering wheel to leftward and rightward rotation inputs as described above, collision with an object may be avoided.

The processor 170 may further adjust the manipulation sensitivity to rotation input of the steering wheel based on the distance between the vehicle 700 and objects.

As the vehicle 700 approaches an object, the processor 170 may adjust the manipulation sensitivity to rotation input of the steering wheel such that the manipulation sensitivity to rotation input of the steering wheel corresponding to the direction in which the vehicle 700 faces the object is gradually lowered according to the distance between the vehicle 700 and the object.

By adjusting the manipulation sensitivity to rotation input of the steering wheel in the aforementioned manner when the vehicle has a risk of colliding with an object which the vehicle approaches, a guide on steering input for avoiding collision with the object may be provided.

If object information is received, the processor 170 may adjust the manipulation sensitivity to input of the steering wheel input to a lower level than when the object information is not received. Herein, the object information may include information about light infiltrating into the vehicle, a pothole placed on the driving lane of the vehicle, a slippery section, or a construction section.

The processor 170 may further adjust the manipulation sensitivity to rotation input of the steering wheel based on the distance between the vehicle 700 and an object.

As the vehicle 700 approaches the object, the processor 170 may adjust the manipulation sensitivity to rotation input of the steering wheel such that the manipulation sensitivity is gradually lowered according to the distance between the vehicle 700 and the object.

By adjusting the manipulation sensitivity to rotation input of the steering wheel to maintain straight forward driving when the vehicle approaches an object which may obstruct driving, a guide on steering input for avoiding the object obstructing the driving may be provided.

The processor 170 may receive lane change guide information according to a construction section through the interface unit 130.

The processor 170 may adjust the manipulation sensitivity to rotation input of the steering wheel according to the lane change guide information such that the manipulation sensitivity to rotation input of the steering wheel corresponding to a direction in which the vehicle is guided to change lanes is higher than the manipulation sensitivity to rotation input of the steering wheel corresponding to the opposite direction.

By adjusting the manipulation sensitivity to rotation input of the steering wheel according to lane change information for a construction section, a guide on steering input corresponding to a direction in which lane change needs to be performed may to be provided.

The processor 170 may adjust the manipulation sensitivity to steering wheel inputs according to the information. As the traffic density increases, the processor 170 may adjust the manipulation sensitivity to steering wheel input to a lower level.

The processor 170 may adjust the manipulation sensitivity to rotation input of the steering wheel according to the number of detected vehicles. The traffic density may be numerically expressed by the number of vehicles.

For example, if the number of detected vehicles is within a first reference range, the processor 170 may adjust the manipulation sensitivity to steering wheel input to a first level.

By adjusting the manipulation sensitivity to steering wheel input according to the traffic density as described above, a guide on steering inputs for flexibly coping with an unexpected situation may be provided.

The processor 170 may receive, through the interface unit 130, information about an object detected in a surroundings-of-vehicle image from the camera module 201 configured to acquire images of surroundings of the vehicle.

The processor 170 may adjust the manipulation sensitivity of the steering wheel based on the object information.

The processor 170 may adjust the manipulation sensitivity to rotation input of the steering wheel such that the manipulation sensitivity to rotation input of the steering wheel corresponding to a direction in which the vehicle 700 faces another vehicle is lower than the manipulation sensitivity to rotation input of the steering wheel corresponding to the opposite direction. Herein, the object information may be information about another vehicle which is in a lane neighboring the lane of the vehicle 700 and is behind the vehicle 700.

The processor 170 may further adjust the manipulation sensitivity to rotation input of the steering wheel based on the distance between the vehicle 700 and an object.

When the vehicle 700 approaches the object, the processor 170 may gradually lower the manipulation sensitivity of the steering wheel according to the distance between the vehicle 700 and the object.

By adjusting the manipulation sensitivity to rotation input of the steering wheel when a vehicle traveling behind the driver's vehicle in a neighboring lane approaches the driver's vehicle as described above, a guide on steering input for avoiding collision between the vehicle's may be provided.

The processor 170 may receive driver status information through the interface unit 130.

The processor 170 may adjust the manipulation sensitivity to rotation input of the steering wheel based on the condition of the driver.

For example, if the physical condition of the driver is not good, the processor 170 may increase the manipulation sensitivity to rotation input of the steering wheel. For example, if the driver is excited, the processor 170 may lower the manipulation sensitivity to steering wheel input.

The processor 170 may adjust the manipulation sensitivity to steering wheel input based on turn signal input information. For example, if an input of first-direction turn signal information is received, the processor 170 may adjust the manipulation sensitivity to rotation input of the steering wheel such that the manipulation sensitivity to rotation input of the steering wheel corresponding to a second direction is lower than the manipulation sensitivity to rotation input of the steering wheel corresponding to the first direction.

Meanwhile, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 190 may be controlled by the processor 170 to supply electric power necessary for operation of respective constituents. In particular, the power supply 190 may receive power from, for example, a battery in the vehicle.

Referring to FIG. 3B, the steering input apparatus 100 may further include a grip position sensor 111, a grip pressure sensor 113, and a manipulation sensitivity output unit 150.

The grip position sensor 111 may sense the grip position on the steering wheel rim. The grip position may include both-hand grip information, one-hand grip information, grip area information or grip type information.

The grip position sensor 111 may sense a grip of both hands, a grip of one hand, a grip area or a grip type of the user.

The grip position sensor 111 may include at least one touch sensor. The touch sensor may be disposed in at least one area of the steering wheel rim. Preferably, the touch sensor is disposed in an area in which the user's hands are positioned to provide a steering input in the region of the rim of the steering wheel rim during driving. For example, the touch sensor may be disposed over the whole region of the steering wheel rim. In this case, a single touch sensor may be provided. For example, the touch sensor may include a first touch sensor disposed over a part of the steering wheel rim from the upper left end to the lower left end and a second touch sensor disposed over a part of the steering wheel rim from the upper right end to the lower right end. For example, touch sensors may be disposed at the upper right end, upper left end, lower right end, and lower left end of the steering wheel rim. In this case, a plurality of touch sensors may be provided.

A sensing signal generated by the grip position sensor 111 may be delivered to the processor 170.

For example, when one touch sensor is disposed over a whole region of the steering wheel rim, the processor 170 may determine the grip position of the user on the steering wheel rim according to a part of the touch sensor through which touch is sensed.

For example, when a plurality of sensors is disposed on the steering wheel rim, the processor 170 may determine a grip of the user on the steering wheel rim according to a touch sensor through which touch is sensed.

The grip position sensor 111 may include a camera. Herein, the camera may include a lens, an image sensor, and a processor. The camera may capture an image of the steering wheel rim and the user's hands. The camera may sense the grip position of the user on the steering wheel rim through image processing.

The grip pressure sensor 113 may sense a grip pressure. The grip pressure sensor 113 may sense the magnitude of pressure applied by the user when the user grips the steering wheel rim.

The grip pressure sensor 113 may include at least one pressure sensor. The pressure sensor may be disposed in at least one area of the steering wheel rim. Preferably, the pressure sensor is disposed in an area in which the user's hands are positioned to provide a steering input in the region of the rim of the steering wheel during driving. For example, the pressure sensor may be disposed over the whole region of the steering wheel rim. In this case, a single pressure sensor may be provided. For example, the pressure sensor may include a first pressure sensor disposed over a part of the steering wheel rim from the upper left end to the lower left end and a second pressure sensor disposed over a part of the steering wheel rim from the upper right end to the lower right end. For example, touch sensors may be disposed at the upper right end, upper left end, lower right end, and lower left end of the steering wheel rim. In this case, a plurality of pressure sensors may be provided.

A sensing signal generated by the grip pressure sensor 113 may be delivered to the processor 170.

The grip pressure sensor 130 may sense the grip pressure of the user in order to store a reference pressure. For example, when a grip pressure reference setting mode is set, the grip pressure sensor 113 may sense the grip pressure of the user. In this case, the sensed grip pressure may become a reference pressure.

The manipulation sensitivity output unit 150 may output manipulation sensitivity information. The manipulation sensitivity output unit 150 may output manipulation sensitivity change information.

Meanwhile, the steering input unit 110, the interface unit 130, the memory 140, the power provision unit 160, the processor 170 and the power supply 190 are configured as described above with reference to FIG. 3A.

The processor 170 may control the grip position sensor 111, the grip pressure sensor 113 and the manipulation sensitivity output unit 150.

The processor 170 may receive grip position information from the grip position sensor 111. The processor 170 may adjust the manipulation sensitivity to steering wheel input according to the grip position information.

For example, when one-hand grip information is received, the processor 170 may adjust the manipulation sensitivity to rotation input of the steering wheel such that the manipulation sensitivity is higher than when both-hand grip information is received.

If the grip area is wide, the processor 170 may lower the manipulation sensitivity to rotation input of the steering wheel. If the grip area is within a first range, the processor 170 may adjust the manipulation sensitivity to rotation input of the steering wheel to a first level.

By adjusting the manipulation sensitivity to input of the steering wheel according to the grip position as described above, the driver may be guided to more comfortably provide steering input.

The processor 170 may receive grip pressure information from the grip pressure sensor 113. The processor 170 may adjust the manipulation sensitivity to steering wheel input according to the grip pressure information.

For example, if the grip pressure is high, the processor may lower the manipulation sensitivity to input of the steering wheel. If the grip pressure is within a first range, the processor 170 may adjust the manipulation sensitivity to rotation input of the steering wheel to the first level.

By adjusting the manipulation sensitivity to input of the steering wheel according to the grip pressure as described above, the driver may be guided to more comfortably provide steering input.

The processor 170 may output the manipulation sensitivity change information through the manipulation sensitivity output unit 150.

Referring to FIG. 3C, the steering input apparatus 100 may further include a communication unit 120 and an output unit 155.

The communication unit 120 may communicate with other devices 600, 601 and 602. The communication unit 120 may wirelessly exchange data with a mobile terminal 600, a server 601 or another vehicle 602. In particular, the communication unit 120 may wirelessly exchange data with a mobile terminal of the vehicle driver. Applicable wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 601. Meanwhile, the steering input apparatus 100 may transmit recognized real-time information to the mobile terminal 600 or the server 601.

When the user enters the vehicle, the mobile terminal 600 of the user may be paired with the steering input apparatus 100 automatically or by execution of an application by the user.

The communication unit 120 may receive traffic information from an external server 601. Herein, the external server 601 may be a server located at a traffic control center that controls traffic.

For example, the communication unit 120 may receive change-of-traffic light information from the external server 601.

The output unit 155 may output an alarm to the user. The output unit 155 may include a display for outputting a visible alarm. The output unit 155 may include a speaker for outputting an audible alarm. The output unit 155 may include a haptic module for outputting a haptic alarm. According to an embodiment, the haptic module may be provided to the steering wheel, a seat or a pedal.

Meanwhile, the steering input unit 110, the interface unit 130, the memory 140, the power provision unit 160, the processor 170 and the power supply 190 are configured as described above with reference to FIG. 3A. In addition, the grip position sensor 111, the grip pressure sensor 113 and the manipulation sensitivity output unit 150 are configured as described above with reference to FIG. 3B.

The processor 170 may control the communication unit 120 and the output unit 155.

The processor 170 may generate and transmit information, data or a signal to external devices 600, 601 and 602 via the communication unit 120. For example, the processor 170 may transmit the object information to the external devices 600, 601 and 602. For example, the processor 170 may transmit information about the manipulation sensitivity to rotation input of the steering wheel or manipulation sensitivity change information to the external devices 600, 601 and 602.

The processor 170 may generate and output the information, data or signals through the output unit 155. For example, the processor 170 may output the object information through the output unit 155. For example, the processor 170 may output the information about the manipulation sensitivity to rotation input of the steering wheel or manipulation sensitivity change information through the output unit 155.

Each of the constituents described above with reference to FIGS. 3A to 3C may be selectively omitted according to an embodiment of the steering input apparatus 100. In addition, two or more constituents may be combined to construct one constituent, or one constituent may be divided into two or more constituents.

Figure 3D:
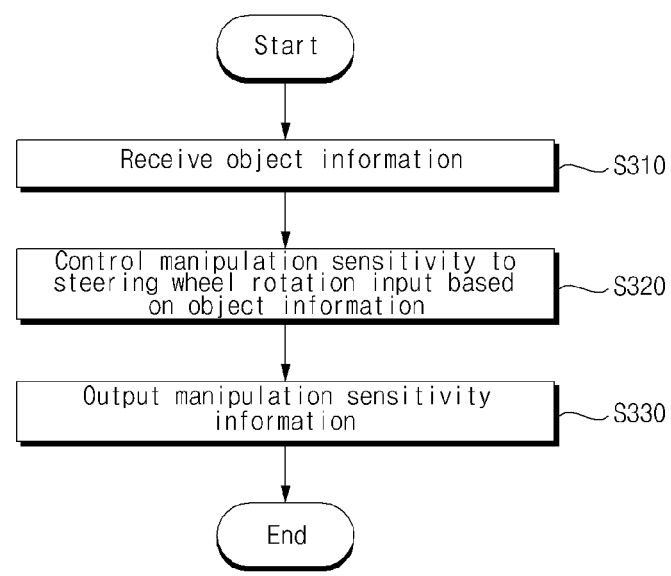
FIG. 3D is a flowchart illustrating operation of a steering input apparatus according to an embodiment of the present invention.

FIG. 3D is a flowchart illustrating operation of a steering input apparatus according to an embodiment of the present invention.

Referring to FIG. 3D, the processor 170 may receive object information (S310).

The processor 170 may receive, through the interface unit 130, information about objects located in front of or around the vehicle.

The object information may include information indicating whether or not an object is present, location information about the object, information about the distance to the object, and speed information about the object.

The object may include one of a lane, another vehicle, a pedestrian, a light, a traffic sign, a road surface and a structure.

The processor 170 may receive, through the interface unit 130, information about an object detected in front of the vehicle from the camera module 201 configured to acquire front view images of the vehicle. The camera unit included in the camera module 201 may be one of the camera units 200a to 200f described above with reference to FIGS. 2A to 2F.

The processor 170 may receive, through the interface unit 130, information about an object detected in a surroundings-of-vehicle image from the camera module 201 configured to acquire images of surroundings of the vehicle.

The processor 170 may control the manipulation sensitivity to rotation input of the steering wheel based on the object information (S320).

The processor 170 may control the power provision unit 160 based on the object information to adjust the manipulation sensitivity to rotation input provided through the steering wheel.

The processor 170 may adjust the manipulation sensitivity such that the manipulation sensitivity of the steering wheel to first-direction rotation input is different from the manipulation sensitivity of the steering wheel to second-direction rotation input.

The processor 170 may adjust the manipulation sensitivity to rotation input of the steering wheel according to object information by dividing the manipulation sensitivity into a plurality of different levels. The levels may be distinguished from each other based on the degree of stiffness felt by the user providing steering wheel input.

As the rotational displacement of the steering wheel increases according to rotation input provided through the steering wheel, the processor 170 may increase the manipulation sensitivity of the steering wheel.

If the magnitude of rotational displacement of the steering wheel in the first direction is greater than or equal to a reference value, the processor 170 may control the power provision unit 160 such that the steering wheel rotates by a predetermined displacement in the second direction.

If information about an object detected in a vehicle front view image is received, the processor 170 may receive travel speed information about the vehicle through the interface unit 130. The processor 170 may receive information about a driving lane ahead of the vehicle 700 as the object information. The processor 170 may adjust the manipulation sensitivity to rotation input of the steering wheel based on the driving lane information and travel speed information.

If a strong wind section is detected in the vehicle front view image, the processor 170 may adjust the manipulation sensitivity of the steering wheel such that the manipulation sensitivity to rotation input of the steering wheel is lowered from the manipulation sensitivity of the steering wheel provided on a road which is not in the strong wind section. For example, the strong wind section may be a bridge or a tunnel entrance or exit.

The processor 170 may adjust the manipulation sensitivity to rotation input of the steering wheel such that the manipulation sensitivity to rotation input of the steering wheel corresponding to a direction in which the vehicle 700 faces an object becomes lower than the manipulation sensitivity to rotation input of the steering wheel corresponding to the opposite direction. Herein, the object information may include location information about a large vehicle, a median, a guardrail, a tree, or a streetlight. In this case, as the vehicle 700 approaches the object, the processor 170 may gradually lower the manipulation sensitivity to rotation input of the steering wheel corresponding to the direction in which the vehicle 700 faces the object.

If object information is received, the processor 170 may adjust the manipulation sensitivity to input of the steering wheel to a lower level than when the object information is not received. Herein, the object information may include information about light infiltrating the vehicle, a pothole in the driving lane of the vehicle, a slippery section, or a construction section. In this case, as the vehicle 700 approaches the object, the processor 170 may gradually lower the manipulation sensitivity to steering wheel input.

Meanwhile, the processor 170 may receive lane change information according to a construction section through the interface unit 130. The processor 170 may adjust the manipulation sensitivity to rotation input of the steering wheel according to the lane change information such that the manipulation sensitivity to rotation input of the steering wheel corresponding to a direction in which the vehicle is guided to change lanes is higher than the manipulation sensitivity to rotation input of the steering wheel corresponding to the opposite direction.

The processor 170 may adjust the manipulation sensitivity to steering wheel input according to the average number of vehicles detected in each lane.

If object information detected in a surroundings-of-vehicle image is received, the processor 170 may adjust the manipulation sensitivity to rotation input of the steering wheel such that the manipulation sensitivity to rotation input of the steering wheel corresponding to a direction in which the vehicle 700 faces another vehicle is lower than the manipulation sensitivity to rotation input of the steering wheel corresponding to the opposite direction. Herein, the object information may be information about another vehicle which is in a lane neighboring the lane of the vehicle 700 and is behind the vehicle 700.

The processor 170 may output manipulation sensitivity information through the manipulation sensitivity output unit 150 or the output unit 155 (S330).

Figure 4:
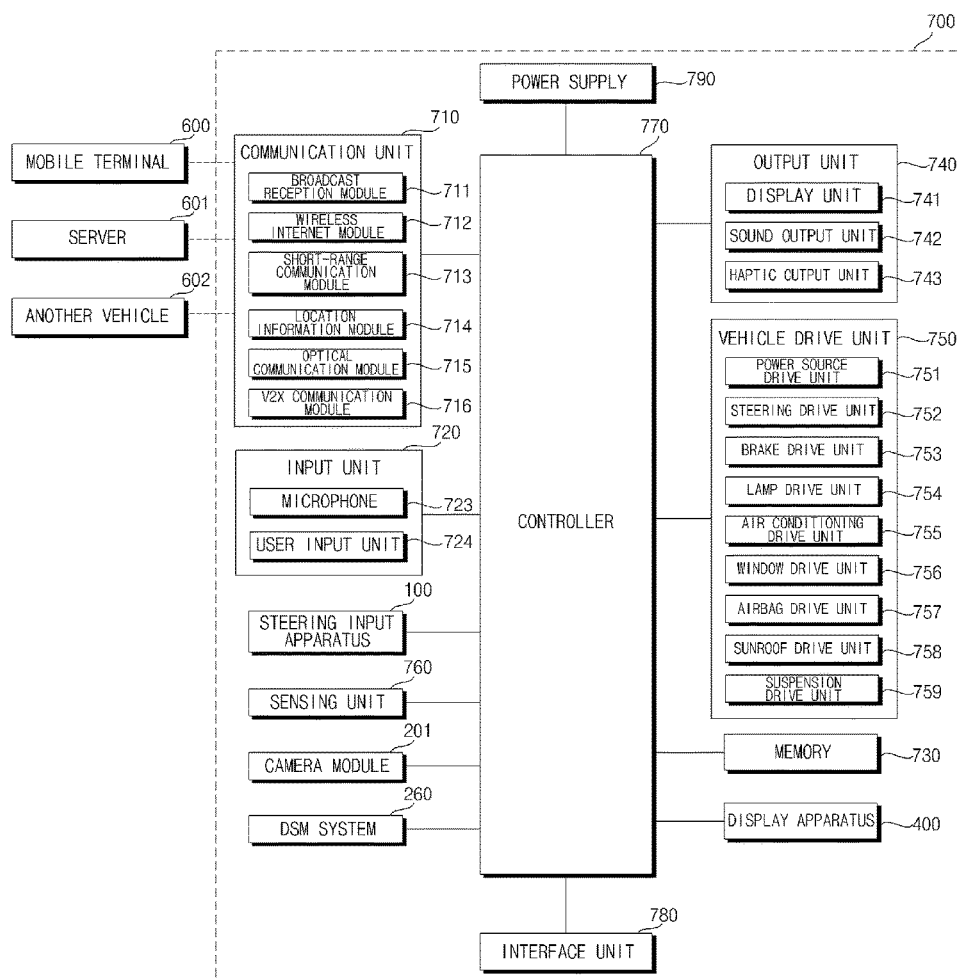
FIG. 4 is a block diagram illustrating a vehicle according to an embodiment of the present invention.

FIG. 4 is a block diagram illustrating the vehicle 700 according to an embodiment of the present invention.

Referring to FIG. 4, the vehicle 700 may include a communication unit 710, an input unit 720, a sensing unit 760, an output unit 740, a vehicle drive unit 750, a memory 730, an interface unit 780, a controller 770, a power supply 790, a steering input apparatus 100, a DSM (driver status monitoring) system 260 and a display apparatus 400 for the vehicle.

The communication unit 710 may include at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

The communication unit 710 may include a broadcast reception module 711, a wireless Internet module 712, a short-range communication module 713, a location information module 714, an optical communication module 715, and a V2X communication module 716.

The communication unit 710 may receive weather information. The communication unit 710 may receive the weather information from an external source through the broadcast reception module 711, the wireless Internet module 712, or the V2X communication module 716.

The communication unit 710 may receive driving road information. The communication unit 710 may recognize the location of the vehicle 700 through the location information module 714, and may receive road information corresponding to the location of the vehicle 700 through the wireless Internet module 712 or the V2X communication module 716.

The communication unit 710 may receive traffic light change information from the external server 601 through the V2X communication module 716.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed to the vehicle 700. The wireless Internet module 712 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one of the aforementioned wireless Internet technologies. For example, the wireless Internet module 712 may wirelessly exchange data with the external server 601. The wireless Internet module 712 may receive weather information and traffic situation information (e.g., TPEG (Transport Protocol Expert Group)) from the external server 601.

The short-range communication module 713, which is used for short-range communication, may support short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some embodiments, the light transmitter may include an array of a plurality of light emitting devices. According to some embodiments, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with the vehicle 602 through optical communication.

The V2X communication module 716 serves to perform wireless communication with the server 601 or another vehicle 602. The V2X communication module 716 includes a module capable of implementing a vehicle-to-vehicle communication (V2V) protocol or a vehicle-to-infrastructure communication (V2I) protocol. The vehicle 700 may perform wireless communication with the external server 601 or the vehicle 602 through the V2X communication module 716.

The input unit 720 may include a camera 195, a microphone 723 and a user input unit 724.

The microphone 723 may process an external sound signal to create electrical data. The data created through processing may be utilized for various purposes according to functions being executed by the vehicle 700. The microphone 723 may convert a voice command from the user into electrical data. The electrical data may be delivered to the controller 770.

According to an embodiment, the camera 722 or microphone 723 may be a constituent included in the sensing unit 760 rather than in the input unit 720.

The user input unit 724 is intended to receive information input by the user. When information is input through the user input unit 724, the controller 770 may control operation of the vehicle 700 in accordance with the input information. The user input unit 724 may include a touch input means or a mechanical input means. According to some embodiments, the user input unit 724 may be disposed in one area of the steering wheel. In this case, the driver may manipulate the user input unit 724 with fingers while holding the steering wheel.

The user input unit 724 may receive a turn signal input.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, an acceleration sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, a rain sensor, an illumination sensor, a tire pressure sensor, an ultrasonic sensor, radar, and lidar (Light Detection And Ranging).

Thereby, the sensing unit 760 may acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, information about whether it rains, an angle by which the steering wheel is rotated, surrounding illumination sensor, and tire pressure information.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The ultrasonic sensor, radar, or lidar may detect and track an object. The ultrasonic sensor, radar, or lidar may calculate the distance and relative speed of the detected object.

The ultrasonic sensor, radar, or lidar may sense a dangerous situation. The processor included in the ultrasonic sensor, radar, or lidar may sense a dangerous situation based on the distance to the object.

The sensing unit 760 may include a position sensor. The position sensor may sense the position of the vehicle. The position sensor may generate position information about the vehicle. The pressure sensor may include the yaw sensor, acceleration sensor, gyro sensor, and vehicle body tilt sensor described above.

The sensing unit may include a wind sensor. The wind sensor may sense the direction or speed of the wind. The wind sensor may generate wind direction information or wind speed information. The wind sensor may include an ultrasonic type wind sensor. The wind sensor may measure the speed and direction of the wind using ultrasonic waves, whose travel speed is increased or decreased by the wind when the waves travel through the air.

The sensing unit 760 may include a biometric identification information sensing unit. The biometric identification information sensing unit senses and acquires biometric identification information of a passenger. The biometric identification information may include fingerprint information, iris scan information, retina scan information, hand geometry information, facial recognition information, and voice recognition information. The biometric identification information sensing unit may include a sensor for sensing biometric identification information of a person in the vehicle. Herein, the interior camera and the microphone 723 may operate as sensors. The biometric recognition information sensing unit may acquire hand shape information and face recognition information through the interior camera.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED) display, a flexible display, a 3D display and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or specified in various modes.

Meanwhile, the display unit 741 may include a cluster to allow the driver to check the vehicle condition information or vehicle driving information during driving. The cluster may be positioned on the dashboard. In this case, the driver can check the information displayed on the cluster while looking forward.

According to some embodiments, the display unit 741 may be implemented as a head up display (HUD). If the display unit 741 is implemented as the HUD, information may be output through a transparent display provided to the windshield. Alternatively, the display unit 741 may be provided with a projection module, thereby outputting information through an image projected onto the windshield.

The sound output unit 742 converts an electrical signal from the controller 770 into an audio signal and outputs the audio signal. To this end, the sound output unit 742 may be provided with a speaker. The sound output unit 742 may output sound corresponding to operation of the user input unit 724.

The haptic output unit 743 generates haptic output. For example, the haptic output unit 743 may vibrate the steering wheel, a seat belt and a seat to allow the user to recognize the output.

The vehicle drive unit 750 may control operations of various vehicular devices. The vehicle drive unit 750 may receive a control signal from the steering input apparatus 100. The vehicle drive unit 750 may control various devices based on the control signal.

The vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electronic control of the engine. Thereby, the output torque of the engine may be controlled. If the power source drive unit 751 is an engine, the output torque of the engine may be controlled by the controller 770 to limit the speed of the vehicle.

As another example, if an electric motor is the power source, the power source drive unit 751 may control the motor. Thereby, the rotational speed and torque of the motor may be controlled.

The power source drive unit 751 may receive an acceleration control signal from the steering input apparatus 100. The power source drive unit 751 may control the power source according to the received acceleration control signal.

The steering drive unit 752 may perform electronic control of the steering apparatus in the vehicle 700. Thereby, the steering drive unit 752 may change the travel direction of the vehicle. The steering drive unit 752 may receive a steering control signal from the steering input apparatus 100. The steering drive unit 752 may control the steering apparatus to be steered according to the steering control signal.

The brake drive unit 753 may perform electronic control of a brake apparatus (not shown) in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right. The brake drive unit 753 may receive a deceleration control signal from the steering input apparatus 100. The brake drive unit 753 may control the brake apparatus according to the received deceleration control signal.

The lamp drive unit 754 may control lamps disposed inside and outside the vehicle to be turned on/off. In addition, the lamp drive unit 754 may control the intensity and direction of light from the lamps. For example, the lamp drive unit 754 may control a turn signal lamp and a brake lamp.

The air conditioning drive unit 755 may perform electronic control of an air conditioner in the vehicle 700. For example, if the temperature of the interior of the vehicle is high, the air conditioning drive unit 755 may control the air conditioner to supply cool air to the interior of the vehicle.

The window drive unit 756 may perform electronic control of a window apparatus in the vehicle 700. For example, the window drive unit 756 may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus in the vehicle 700. For example, the sunroof drive unit 758 may control opening or closing of the sunroof.

The suspension drive unit 759 may perform electronic control of a suspension apparatus in the vehicle 700. For example, when a road surface is uneven, the suspension drive unit 759 may control the suspension apparatus to attenuate vibration of the vehicle 700. The suspension drive unit 759 may receive a suspension control signal from the steering input apparatus 100. The suspension drive unit 759 may control the suspension apparatus according to the received suspension control signal.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The memory 730 may be integrated with the controller 770.

The interface unit 780 may serve as a path between the vehicle 700 and various kinds of external devices connected thereto. For example, the interface unit 780 may be provided with a port connectable to the mobile terminal 600, thus being connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery (not shown) in the vehicle.

The steering input apparatus 100 may exchange data with the controller 770. Various kinds of information, data or a control signal generated from the steering input apparatus 100 may be output to the controller 770. The steering input apparatus 100 may be the steering input apparatus described above with reference to FIGS. 1 to 3.

The driver status monitoring (DSM) system 260 serves to sense the state of the driver and control the vehicle 700 according to the state of the driver. The DSM system 260 may include input units such as an internal camera and a microphone.

The DSM system 260 may sense whether the driver is gazing forward, dozing, eating food, manipulating a device, or the like. In addition, the DSM system 260 may sense the driver's concentration on driving during travel in the vehicle.

The DSM system 260 may include a photoplethysmogram (PPG) sensor. The PPG sensor may be disposed in one region of the steering wheel which may contact the body of the user (e.g., the driver). The PPG sensor may be disposed in one region of the steering wheel rim. The DSM system 260 may acquire and analyze a biometric signal of the driver through the PPG sensor.

For example, the DSM system 260 may acquire a biometric signal and then generate physical condition information about the driver as the driver status information.

For example, the DSM system 260 may acquire a biometric signal and then generate excited state information about the driver as the driver status information.

For example, the DSM system 260 may analyze an image of the driver acquired by an internal camera, and generate drowsy state information about the driver as the driver status information.

For example, the DSM system 260 may analyze an image of the driver acquired by an internal camera, and generate device manipulation state information about the driver.

The DSM system 260 may provide the driver status information to the steering input apparatus 100.

Figure 5:
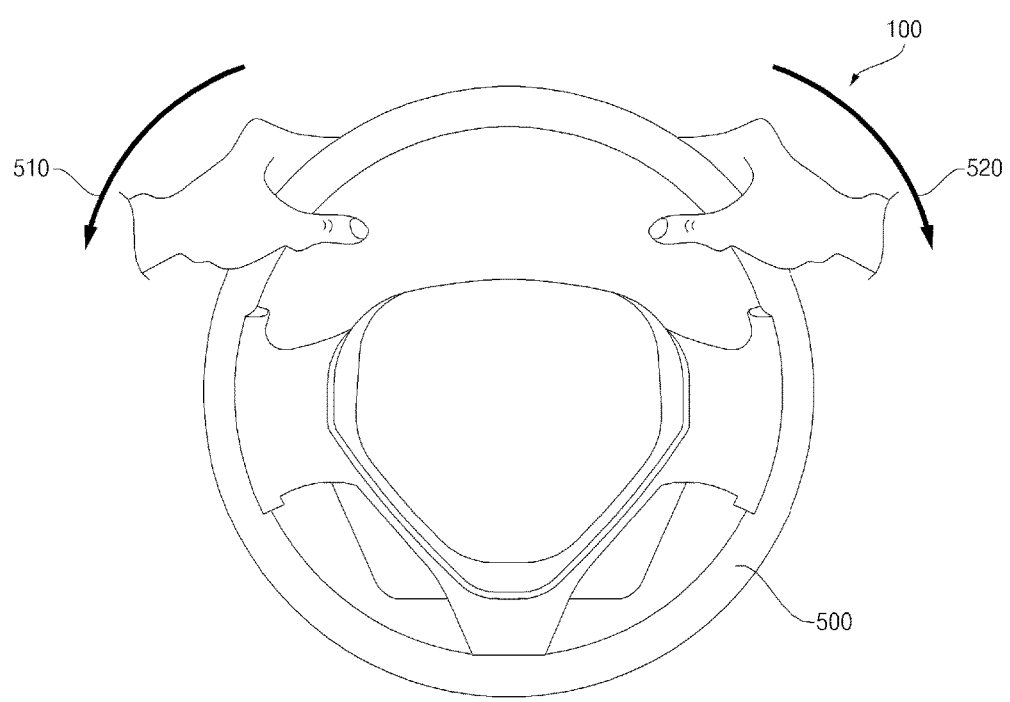
FIG. 5 is a view illustrating a steering input apparatus according to an embodiment of the present invention.

FIG. 5 is a view illustrating a steering input apparatus according to an embodiment of the present invention.

The steering input apparatus 100 may include a steering wheel 500. The steering input apparatus 100 may receive rotation input through the steering wheel.

The steering input apparatus 100 may receive first-direction rotation input 510 through the steering wheel 500. The first-direction rotation input 510 may be leftward rotation input.

The steering input apparatus 100 may receive second-direction rotation input 520 through the steering wheel 500. The second-direction rotation input 520 may be rightward rotation input.

The processor 170 may control the power provision unit 160. The power provision unit 160 may provide power for rotation input provided through the steering wheel 500. The power may assist in steering manipulation of the steering wheel 500. The power provision unit 160 may include a hydraulic power provision apparatus, an electrohydraulic power provision apparatus or a motor-driven power provision apparatus.

The processor 170 may control the manipulation sensitivity to rotation input provided through the steering wheel 500 by controlling the power provision unit 160. For example, the processor 170 may adjust the manipulation sensitivity to rotation input provided through the steering wheel 500.

Figure 6A:
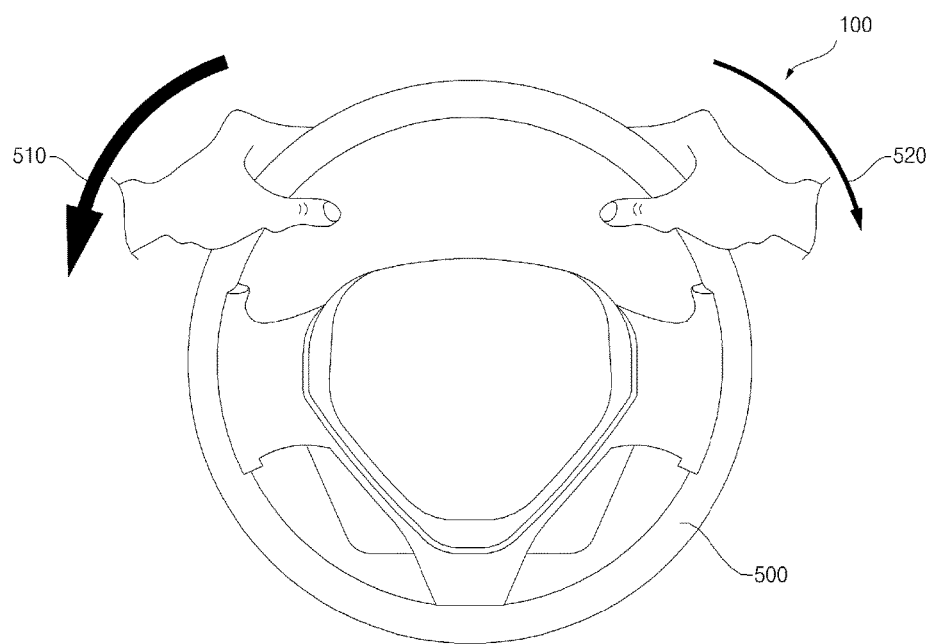
FIGS. 6A and 6B are views illustrating an operation of adjusting the manipulation sensitivity to a rotation input of the steering wheel such that the manipulation sensitivity to a first-direction rotation input is different from a second-direction rotation input, according to an embodiment of the present invention.
Figure 6B:
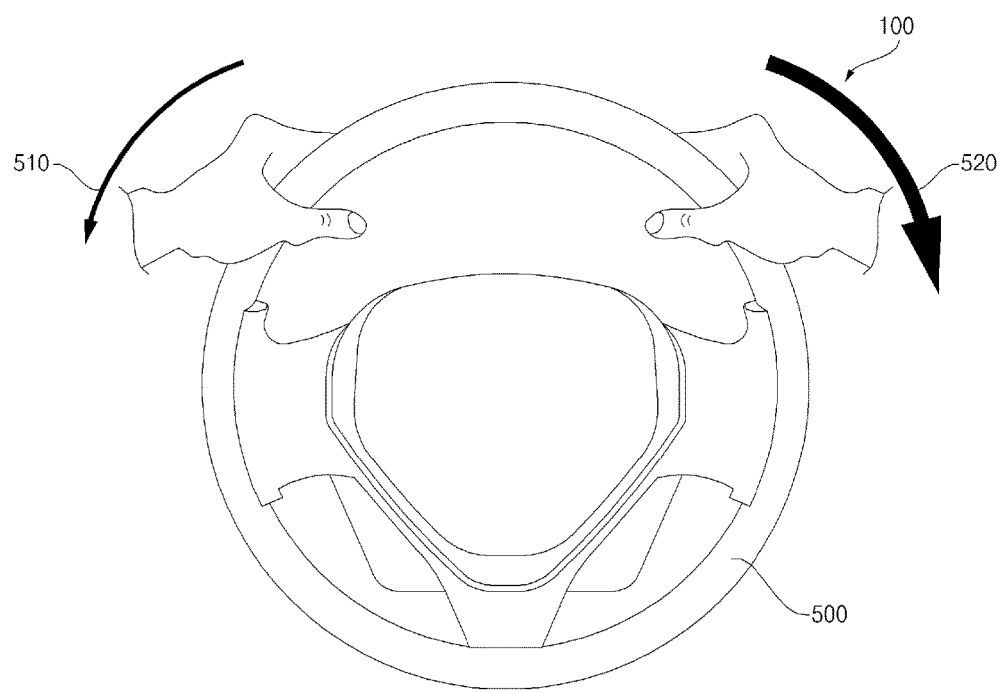

FIGS. 6A and 6B are views illustrating an operation of adjusting the manipulation sensitivity to rotation input of the steering wheel such that the manipulation sensitivity to first-direction rotation input is different from that to second-direction rotation input, according to an embodiment of the present invention.

The processor 170 may adjust the manipulation sensitivity of the steering wheel 500 such that the manipulation sensitivity of the steering wheel 500 to the first-direction rotation input 510 is different from the manipulation sensitivity of the steering wheel 500 to the second-direction rotation input 520.

As shown in FIG. 6A, the processor 170 may adjust the manipulation sensitivity of the steering wheel 500 such that the manipulation sensitivity of the steering wheel 500 to the first-direction rotation input 510 is lower than the manipulation sensitivity of the steering wheel 500 to the second-direction rotation input 520.

For example, if an object is located on the left side of the vehicle 700 with respect to the driving direction of the vehicle 700, the processor 170 may adjust the manipulation sensitivity of the steering wheel 500 such that the manipulation sensitivity of the steering wheel 500 to the leftward rotation input 510 is lower than the manipulation sensitivity of the steering wheel to the rightward rotation input 520. In this case, as the vehicle 700 approaches the object, the processor 170 may gradually lower the manipulation sensitivity to the leftward rotation input 510 according to the distance between the vehicle 700 and the object.

The object may include another vehicle, a median barrier, a guardrail, a street tree, or a streetlight.

As shown in FIG. 6B, the processor 170 may adjust the manipulation sensitivity of the steering wheel 500 such that the manipulation sensitivity of the steering wheel 500 to the second-direction rotation input 520 is lower than the manipulation sensitivity of the steering wheel 500 to the first-direction rotation input 510. The processor 170 may adjust the manipulation sensitivity of the steering wheel 500 such that the manipulation sensitivity of the steering wheel 500 to the first-direction rotation input 510 is higher than the manipulation sensitivity of the steering wheel 500 to the second-direction rotation input 520.

For example, if an object is located on the right side of the vehicle 700 with respect to the driving direction of the vehicle 700, the processor 170 may adjust the manipulation sensitivity of the steering wheel 500 such that the manipulation sensitivity of the steering wheel 500 to the rightward rotation input 520 is lower than the manipulation sensitivity of the steering wheel to the leftward rotation input 510. In this case, as the vehicle 700 approaches the object, the processor 170 may gradually lower the manipulation sensitivity to the rightward rotation input 520 according to the distance between the vehicle 700 and the object.

The object may include another vehicle, a median barrier, a guardrail, a street tree, or a streetlight.

By adjusting the manipulation sensitivity such that the manipulation sensitivity to the leftward rotation input is different from that to the rightward rotation input as described above, incorrect steering input may be prevented, and a guide on safe driving may be provided.

Figure 7A:
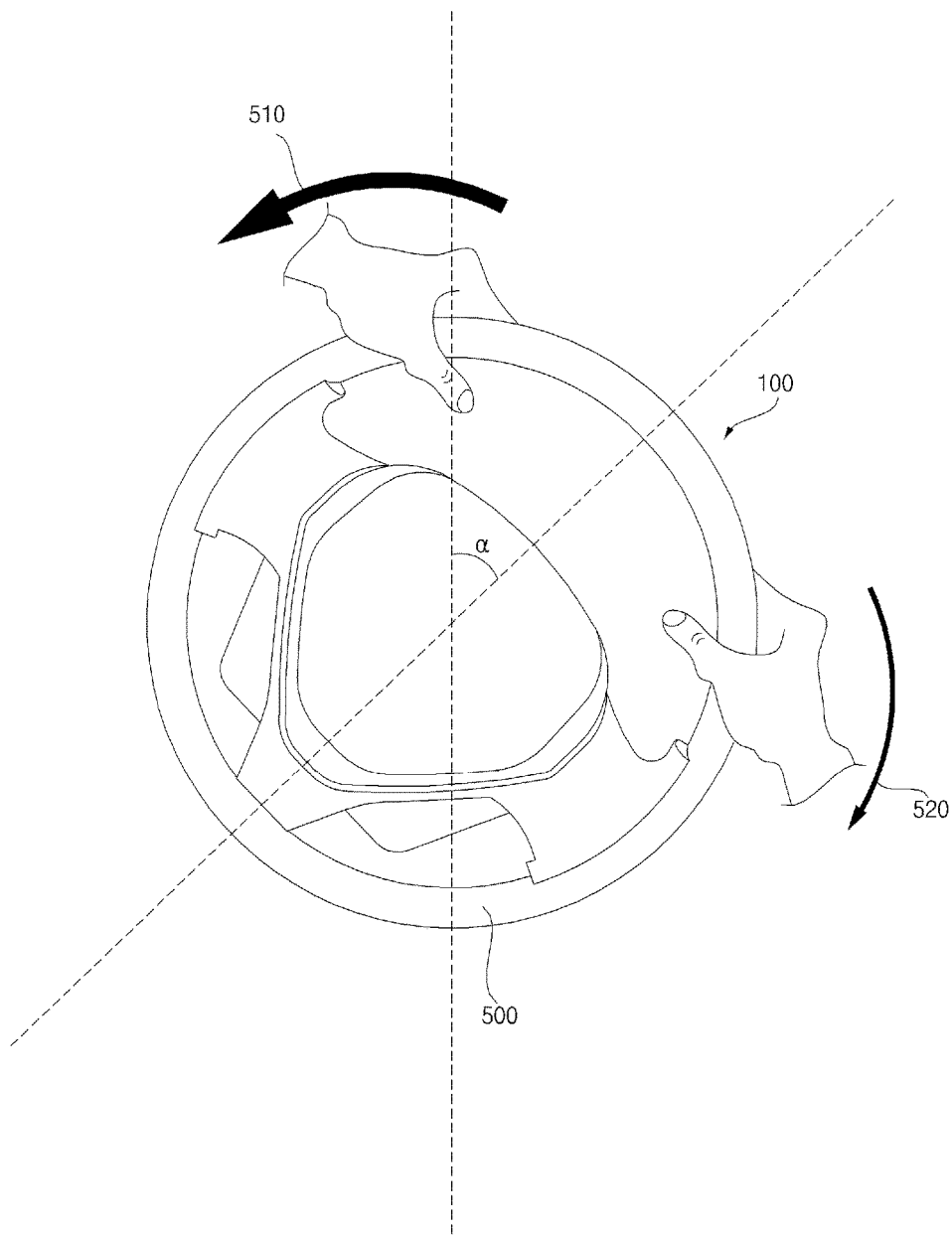
FIGS. 7A and 7B are views illustrating an operation of adjusting the manipulation sensitivity to a rotation input of the steering wheel with the steering wheel rotated by a predetermined rotational displacement such that the manipulation sensitivity to a first-direction rotation input is different from a second-direction rotation input, according to an embodiment of the present invention.
Figure 7B:
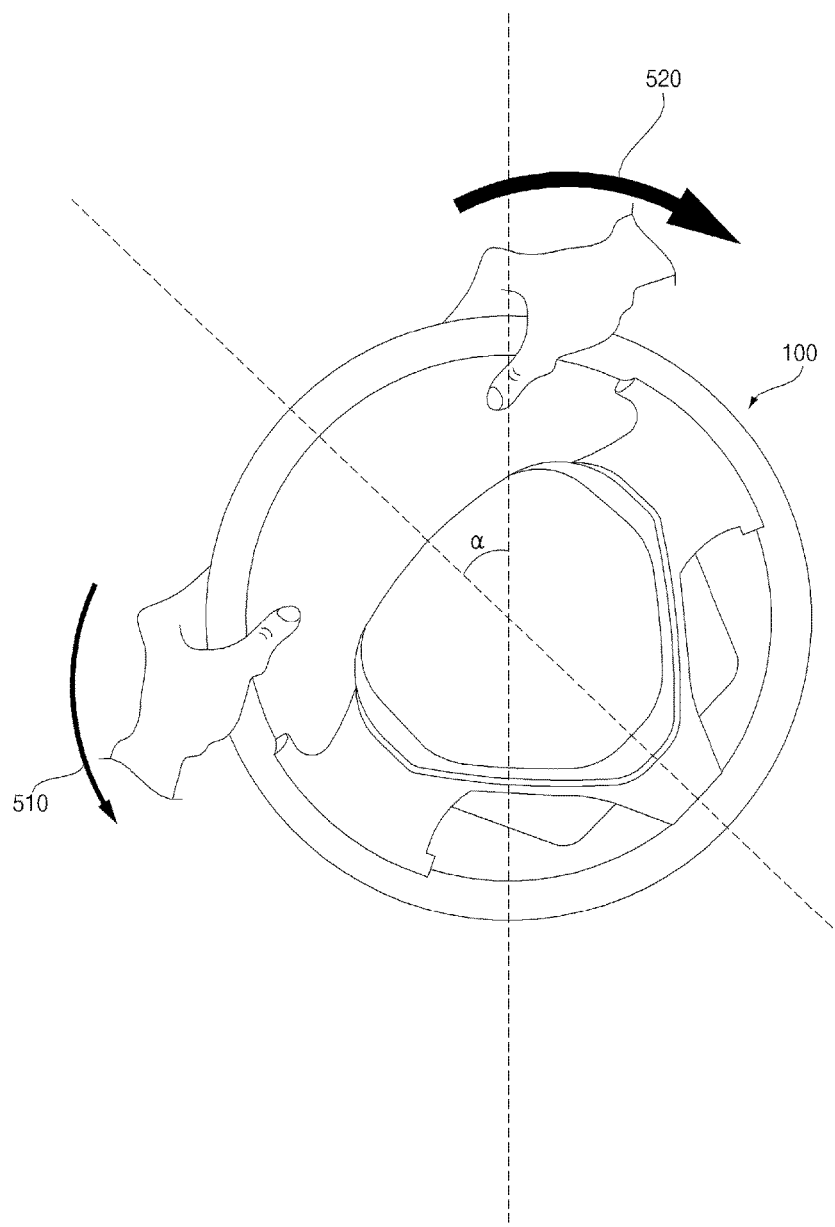

FIGS. 7A and 7B are views illustrating an operation of adjusting the manipulation sensitivity to rotation input of the steering wheel with the steering wheel rotated by a predetermined rotational displacement such that the manipulation sensitivity to first-direction rotation input is different from that to second-direction rotation input, according to an embodiment of the present invention.

The processor 170 may adjust the manipulation sensitivity of the steering wheel 500 with the steering wheel 500 rotated by a predetermined rotational displacement such that the manipulation sensitivity of the steering wheel 500 to the first-direction rotation input 510 is different from the manipulation sensitivity of the steering wheel 500 to the second-direction rotation input 520 with respect to the rotational displacement. Herein, the rotational displacement may conceptually include angular displacement.

As shown in FIG. 7A, if the first-direction rotation input 510 is received with the steering wheel 500 rotated by a first rotational displacement a in a second direction, the processor 170 may adjust the manipulation sensitivity such that the manipulation sensitivity to the first-direction rotation input 510 is lower than that to the second-direction rotation input 520 with respect to the first rotational displacement a.

Alternatively, if the first-direction rotation input 510 is received with the steering wheel 500 rotated by the first rotational displacement a in the second direction, the processor 170 may adjust the manipulation sensitivity such that the manipulation sensitivity to the first-direction rotation input 510 is higher than that to the second-direction rotation input 520 with respect to the first rotational displacement a.

As shown in FIG. 7B, if the second-direction rotation input 520 is received with the steering wheel 500 rotated by the first rotational displacement a in a first direction, the processor 170 may adjust the manipulation sensitivity such that the manipulation sensitivity to the second-direction rotation input 520 is lower than that to the first-direction rotation input 510 with respect to the first rotational displacement a.

Alternatively, if the second-direction rotation input 520 is received with the steering wheel 500 rotated by the first rotational displacement in the first direction, the processor 170 may adjust the manipulation sensitivity such that the manipulation sensitivity to the second-direction rotation input 520 is higher than that to the first-direction rotation input 510 with respect to the first rotational displacement a.

The processor 170 may adjust the manipulation sensitivity to rotation input of the steering wheel 500 based on the curve (e.g., curvature) of the road and the path (e.g., left turn or right turn) of the vehicle 700.

By adjusting the manipulation sensitivity such that the manipulation sensitivity to the leftward rotation input is different from that to the rightward rotation input as described above, incorrect steering input may be prevented, and a guide on safe driving may be provided.

Figure 8:
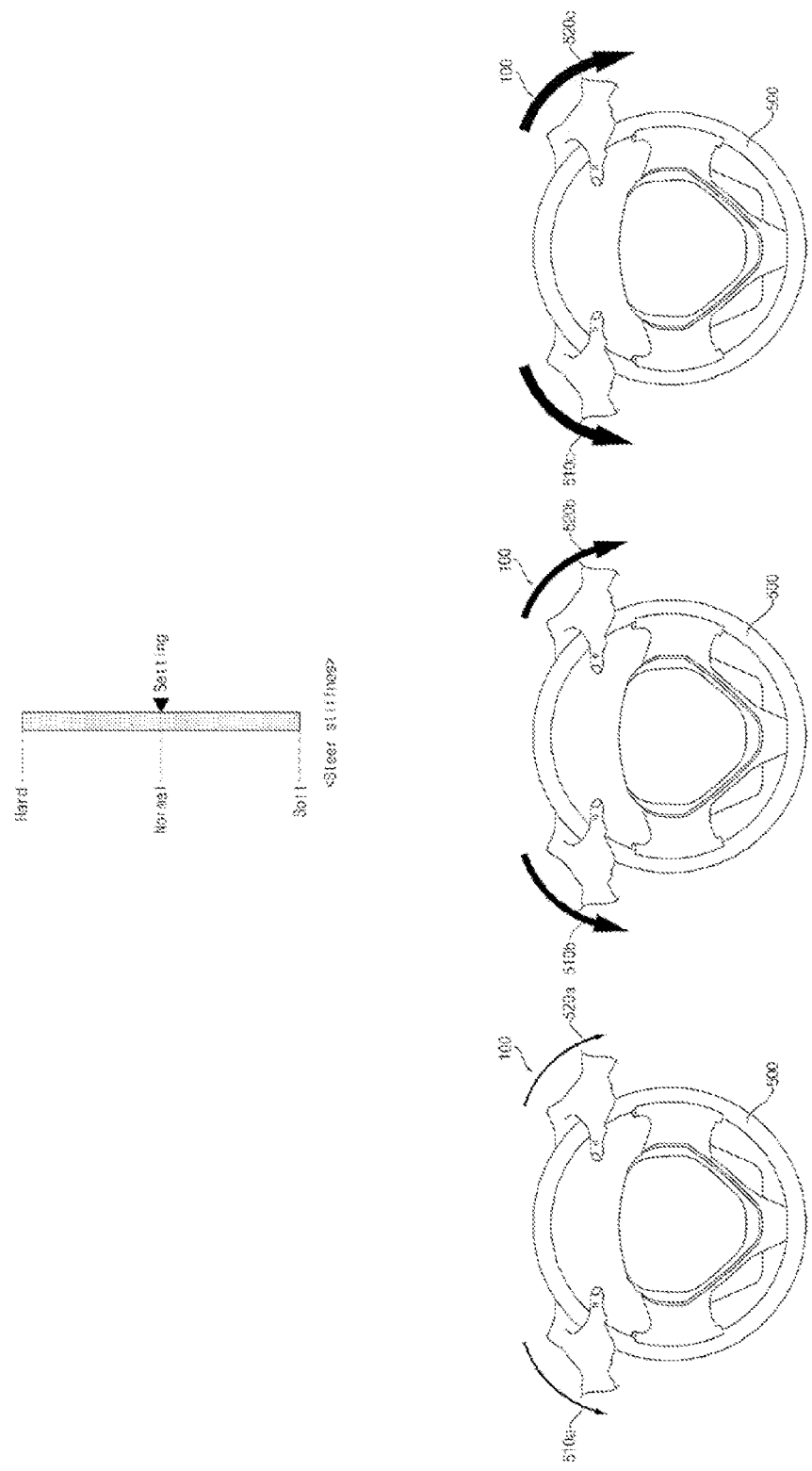
FIG. 8 is a view illustrating an operation of adjusting the manipulation sensitivity of the steering wheel to a rotation input by dividing the manipulation sensitivity into a plurality of different levels according to an embodiment of the present invention.

FIG. 8 is a view illustrating an operation of adjusting the manipulation sensitivity to rotation input of the steering wheel by dividing the manipulation sensitivity into a plurality of different levels according to an embodiment of the present invention.

Referring to FIG. 8, the processor 170 may adjust the manipulation sensitivity of the steering wheel 500 to rotation inputs 510, 520 by dividing the manipulation sensitivity into a plurality of different levels.

The manipulation sensitivity of the steering wheel 502 to rotation inputs 510, 520 may be adjusted and set by the user.

The processor 170 may adjust the manipulation sensitivity of the steering wheel 500 to one of three provided levels.

The processor 170 may adjust the manipulation sensitivity of the steering wheel 500 to rotation inputs to one of three levels according to the object information. The manipulation sensitivity of a first level 510a, 520a may be higher than that of a second level 510b, 520b, and the sensitivity of a third level 510c, 520c may be lower than that of the second level 510b, 520b.

The processor 170 may adjust the manipulation sensitivity to rotation input of the steering wheel by dividing the manipulation sensitivity into a plurality of different levels according to the type of the detected object. For example, the processor 170 may adjust the manipulation sensitivity to rotation input of the steering wheel to one of the levels according to an expected weight or size of the detected object. Specifically, as the weight or size of the object increases, the processor 170 may adjust the manipulation sensitivity to rotation input of the steering wheel to a level indicating lower manipulation sensitivity.

The processor 170 may divide the manipulation sensitivity to rotation input of the steering wheel into a plurality of different levels according to location information about the detected object. For example, the processor 170 may adjust the manipulation sensitivity to rotation input of the steering wheel to one of the levels according to a predetermined path of the vehicle 700 and proximity of the vehicle 700 to the location of a detected object.

The processor 170 may adjust the manipulation sensitivity to rotation input of the steering wheel by dividing the manipulation sensitivity into a plurality of different levels according to information indicating the distance to the detected object. For example, the processor 170 may adjust the manipulation sensitivity of the steering wheel to one of the levels according to the distance between the vehicle 700 and the object. Specifically, as the distance between the vehicle 700 and the object decreases, the processor 170 may adjust the manipulation sensitivity to rotation input of the steering wheel to a level indicating a lower manipulation sensitivity or a higher manipulation sensitivity among the provided levels.

The processor 170 may adjust the manipulation sensitivity to rotation input of the steering wheel by dividing the manipulation sensitivity into a plurality of different levels according to speed information about the detected object. For example, the processor 170 may adjust the manipulation sensitivity of the steering wheel to one of the levels according to the speed of the vehicle 700 relative to that of the object. Specifically, as the relative speed of the vehicle 700 with respect to the object increases, processor 170 may adjust the manipulation sensitivity to rotation input of the steering wheel to a level indicating a lower manipulation sensitivity or a higher manipulation sensitivity.

As described above, the manipulation sensitivity can be adjusted according to the object information. Accordingly, the manipulation sensitivity to input of the steering wheel may be properly changed depending on the driving situation. Thereby, proper manipulation input may be realized.

Figure 9:
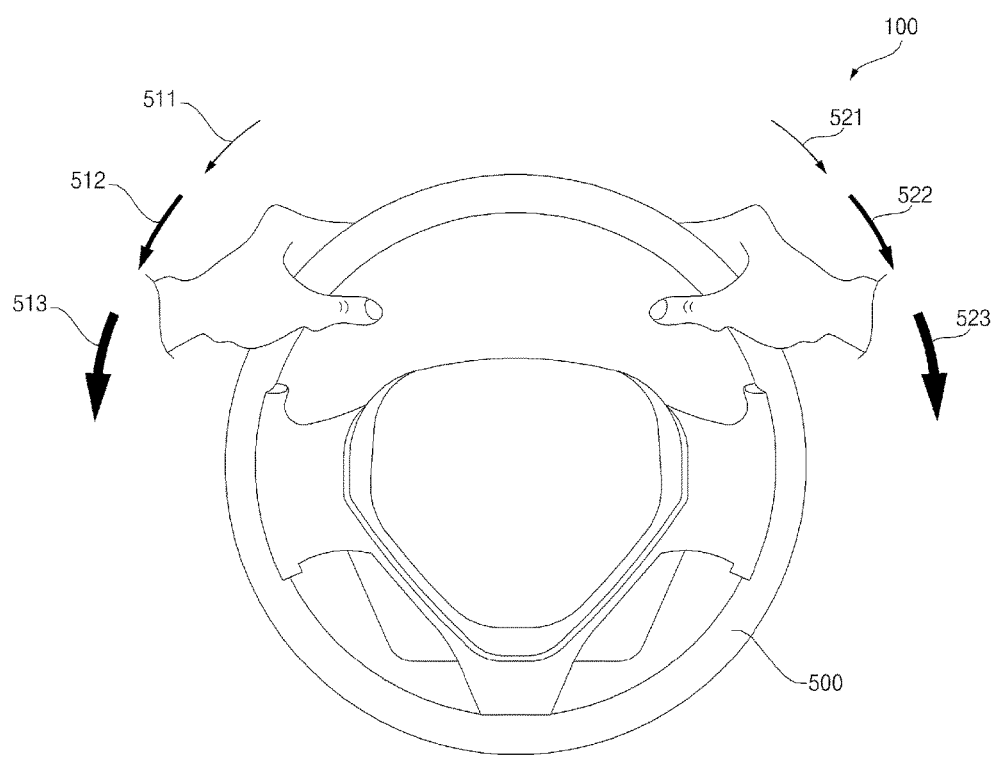
FIG. 9 is a view illustrating an operation of adjusting manipulation sensitivity to a rotation input of the steering wheel when a rotational displacement of the steering wheel increases, according to an embodiment of the present invention.

FIG. 9 is a view illustrating an operation of adjusting manipulation sensitivity to rotation input of the steering wheel when a rotational displacement of the steering wheel increases, according to an embodiment of the present invention.

Referring to FIG. 9, the processor 170 may adjust the manipulation sensitivity to rotation input of the steering wheel according to rotational displacement. For example, as the rotational displacement of the steering wheel 500 increases according to rotation input provided through the steering wheel 500, the processor 170 may gradually lower the manipulation sensitivity to rotation input of the steering wheel.

For example, if the steering wheel is rotated by a first rotational displacement in a first direction of rotation or a second direction of rotation by rotation input provided through the steering wheel, the processor 170 may adjust the manipulation sensitivity of the steering wheel to a first level 511, 521.

For example, if the steering wheel is rotated by a second rotational displacement in the first direction or second direction of rotation by rotation input provided through the steering wheel, the processor 170 may adjust the manipulation sensitivity of the steering wheel to a second level 512, 522.

For example, if the steering wheel is rotated by a third rotational displacement in the first or second direction of rotation by rotation input provided through the steering wheel, the processor 170 may adjust the manipulation sensitivity of the steering wheel to a third level 513, 523.

According to an embodiment, the processor 170 may adjust the manipulation sensitivity of the steering wheel such that the manipulation sensitivity of the steering wheel according to rotational displacement in the first direction of rotation is different from the manipulation sensitivity of the steering wheel according to rotational displacement in the second direction of rotation.

For example, if the steering wheel is rotated by a first rotational displacement in the first direction of rotation by rotation input provided through the steering wheel, the processor 170 may adjust the manipulation sensitivity of the steering wheel to the first level 511. In addition, if the steering wheel is rotated by the first rotational displacement in the second direction of rotation by rotation input provided through the steering wheel, the processor 170 may adjust the manipulation sensitivity of the steering wheel to the second level 522.

Meanwhile, as the rotational displacement of the steering wheel increases according to rotation input provided through the steering wheel, the processor 170 may increase the manipulation sensitivity of the steering wheel.

Adjusting the manipulation sensitivity in different manners according to rotational displacements as described above may allow the user to recognize an extent to which rotation input is applied and prevent sudden steering input, thereby preventing an accident.

Figure 10:
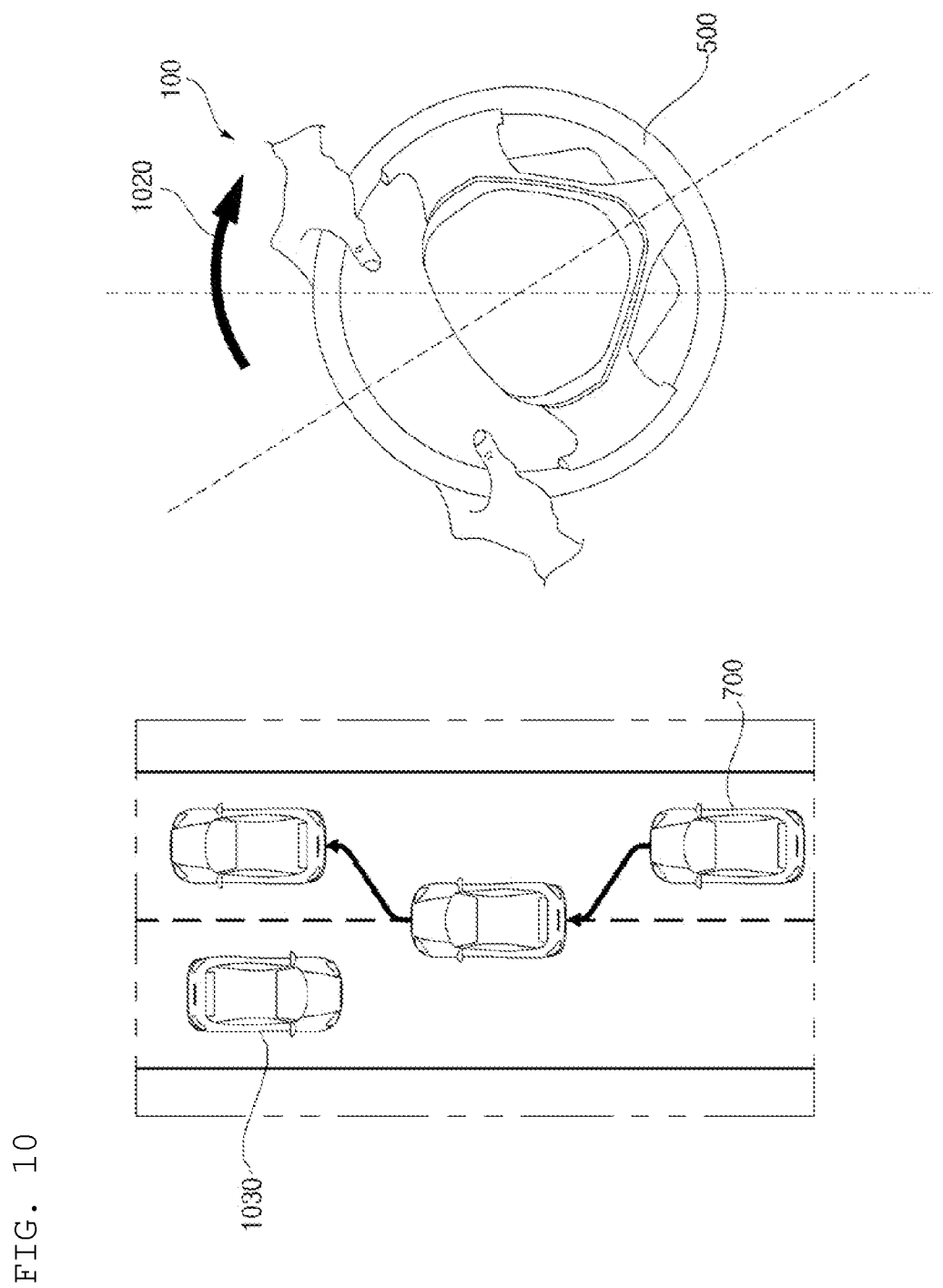
FIG. 10 is a view illustrating an operation of a steering input apparatus performed when a rotational displacement according to a rotation input of the steering wheel is greater than or equal to a reference value, according to an embodiment of the present invention.

FIG. 10 is a view illustrating an operation of a steering input apparatus performed when a rotational displacement according to rotation input of the steering wheel is greater than or equal to a reference value, according to an embodiment of the present invention.

Referring to FIG. 10, if the magnitude of rotational displacement of the steering wheel in the first direction is greater than or equal to a reference value, the processor 170 may control the power provision unit 160 to rotate the steering wheel by a predetermined displacement 1020 in the second direction.

If the magnitude of rotational displacement of the steering wheel in the second direction is greater than or equal to a reference value, the processor 170 may control the power provision unit 160 such that the steering wheel rotates by a predetermined displacement in the first direction.

When collision between the vehicle 700 and an object 1030 or displacement of the vehicle 700 from the driving road is expected during travel of the vehicle according to rotation input through the steering wheel, the processor 170 may forcibly control the steering wheel to rotate in a direction 1020 opposite to the direction of the rotation input to prevent an accident.

Figure 11:
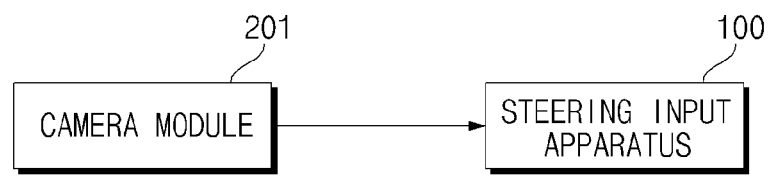
FIG. 11 is a diagram illustrating an operation of receiving information about a detected object in front of a vehicle according to an embodiment of the present invention.

FIG. 11 is a diagram illustrating an operation of receiving information about a detected object in front of a vehicle according to an embodiment of the present invention.

Referring to FIG. 11, the processor 170 may receive, through the interface unit 130, information about an object located in front of the vehicle from the camera module 201 configured to acquire front view images of the vehicle.

Herein, the camera unit included in the camera module 201 may be one of the camera units 200a to 200f described above with reference to FIGS. 2A to 2F.

For example, the camera unit 200a may be a mono camera unit. The image processor 202 may detect, verify and track an object located in front of the vehicle based on the vehicle front view image acquired by the mono camera unit. Herein, the vehicle front view image may be a mono image.

For example, the camera unit 200b may be a stereo camera unit. The image processor 202 may detect, verify and track an object located in front of the vehicle based on the vehicle front view image acquired by the stereo camera unit. Herein, the vehicle front view image may be a stereo image.

For example, the camera unit 200c may be an around view camera unit. The image processor 202 may detect, verify and track an object located in front of the vehicle based on the vehicle front view image acquired by the around view camera unit. Herein, the vehicle front view image may correspond to one region of an around view image. Alternatively, the vehicle front view image may be an image acquired by a camera 221d configured to capture a vehicle front view image among the other cameras 221a, 221b and 221c.

For example, the camera unit 200d, 200e, 200f may be an omnidirectional camera unit. The image processor 202 may detect, verify and track an object located in front of the vehicle based on a vehicle front view image acquired by the omnidirectional camera unit. Herein, the vehicle front view image may correspond to one region of an omnidirectional image. Alternatively, the vehicle front image may be an image acquired by one camera facing forward of the vehicle among a plurality of cameras.

The object may include one of a lane, another vehicle, a pedestrian, a light, a traffic sign, a road surface and a structure.

For example, the object may include another vehicle (e.g., a large vehicle such as a truck, a bus, a tanker and a trailer), a median barrier, a median strip, a guardrail, a street tree, or a streetlight.

For example, the object may include light infiltrating the vehicle, a pothole in the driving lane of the vehicle, a slippery section, or a construction section (e.g., construction equipment, an under-construction sign).

The processor 170 may adjust the manipulation sensitivity to rotation input of the steering wheel based on the information about the object located in front of the vehicle.

FIGS. 12 to 15 illustrate an operation of adjusting manipulation sensitivity to rotation input of the steering wheel based on driving lane information according to an embodiment of the present invention.

Referring to FIGS. 12 to 15, the processor 170 may receive driving lane information through the interface unit 130. The processor 170 may adjust the manipulation sensitivity to rotation input of the steering wheel based on the driving lane information.

Meanwhile, the processor 170 may receive travel speed information through the interface unit 130. The processor 170 may adjust the manipulation sensitivity to rotation input of the steering wheel based on the travel speed information as well.

The processor 170 may acquire the driving lane information from the camera module 201. The image processor 202 of the camera module 201 may detect a drive lane based on a vehicle front view image. The image processor 202 may generate straight lane information, curved lane information and lane curvature information based on the pattern of the driving lane. Herein, the straight lane information, curved lane information and lane curvature information may be referred to as driving lane information. The processor 170 may receive the driving lane information from the image processor 202.

The processor 170 may acquire the driving lane information from the navigation information.

Figure 12:
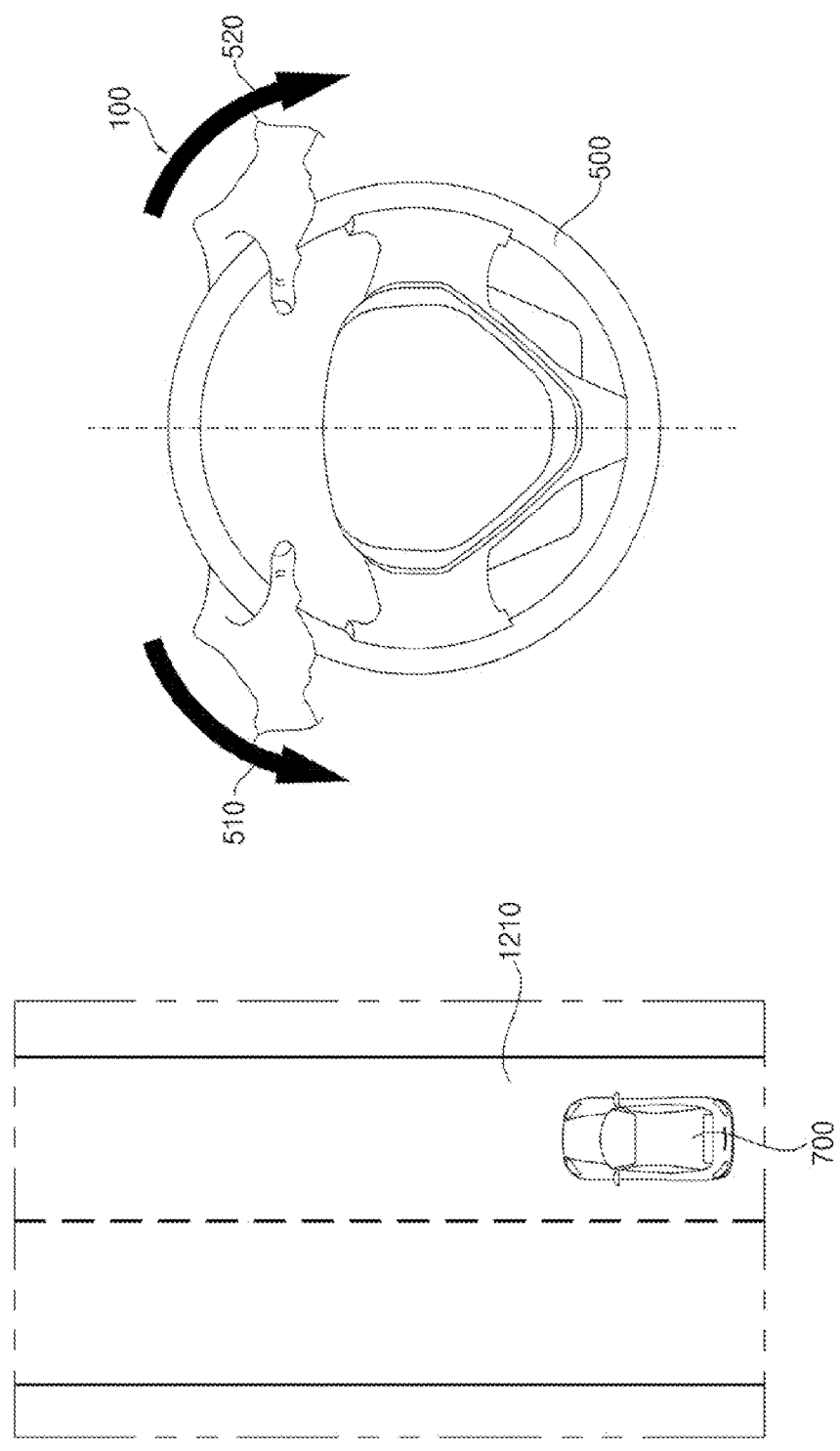
FIGS. 12 to 15 illustrate an operation of adjusting manipulation sensitivity to a rotation input of the steering wheel based on driving lane information according to an embodiment of the present invention.

As illustrated in FIG. 12, if information indicating a straight lane 1210 is received as the driving lane information, the processor 170 may adjust the manipulation sensitivity to rotation input of the steering wheel 510, 520 based on the straight lane information.

The processor 170 may adjust the manipulation sensitivity to rotation input of the steering wheel 510, 520 based on the travel speed information as well.

For example, if the driving lane is the straight lane 1210, and the travel speed is higher than or equal to a reference speed, the processor 170 may adjust the manipulation sensitivity to rotation input of the steering wheel 510, 520 based on the travel speed. Specifically, if the driving lane is the straight lane 1210, and the travel speed is higher than or equal to the reference speed, the processor 170 may lower the manipulation sensitivity to rotation input of the steering wheel 510, 520 as the travel speed increases.

By adjusting the manipulation sensitivity to rotation input of the steering wheel as described above, stability of high-speed driving may be enhanced.

Figure 13:
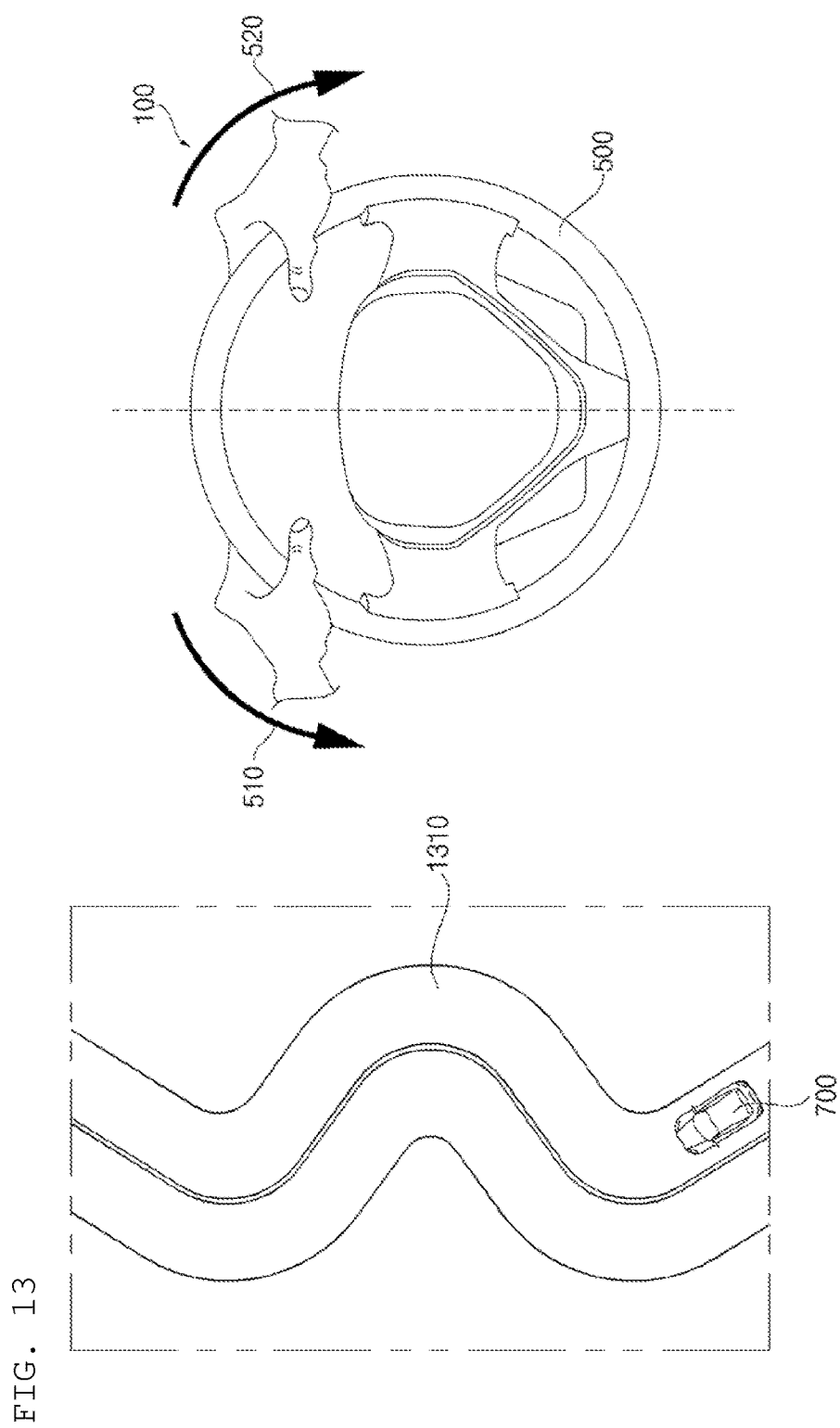

As illustrated in FIG. 13, if curved lane information is received as the driving lane information, the processor 170 may adjust the manipulation sensitivity to rotation input of the steering wheel based on the curved lane information.

The processor 170 may adjust the manipulation sensitivity to rotation input of the steering wheel 510, 520 based on the travel speed information as well.

For example, if the driving lane is a curved lane 1310, the processor 170 may adjust the manipulation sensitivity to rotation input of the steering wheel 510, 520 such that the manipulation sensitivity is higher than the manipulation sensitivity provided for the driving on a straight lane. Thereby, dynamic steering control may be implemented.

For example, if the driving lane is the curved lane 1310, the processor 170 may adjust the manipulation sensitivity to rotation input of the steering wheel 510, 520 according to the curvature of the curved lane 1310. Specifically, the processor 170 may adjust the manipulation sensitivity such that the manipulation sensitivity to rotation inputs other than the rotation input corresponding to the curvature is lower than the manipulation sensitivity to the rotation input of the steering wheel corresponding to the curvature.

The processor 170 may receive position information about the vehicle 700 through the interface unit 130. For example, the processor 170 may receive "oversteer" or "understeer" status information about the vehicle 700 through the interface unit 130.

Figure 14:
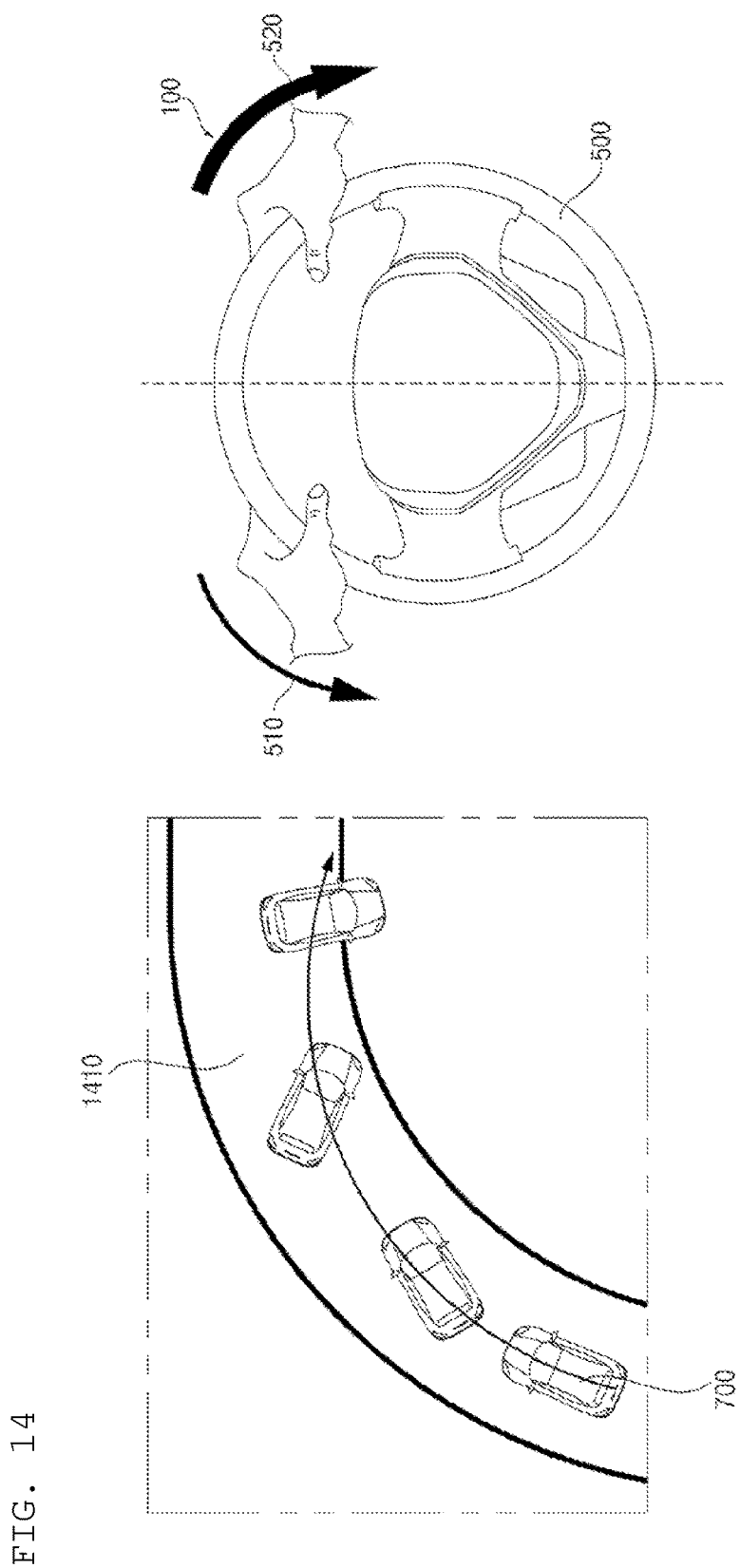

As illustrated in FIG. 14, if oversteer 1410 occurs during travel of the vehicle 700 along a curved lane, the processor 170 may adjust the manipulation sensitivity to rotation input of the steering wheel such that the manipulation sensitivity to rotation input of the steering wheel 520 corresponding to a direction in which the oversteer 1410 occurs becomes lower than the manipulation sensitivity to rotation input of the steering wheel 510 corresponding to the direction opposite to the direction in which oversteer 1410 occurs.

Figure 15:
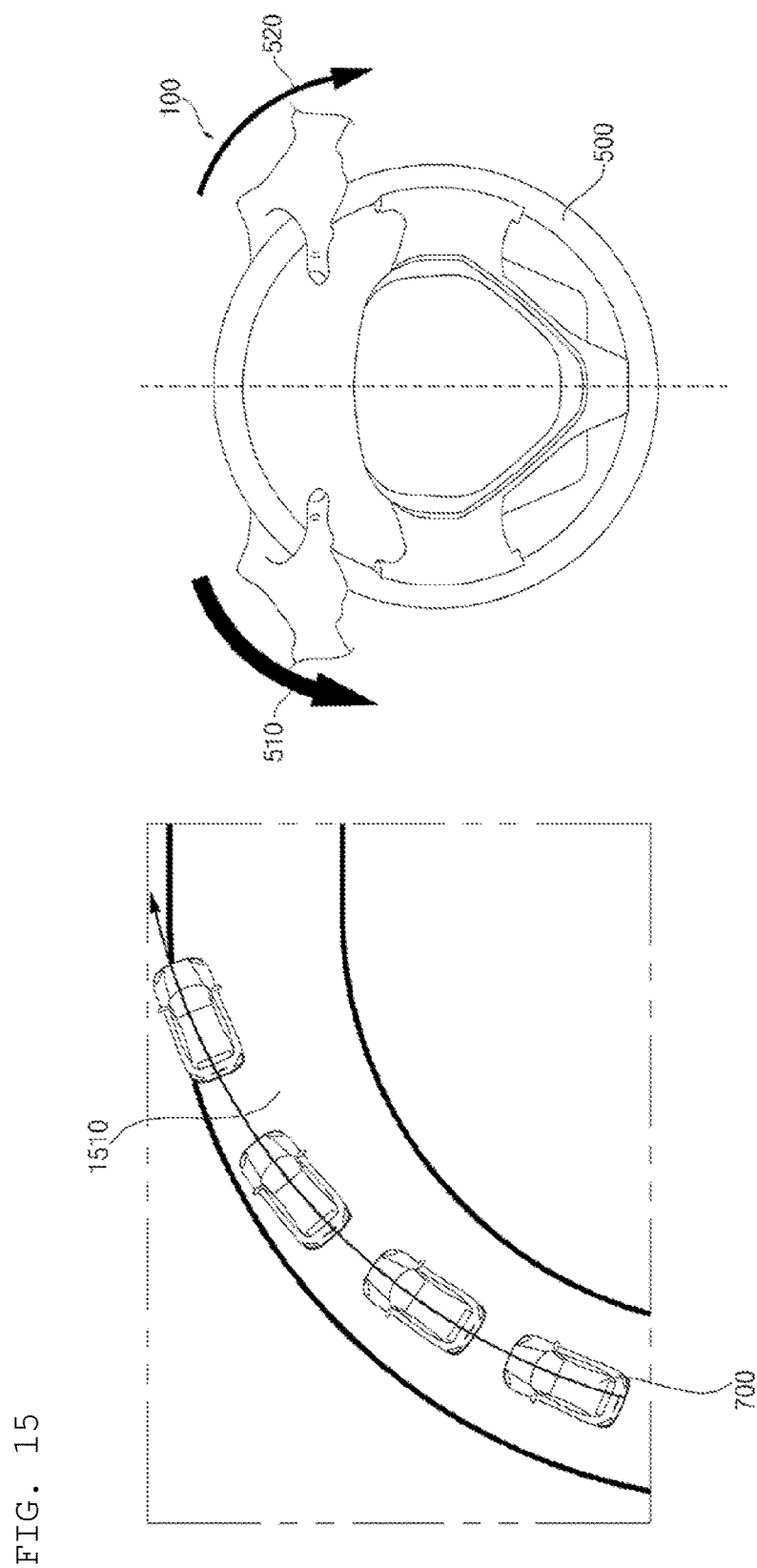

As illustrated in FIG. 15, if understeer 1510 occurs during travel of the vehicle 700 along a curved lane, the processor 170 may adjust the manipulation sensitivity to rotation input of the steering wheel such that the manipulation sensitivity to rotation input of the steering wheel 510 corresponding to a direction in which understeer 1510 occurs becomes lower than the manipulation sensitivity to rotation input of the steering wheel 520 corresponding to the direction opposite to the direction in which understeer 1510 occurs.

As such, when oversteer or understeer occurs, steering input for overcoming the oversteer or understeer may be realized by adjusting the manipulation sensitivity to rotation input of the steering wheel.

FIGS. 16 and 17 illustrate an operation of adjusting the manipulation sensitivity to rotation input of the steering wheel based on wind information according to an embodiment of the present invention.

Referring to FIG. 16, the processor 170 may receive information indicating a strong wind section through the interface unit 130.

The processor 170 may acquire the strong wind section information from the camera module 201. Herein, the strong wind section may be a bridge or a tunnel entrance or exit.

The image processor 202 of the camera module 201 may detect a bridge 1610 based on a feature point of the bridge structure in a vehicle front view image. The image processor 202 may detect a tunnel entrance or exit based on a feature point of a tunnel shape or brightness.

The processor 170 may acquire the strong wind section information from the navigation information.

The processor 170 may adjust the manipulation sensitivity to rotation input of the steering wheel based on the strong wind section information.

For example, if strong wind section information is received, the processor 170 may adjust the manipulation sensitivity of the steering wheel such that the manipulation sensitivity to rotation input of the steering wheel 510, 520 is lowered from the manipulation sensitivity of the steering wheel provided on a road which is not in the strong wind section.

Referring to FIG. 17, the processor 170 may receive wind direction information or wind speed information through the interface unit 130.

The processor 170 may acquire the wind direction information or wind speed information from the camera module 201.

The image processor 202 of the camera module 201 may detect a wind vane or wind cone 1710 in a surroundings-of-vehicle image. The image processor 202 may generate wind direction information based on the direction in which the wind vane or wind cone 1710 faces.

The image processor 2020 may detect an anemometer or wind cone 1710 in a surroundings-of-vehicle image. The image processor 202 may generate wind speed information based on the rate of rotation of the wings of the anemometer or an angle of the wind cone 1710 with respect to the ground.

The image processor 202 may detect snow, falling leaves, petals of cherry blossoms, and the like in a surroundings-of-vehicle image. The image processor 202 may generate wind direction information or wind speed information based on a pattern of movement of the snow, falling leaves, or petals of the cherry blossoms in the air. The snow, falling leaves and petals of the cherry blossoms may be referred to as floating matter.

The processor 170 may receive wind direction information or wind speed information from the sensing unit 760.

The processor 170 may adjust the manipulation sensitivity to rotation input of the steering wheel such that the manipulation sensitivity to rotation input of the steering wheel 520 corresponding to the windward side of the vehicle becomes lower than the manipulation sensitivity to rotation input of the steering wheel 510 corresponding to the opposite side of the vehicle.

The processor 170 may adjust the manipulation sensitivity to rotation input of the steering wheel based on the wind speed. For example, the processor 170 may decrease the manipulation sensitivity to rotation input of the steering wheel as the wind speed increases.

By adjusting the manipulation sensitivity to rotation input of the steering wheel according to wind strength, wind direction or wind speed, a guide on steering input may be provided such that stable driving can be performed despite the wind.

FIGS. 18A to 19D illustrate an operation of adjusting the manipulation sensitivity to rotation input of the steering wheel based on various kinds of object information according to an embodiment of the present invention.

Figure 18A:
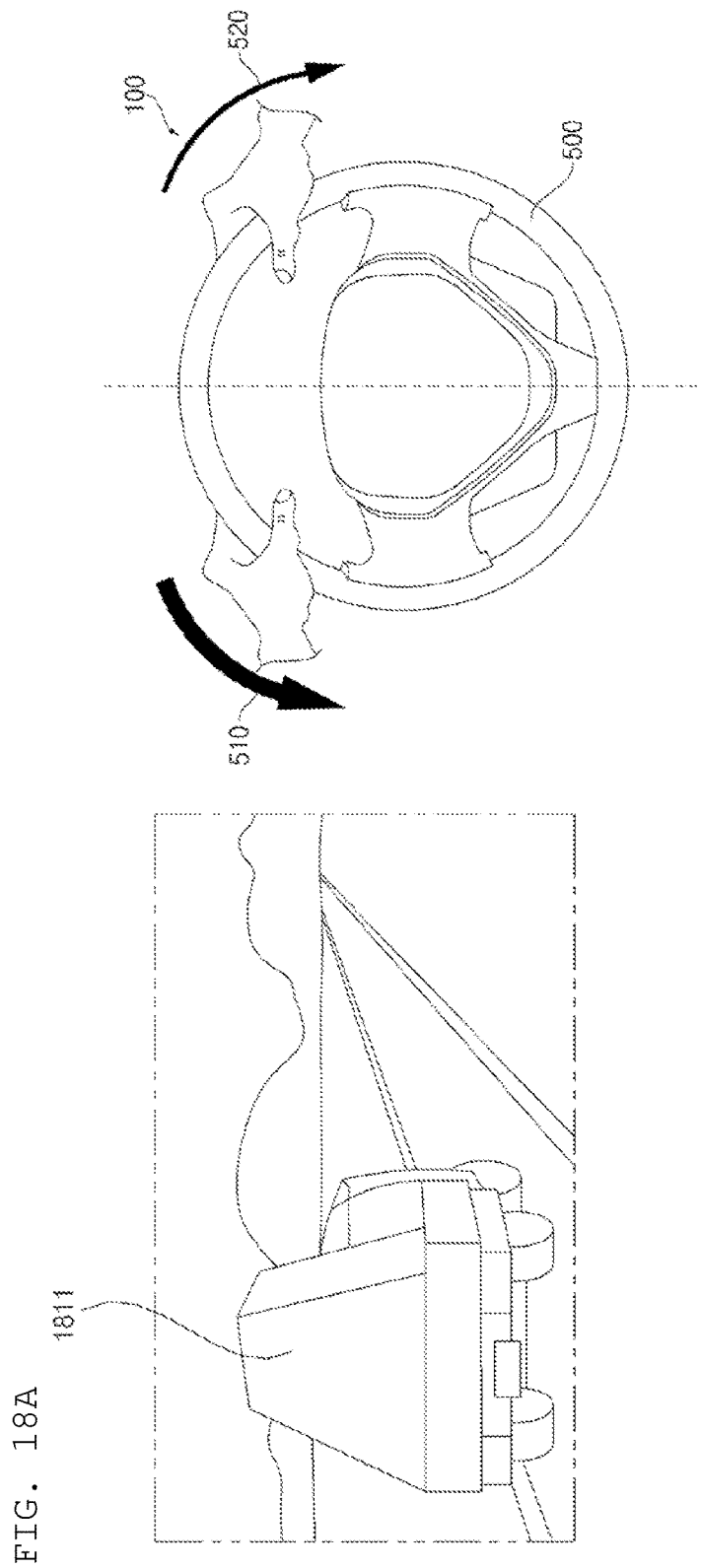
FIGS. 18A to 19D illustrate an operation of adjusting the manipulation sensitivity to a rotation input of the steering wheel based on various kinds of object information according to an embodiment of the present invention.

Referring to FIG. 18A, the processor 170 may receive information indicating detection of a large vehicle 1811 as object information through the interface unit 130.

Upon receiving the information indicating the large vehicle 1811, the processor 170 may adjust the manipulation sensitivity to rotation input of the steering wheel based on the information indicating the large vehicle 1811.

For example, when the vehicle 700 travels on one side of the large vehicle 1811, the processor may adjust the manipulation sensitivity to rotation input of the steering wheel such that the manipulation sensitivity is lower than when the large vehicle 1811 is not present.

For example, the processor 170 may adjust the manipulation sensitivity to rotation input of the steering wheel such that the manipulation sensitivity to rotation input of the steering wheel 510 corresponding to a direction in which the vehicle 700 faces the large vehicle 1811 is lower than the manipulation sensitivity to rotation input of the steering wheel 520 corresponding to the direction opposite to the direction in which the vehicle 700 faces the large vehicle 1811.

In this case, as the vehicle 700 approaches the large vehicle 1811, the processor 170 may lower the manipulation sensitivity to rotation input of the steering wheel 510 corresponding to the direction in which the vehicle 700 faces the large vehicle 1811 according to the distance between the vehicle 700 and the large vehicle 1811 in the length direction or width direction of the vehicle.

Figure 18B:
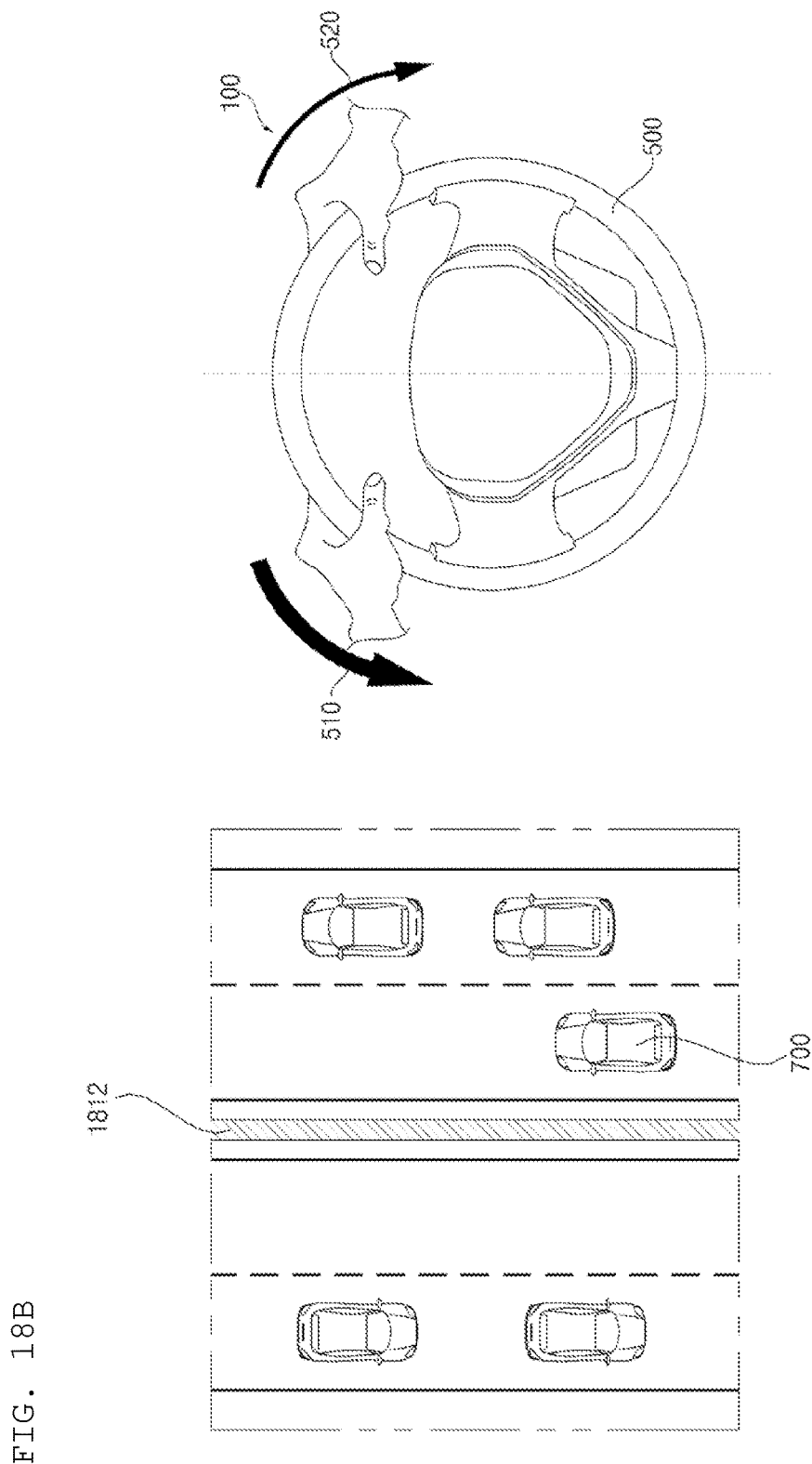

Referring to FIG. 18B, the processor 170 may receive information indicating detection of a median barrier 1812 as object information through the interface unit 130.

Upon receiving the information indicating the median barrier 1812, the processor 170 may adjust the manipulation sensitivity to rotation input of the steering wheel based on the information indicating the median barrier 1812.

For example, the processor 170 may adjust the manipulation sensitivity to rotation input of the steering wheel such that the manipulation sensitivity to rotation input of the steering wheel 510 corresponding to a direction in which the vehicle 700 faces the median barrier 1812 becomes lower than the manipulation sensitivity to rotation input of the steering wheel 520 corresponding to the direction opposite to the direction in which the vehicle 700 faces the median barrier 1812.

In this case, as the vehicle 700 approaches the median barrier 1812, the processor 170 may lower the manipulation sensitivity to rotation input of the steering wheel 510 corresponding to the direction in which the vehicle 700 faces the median barrier 1812 according to the distance between the vehicle 700 and the median barrier 1812 in the width direction of the vehicle.

Referring to FIG. 18C, the processor 170 may receive information indicating detection of a median strip 1813 as object information through the interface unit 130.

Upon receiving the information indicating the median strip 1813, the processor 170 may adjust the manipulation sensitivity to rotation input of the steering wheel based on the information indicating the median strip 1813.

For example, the processor 170 may adjust the manipulation sensitivity to rotation input of the steering wheel such that the manipulation sensitivity to rotation input of the steering wheel 510 corresponding to a direction in which the vehicle 700 faces the median strip 1813 becomes lower than the manipulation sensitivity to rotation input of the steering wheel 520 corresponding to the direction opposite to the direction in which the vehicle 700 faces the median strip 1813.

In this case, as the vehicle 700 approaches the median strip 1813, the processor 170 may lower the manipulation sensitivity to rotation input of the steering wheel 510 corresponding to the direction in which the vehicle 700 faces the median strip 1813 according to the distance between the vehicle 700 and the median barrier 1812 in the width direction of the vehicle.

Referring to FIG. 18D, the processor 170 may receive information indicating detection of a guardrail 1814, a tree or a streetlight as object information through the interface unit 130.

Upon receiving the information indicating the guardrail 1814, tree or streetlight, the processor 170 may adjust the manipulation sensitivity to rotation input of the steering wheel based on the information indicating the guardrail 1814, street tree or streetlight.

For example, the processor 170 may adjust the manipulation sensitivity to rotation input of the steering wheel such that the manipulation sensitivity to rotation input of the steering wheel 510 corresponding to a direction in which the vehicle 700 faces the guardrail 1814, tree or streetlight becomes lower than the manipulation sensitivity to rotation input of the steering wheel 520 corresponding to the direction opposite to the direction in which the vehicle 700 faces the guardrail 1814, tree or streetlight.

In this case, as the vehicle 700 approaches the guardrail 1814, tree or streetlight, the processor 170 may lower the manipulation sensitivity to rotation input of the steering wheel 510 corresponding to the direction in which the vehicle 700 faces the guardrail 1814, tree or streetlight according to the distance between the vehicle 700 and the guardrail 1814, tree or streetlight in the width direction of the vehicle.

Referring to FIG. 19A, the processor 170 may receive information indicating detection of light 1911 infiltrating the vehicle as object information through the interface unit 130. Herein, the light 1911 may be sunlight or light from a headlamp, a streetlight, or the like.

Upon receiving the information indicating that the light 1911 infiltrating into the vehicle, the processor 170 may adjust the manipulation sensitivity to rotation input of the steering wheel based on the information indicating the light 1911.

For example, if the information indicating the light 1911 is received, the processor 170 may adjust the manipulation sensitivity to input of the steering wheel 510, 520 to a lower level than when the information indicating the light 1911 is not received.

In this case, as the vehicle 700 approaches the source of the light 1911 infiltrating the vehicle, the processor 170 may gradually lower the manipulation sensitivity to input of the steering wheel according to the distance between the vehicle 700 and the light source in the length direction of the vehicle.

Figure 19B:
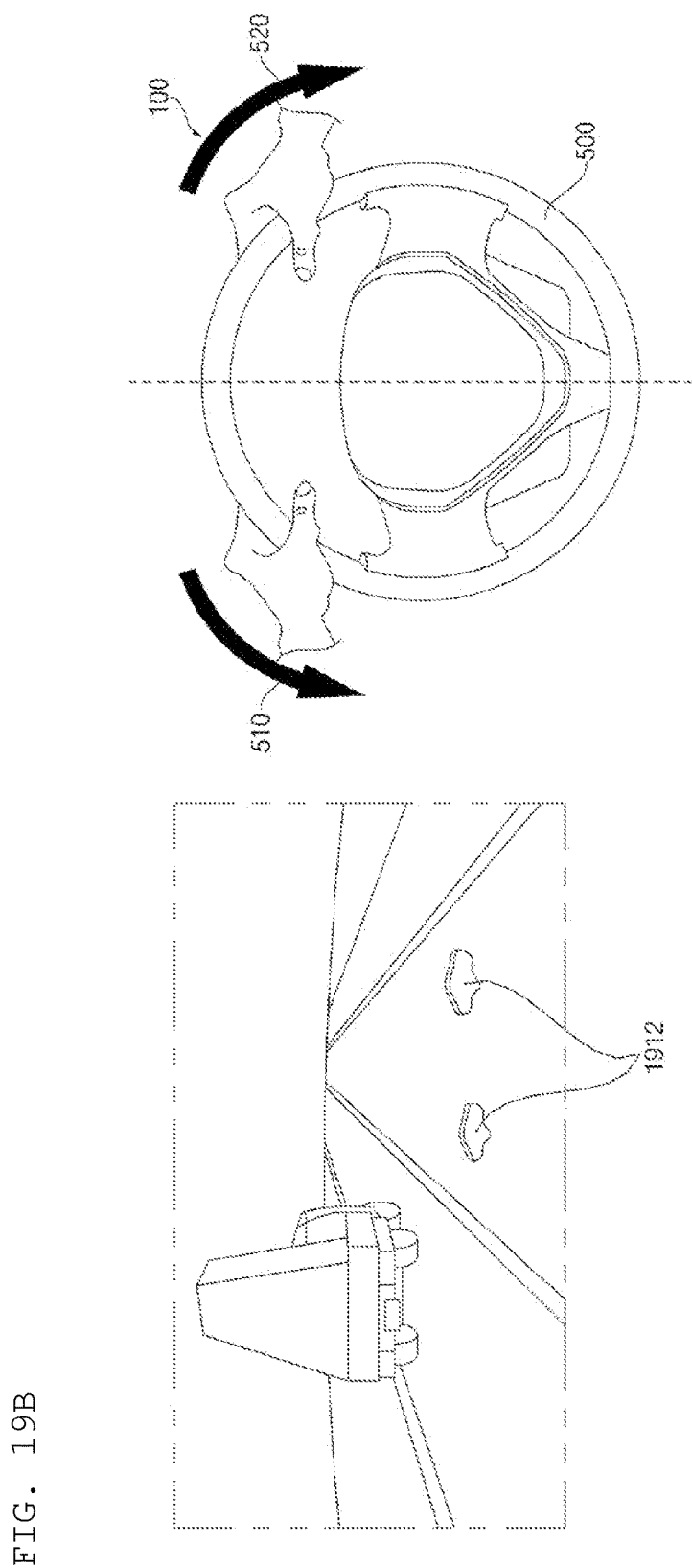

Referring to FIG. 19B, the processor 170 may receive information indicating detection of a pothole 1912 as object information through the interface unit 130.

Upon receiving the information indicating the pothole 1912, the processor 170 may adjust the manipulation sensitivity to rotation input of the steering wheel based on the information indicating the pothole 1912.

For example, if the information indicating the pothole 1912 is received, the processor 170 may adjust the manipulation sensitivity to steering wheel inputs 510, 520 such that the manipulation sensitivity is lower than when the information indicating the pothole 1912 is not received.

In this case, as the vehicle 700 approaches the pothole 1912, the processor 170 may gradually lower the manipulation sensitivity to the steering wheel inputs according to the distance between the vehicle 700 and the pothole 1912 in the length direction of the vehicle.

Referring to FIG. 19C, the processor 170 may receive information indicating detection of a construction section 1913 as object information through the interface unit 130.

Upon receiving the information indicating the construction section 1913, the processor 170 may adjust the manipulation sensitivity to rotation input of the steering wheel based on the information indicating the construction section 1913.

For example, if the information indicating the construction section 1913 is received, the processor 170 may adjust the manipulation sensitivity to steering wheel inputs 510, 520 such that the manipulation sensitivity is lower than when the information indicating the construction section 1913 is not received.

For example, the processor 170 may adjust the manipulation sensitivity to rotation input of the steering wheel such that the manipulation sensitivity to rotation input of the steering wheel 510 corresponding to a direction in which the vehicle 700 faces the construction section 1913 becomes lower than the manipulation sensitivity to rotation input of the steering wheel 520 corresponding to the direction opposite to the direction in which the vehicle 700 faces the construction section 1913.

In this case, as the vehicle 700 approaches the construction section 1913, the processor 170 may gradually lower the manipulation sensitivity to the steering wheel input according to the distance between the vehicle 700 and the construction section 1913 in the length direction or width direction of the vehicle.

Referring to FIG. 19D, the processor 170 may receive information indicating detection of a slippery section 1914 as object information through the interface unit 130. Herein, the slippery section 1914 may be a puddle, a frozen road, or a snowy road.

Upon receiving the information indicating the slippery section 1914, the processor 170 may adjust the manipulation sensitivity to rotation input of the steering wheel based on the information indicating the slippery section 1914.

For example, if the information indicating the slippery section 1914 is received, the processor 170 may adjust the manipulation sensitivity to steering wheel input 510, 520 such that the manipulation sensitivity is lower than when the information indicating the slippery section 1914 is not received.

For example, the processor 170 may adjust the manipulation sensitivity to rotation input of the steering wheel such that the manipulation sensitivity to rotation input of the steering wheel 510 corresponding to a direction in which the vehicle 700 faces the slippery section 1914 becomes lower than the manipulation sensitivity to rotation input of the steering wheel 520 corresponding to the direction opposite to the direction in which the vehicle 700 faces the slippery section 1914.

In this case, as the vehicle 700 approaches the slippery section 1914, the processor 170 may gradually lower the manipulation sensitivity to steering wheel input according to the distance between the vehicle 700 and the slippery section 1914 in the length direction or width direction of the vehicle.

Meanwhile, the processor 170 may receive weather information through the interface unit 130. The weather information may be acquired through the communication unit 710 of the vehicle 700. The weather information may be acquired from the camera module 201. The image processor 202 of the camera module 201 may detect the weather information based on a vehicle front image or a surroundings-of-vehicle image. Herein, the weather information may be information indicating rain, snow or fog.

Upon receiving the weather information, the processor 170 may adjust the manipulation sensitivity to rotation input of the steering wheel based on the weather information.

For example, if the weather information is received, the processor 170 may adjust the manipulation sensitivity to steering wheel input such that the manipulation sensitivity is lower than when the weather information is not received.

Figure 20:
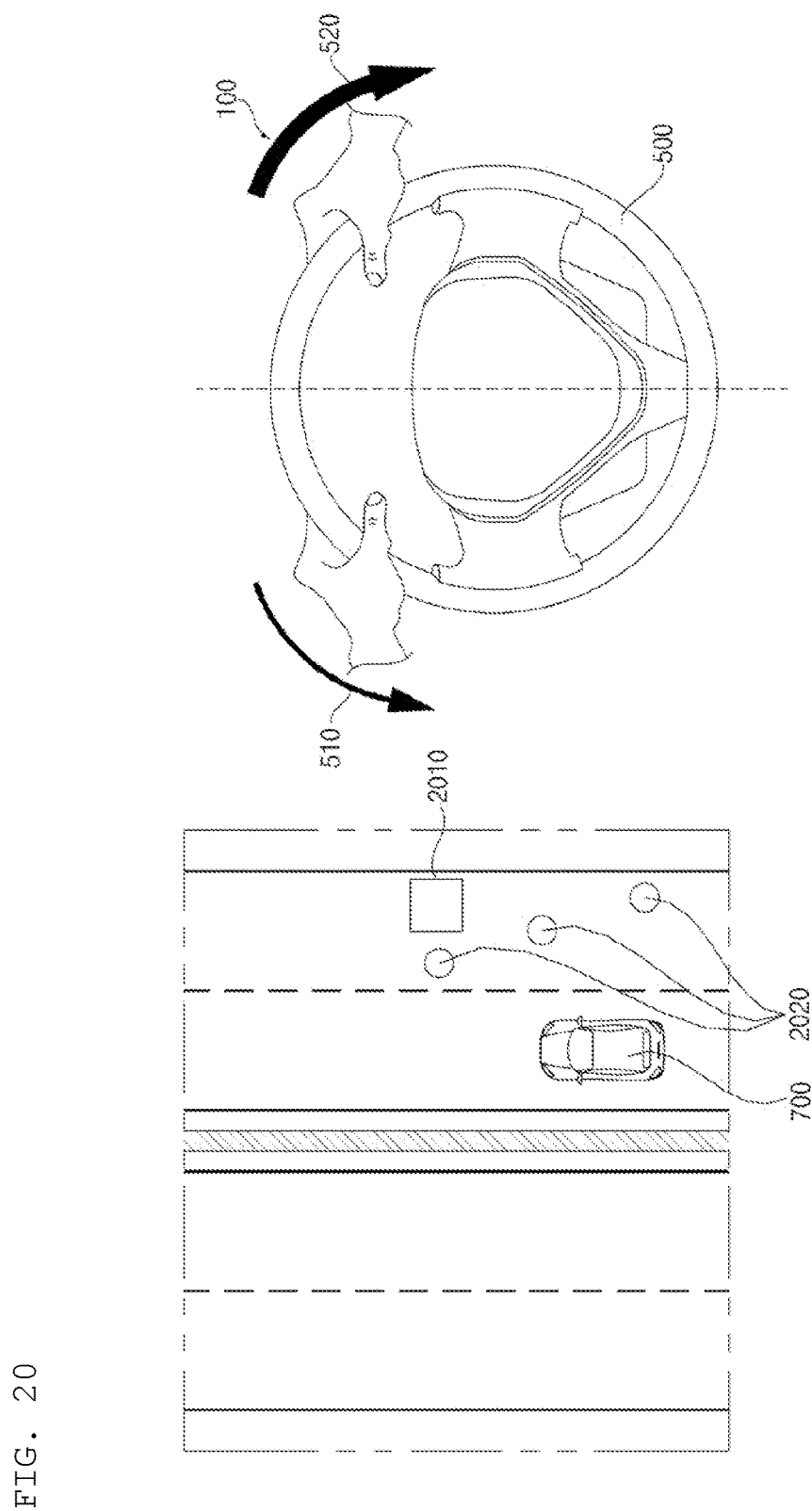
FIG. 20 illustrates an operation of adjusting the manipulation sensitivity to a rotation input of the steering wheel based on lane change guide information according to an embodiment of the present invention.

FIG. 20 illustrates an operation of adjusting the manipulation sensitivity to rotation input of the steering wheel based on lane change guide information according to an embodiment of the present invention.

Referring to FIG. 20, the processor 170 may receive lane change information through the interface unit 130.

For example, the lane change information may be turn signal information generated by user input. The processor 170 may receive the turn signal information through the interface unit 130. The processor 170 may adjust the manipulation sensitivity to steering wheel input based on the turn signal information. For example, when an input of first-direction turn signal information is received, the processor 170 may adjust the manipulation sensitivity to rotation input of the steering wheel such that the manipulation sensitivity to steering wheel rotation input corresponding to a second direction becomes lower than the manipulation sensitivity to a steering wheel rotation input corresponding to the first direction.

For example, the lane change information may be object information acquired through the camera module 201. The processor 170 may receive information indicating detection of a lane change guide object as an object through the interface unit 130. Herein, the lane change guide object may include a traffic cone 2020, a lane change guide line, a lane restriction bar, and a signal bar. The lane change guide object information may be received from the camera module 201.

The image processor 202 of the camera module 201 may detect the traffic cone 2020, lane change guide line, lane restriction bar and signal bar based on feature points of shapes or colors.

The processor 170 may adjust the manipulation sensitivity to rotation input of the steering wheel according to the lane change guide information such that the manipulation sensitivity to rotation input of the steering wheel 510 corresponding to a direction in which the vehicle is guided to change lanes becomes higher than the manipulation sensitivity to rotation input of the steering wheel 520 corresponding to the direction opposite to the direction in which the vehicle is guided to change lanes.

The lane change guide may be provided due to construction or an accident.

By adjusting the manipulation sensitivity to rotation input of the steering wheel according to the lane change information, steering input corresponding to the direction in which the vehicle is guided to change lanes may be induced.

Figure 21:
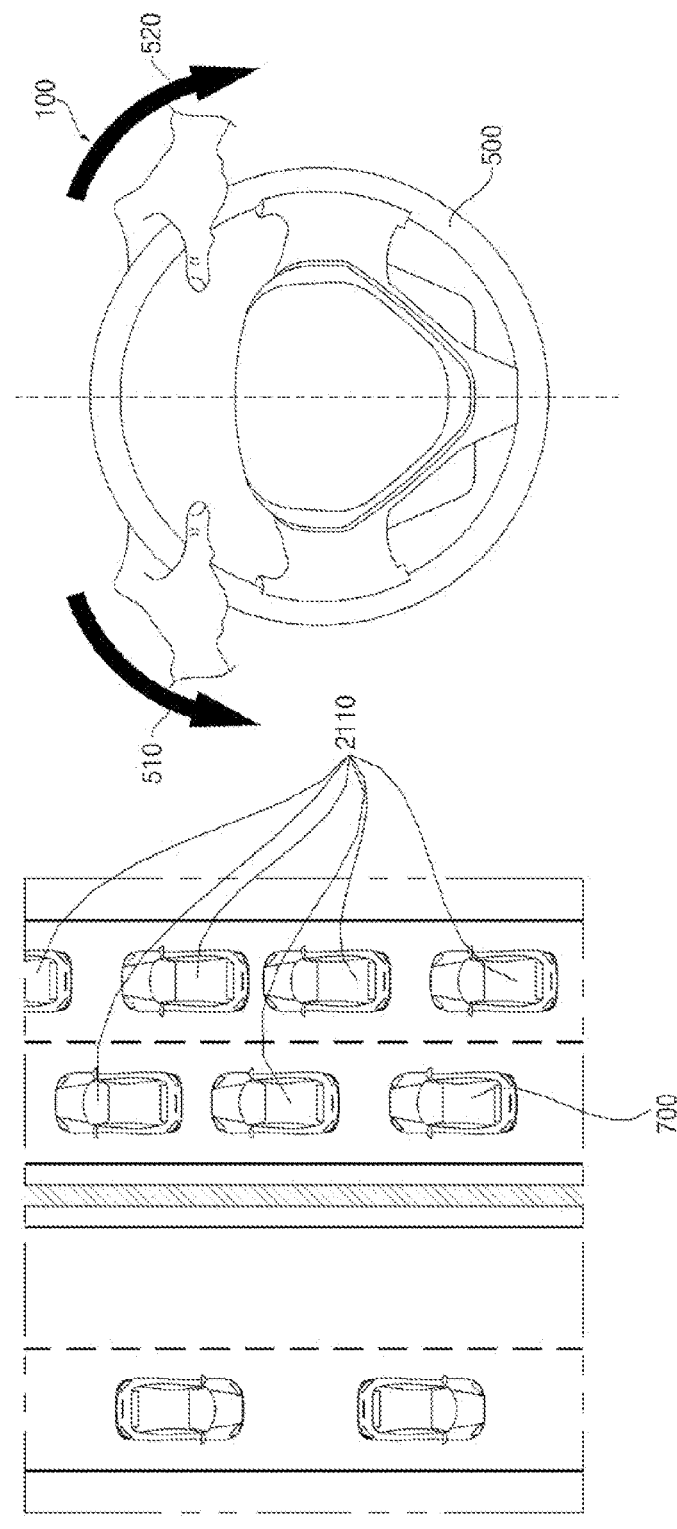
FIG. 21 illustrates an operation of adjusting the manipulation sensitivity to a rotation input of the steering wheel based on traffic density information according to an embodiment of the present invention.

FIG. 21 illustrates an operation of adjusting manipulation sensitivity to rotation input of the steering wheel based on traffic density information according to an embodiment of the present invention.

Referring to FIG. 21, the processor 170 may receive traffic density information through the interface unit 130.

The processor 170 may acquire the traffic density information from the communication unit 710 of the vehicle 700. The communication unit 710 may receive traffic density information on the path of the vehicle 700 from an external server 601. The processor 170 may receive the traffic density information through the communication unit 710.

The processor 170 may acquire the traffic density information from the camera module 201. The image processor 202 of the camera module 201 may detect a plurality of vehicles in a front view image or surroundings-of-vehicle image of the vehicle. Herein, the traffic density may be numerically expressed as the number of detected vehicles. The processor 170 may receive information about the detected vehicles acquired through the camera module 201.

The processor 170 may adjust the manipulation sensitivity to steering wheel rotation input according to the traffic density information.

For example, if the number of detected vehicles is greater than or equal to a first reference number, the processor 170 may adjust the manipulation sensitivity such that the manipulation sensitivity is higher than when the number of detected vehicles is less than the first reference number.

By adjusting the manipulation sensitivity to steering wheel input according to the traffic density as described above, a guide on steering inputs for flexibly coping with an unexpected situation may be provided.

Figure 22:
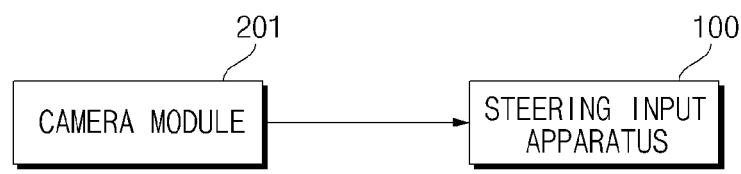
FIG. 22 is a diagram illustrating an operation of receiving object information detected around a vehicle according to an embodiment of the present invention.

FIG. 22 is a diagram illustrating an operation of receiving object information detected around a vehicle according to an embodiment of the present invention.

Referring to FIG. 22, the processor 170 may receive, through the interface unit 130, information about an object located around the vehicle from the camera module 201 configured to acquire images of surroundings of the vehicle. Herein, the camera unit included in the camera module 201 may be one of the camera units 200c to 200f described above with reference to FIGS. 2C to 2F.

For example, the camera unit 200c may be an around view camera unit. The image processor 202 may detect, verify and track an object located around the vehicle based on a surroundings-of-vehicle image acquired by the around view camera unit. Herein, the surroundings-of-vehicle image may be an around view image. Alternatively, the surroundings-of-vehicle image may be an image acquired by at least one of the cameras 221a, 221b, 221c and 221d.

For example, the camera unit 200d, 200e, 200f may be an omnidirectional camera unit. The image processor 202 may detect, verify and track an object located around the vehicle based on a surroundings-of-vehicle image acquired by the omnidirectional camera unit. Herein, the surroundings-of-vehicle image may correspond to one region of an omnidirectional image. Alternatively, the vehicle front view image may be an image acquired by one camera facing forward of the vehicle among a plurality of cameras 231a, 231b, 231c, 231d, 231e, 231f, 241a, 242a, 242b, 242c, 242d, 242e, 242f and 252.

The object may include one of a lane, another vehicle, a pedestrian, a light, a traffic sign, a road surface and a structure.

For example, the object may be another vehicle which is in a lane neighboring the lane of the vehicle 700 and is behind the vehicle 700.

Figure 23:
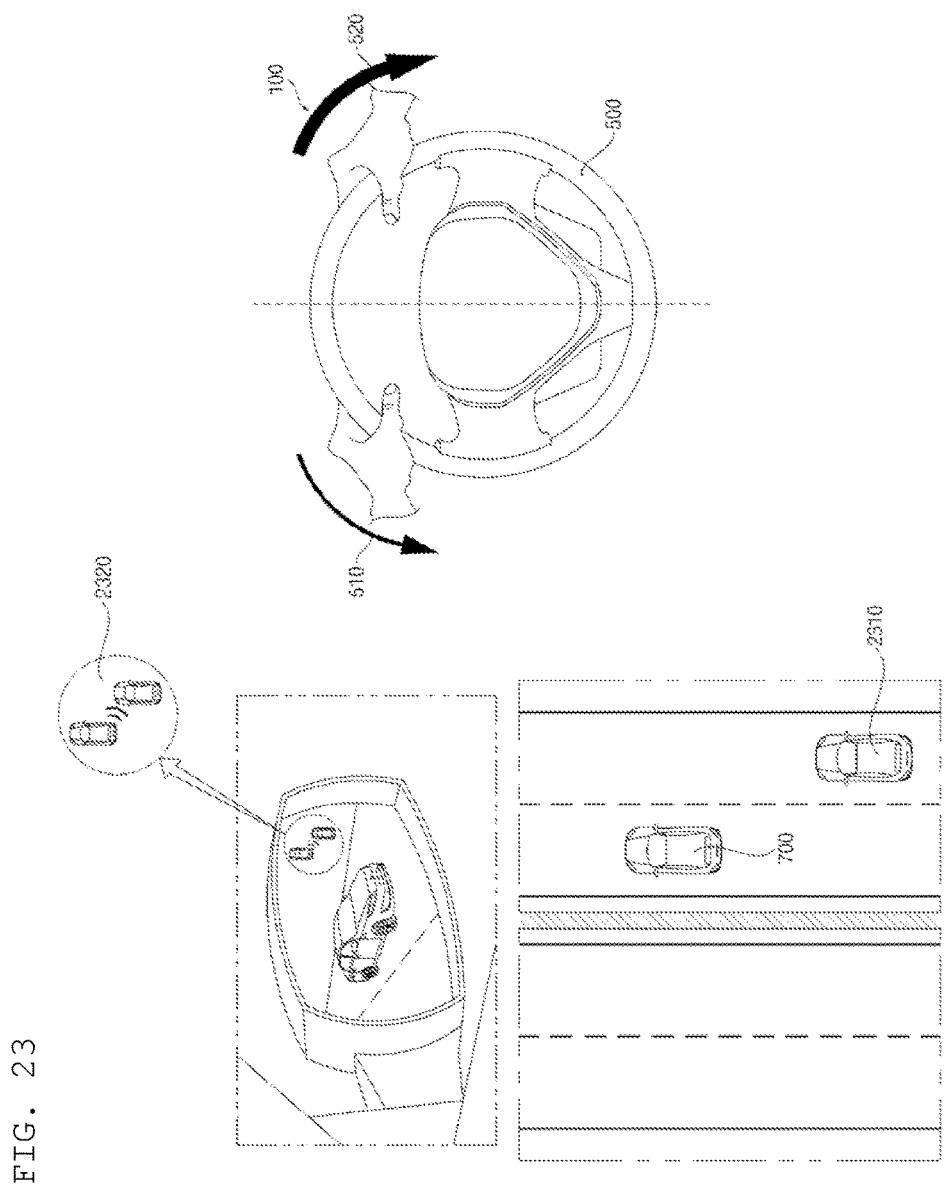
FIG. 23 illustrates an operation of adjusting manipulation sensitivity to a rotation input of the steering wheel based on information about another vehicle which is positioned behind a user's vehicle and on a lane neighboring the driving lane of the user's vehicle, according to an embodiment of the present invention.

FIG. 23 illustrates an operation of adjusting manipulation sensitivity to rotation input of the steering wheel based on information about a vehicle which is positioned behind a user's vehicle and in a lane neighboring the driving lane of the user's vehicle, according to an embodiment of the present invention.

Referring to FIG. 23, the processor 170 may receive, through the interface unit 130, information indicating detection of a vehicle 2310 which is in a lane neighboring the lane of the vehicle 700 and is behind the vehicle 700 as object information.

Upon receiving the information indicating the vehicle 2310, the processor 170 may adjust the manipulation sensitivity to rotation input of the steering wheel based on the information indicating the vehicle 2310.

The processor 170 may adjust the manipulation sensitivity to rotation input of the steering wheel such that the manipulation sensitivity to rotation input of the steering wheel 520 corresponding to a direction in which the vehicle 700 faces the vehicle 2310 is lower than the manipulation sensitivity to rotation input of the steering wheel 510 corresponding to the direction opposite to the direction in which the vehicle 700 faces the vehicle 2310.

In this case, as the vehicle 2310 approaches the vehicle 700, the processor 170 may gradually lower the manipulation sensitivity to rotation input of the steering wheel 520 corresponding to the direction in which the vehicle 700 faces the vehicle 2310 according to the distance between the vehicle 700 and the vehicle 2310 in the length direction of the vehicle.

By adjusting the manipulation sensitivity to rotation input of the steering wheel when another vehicle traveling in a lane neighboring the driving lane of the user's vehicle approaches from behind the user's vehicle as described above, a guide on the steering input may be provided to avoid collision between the vehicles.

Figure 24:
Figure 25:
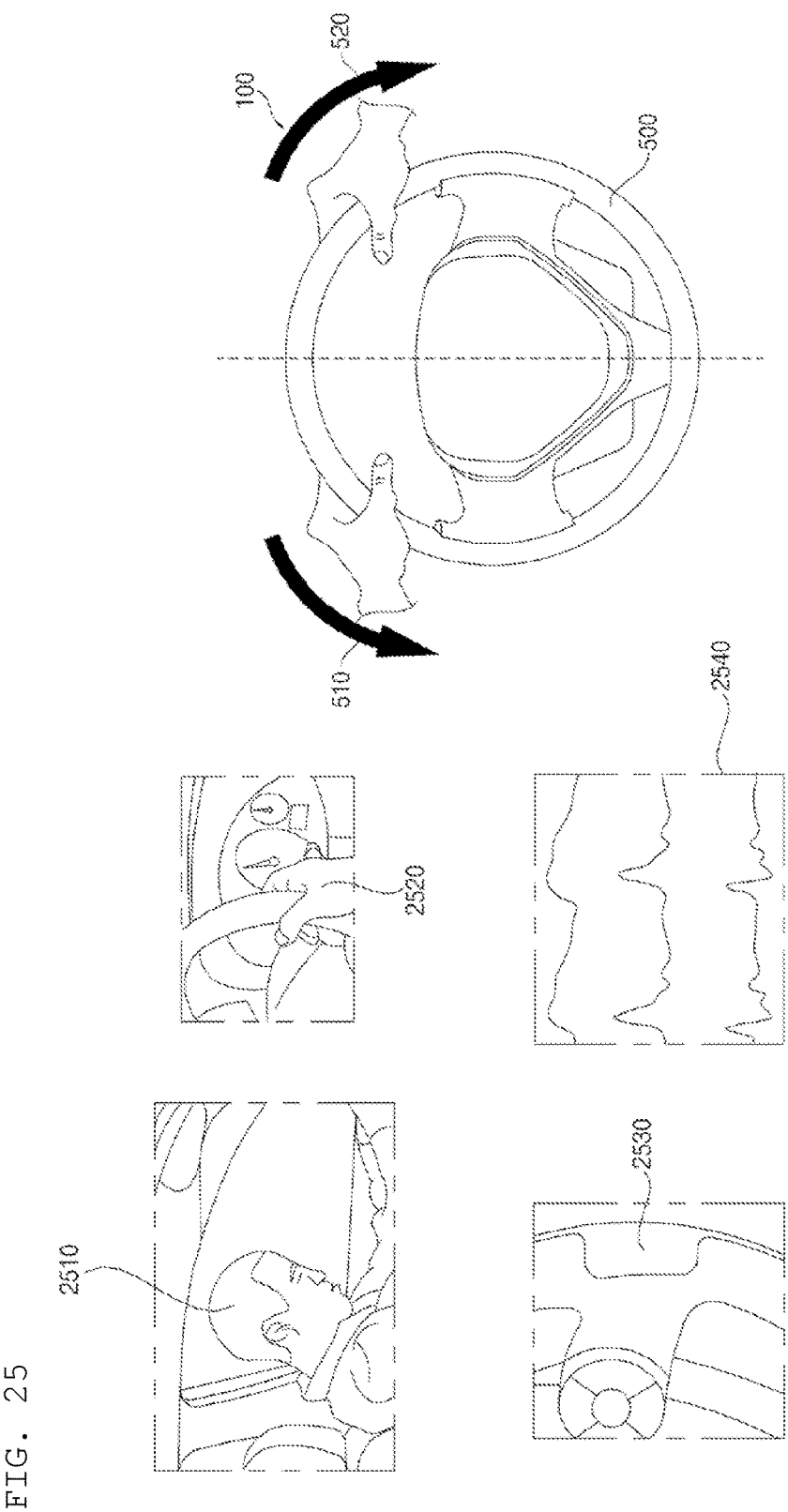

FIGS. 24 to 26 illustrate an operation of adjusting manipulation sensitivity to rotation input of the steering wheel based on driver status information according to an embodiment of the present invention.

Referring to FIG. 24, the processor 170 may receive driver status information from the DSM system 260 through the interface unit 130. The driver status information may include drowsy state information about the driver, physical condition information about the driver, excited state information about the driver or device manipulation state information about the driver.

Referring to FIGS. 25 and 26, the processor 170 may adjust the manipulation sensitivity to input of the steering wheel based on the driver status information.

If the drowsy state information about the driver is received as the driver status information, the processor 170 may adjust the manipulation sensitivity to rotation input of the steering wheel 510, 520 such that the manipulation sensitivity becomes lower than when the drowsy state information about the driver is not received. Thereby, unintended steering input may be prevented from being provided.

If physical condition information indicating that the biorhythm of the driver is unstable is received as the driver status information, the processor 170 may adjust the manipulation sensitivity to rotation input of the steering wheel 510, 520 such that the manipulation sensitivity becomes higher than when the physical condition information about the driver is not received. Thereby, the driver may easily manipulate the steering wheel when the driver is not in good physical condition.

When excited state information about the driver is received as the driver status information, the processor 170 may adjust the manipulation sensitivity to rotation input of the steering wheel 510, 520 such that the manipulation sensitivity becomes lower than when the steady-state information about the driver is not received. Thereby, the driver may be prevented from making a mistake in driving the vehicle when the driver is excited.

The physical condition information and excited state information about the driver may be acquired through an analysis 2540 of biometric signals of the driver acquired through a PPG sensor in the DSM system 260. The PPG sensor 2530 may be disposed in one region of the steering wheel. The PPG sensor 2530 may acquire a biometric signal of the driver by contacting one part 2520 (e.g., a hand) of the body of the driver.

If driver information indicating a device manipulating state 2610 is received as the driver status information, the processor 170 may adjust the manipulation sensitivity to rotation input of the steering wheel 510, 520 such that the manipulation sensitivity becomes lower than when the information indicating the device manipulating state 2610 is not received. Thereby, as the manipulation sensitivity to rotation input of the steering wheel is kept low when the driver manipulates a device, driving safety may be enhanced.

Figure 27:
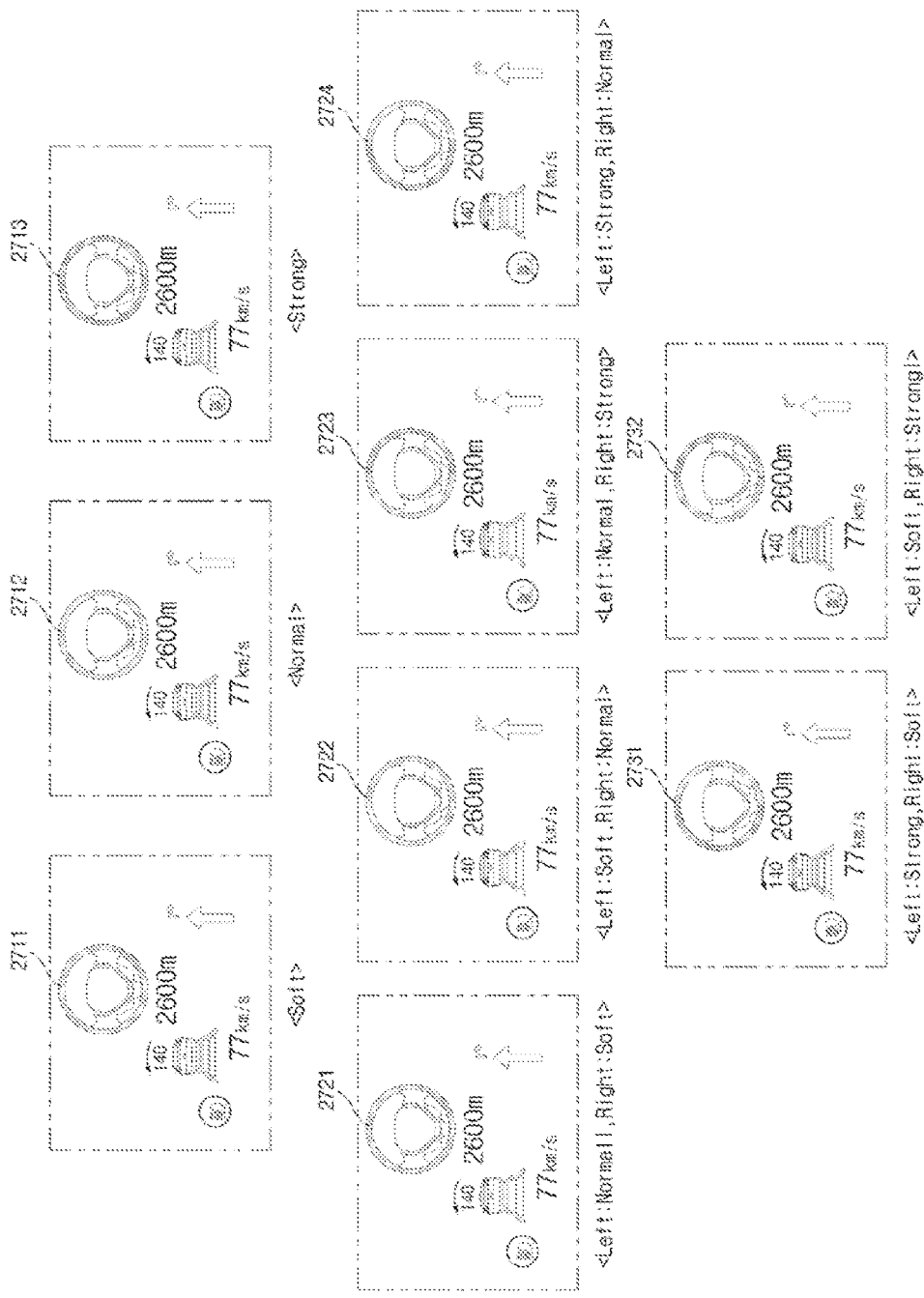
FIG. 27 illustrates an operation of outputting manipulation sensitivity information through an output unit according to an embodiment of the present invention.

FIG. 27 illustrates an operation of outputting manipulation sensitivity information through an output unit according to an embodiment of the present invention.

Referring to FIG. 27, the processor 170 may display manipulation sensitivity information about a steering wheel rotation input through a display included in the output unit 155. Herein, the manipulation sensitivity information may include manipulation sensitivity status or manipulation sensitivity change information. The display may be disposed in one region of the center fascia, dashboard, cluster, steering wheel or windshield. The display may be configured as a head up display (HUD) or a transparent display. The display may be integrated with the display apparatus 400.

When the manipulation sensitivity to steering wheel rotation inputs is divided into a plurality of levels, the processor 170 may display, through the display, information 2711, 2712, 2713 indicating a level for the manipulation sensitivity status of a steering wheel rotation input among the levels.

For example, the processor 170 may display an image corresponding to the manipulation sensitivity status. The processor 170 may match the levels of manipulation sensitivity with colors. The processor 170 may display an image corresponding to the steering wheel, using a color corresponding to the manipulation sensitivity status.

When the manipulation sensitivity of the steering wheel is adjusted such that the manipulation sensitivity to a first-direction rotation input is different from that to a second-direction rotation input, the processor 170 may display manipulation sensitivity status information 2721, 2722, 2723, 2731, 2732, 2733, 2734 about the first-direction rotation input and second-direction rotation input of the steering wheel through the display.

For example, the processor 170 may display a first region of the steering wheel image in a first color corresponding to the manipulation sensitivity to the first-direction rotation input and display a second region of the steering wheel image in a second color corresponding to the manipulation sensitivity to the second-direction rotation input.

When the manipulation sensitivity of the steering wheel changes, the processor 170 may display manipulation sensitivity change information through the display.

For example, the processor 170 may change the color of the steering wheel image corresponding to a manipulation sensitivity to indicate the manipulation sensitivity change information.

The display operation described above may allow the user to easily recognize the status or change of the manipulation sensitivity of the steering wheel and guide the user to properly respond to the status or change of the manipulation sensitivity of the steering wheel.

Figure 28:
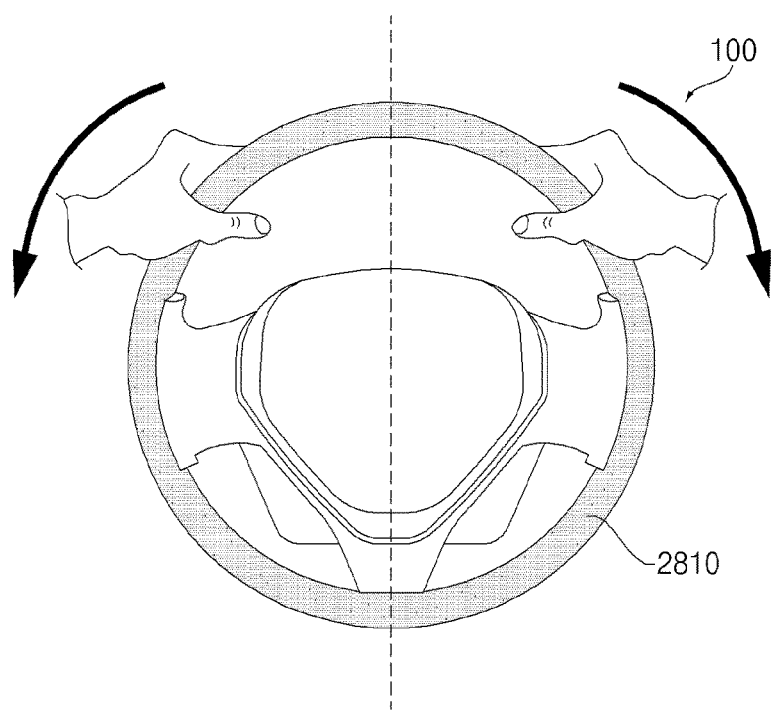
FIGS. 28 to 29B illustrate an operation of outputting a manipulation sensitivity through a manipulation sensitivity output unit according to an embodiment of the present invention.
Figure 29A:
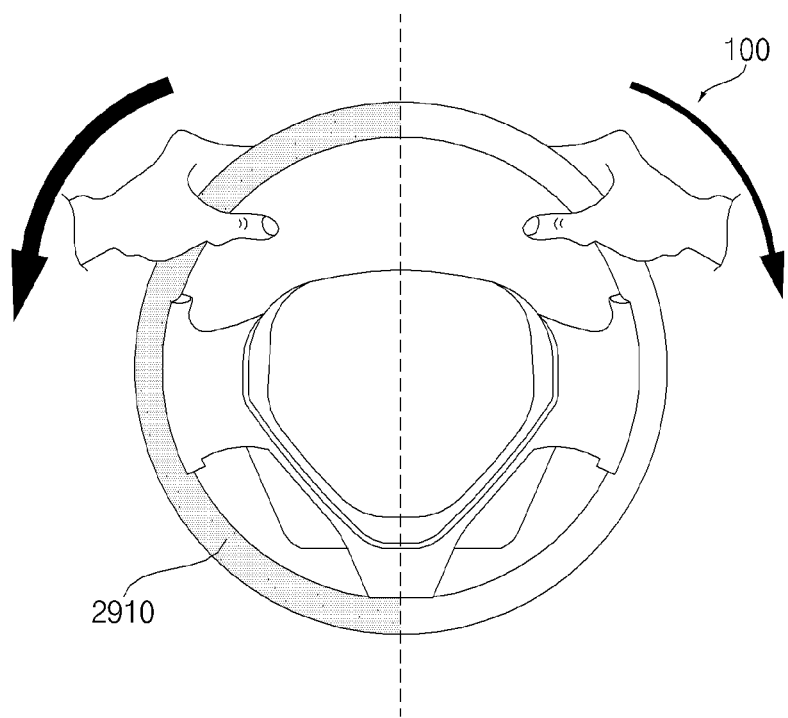
Figure 29B:
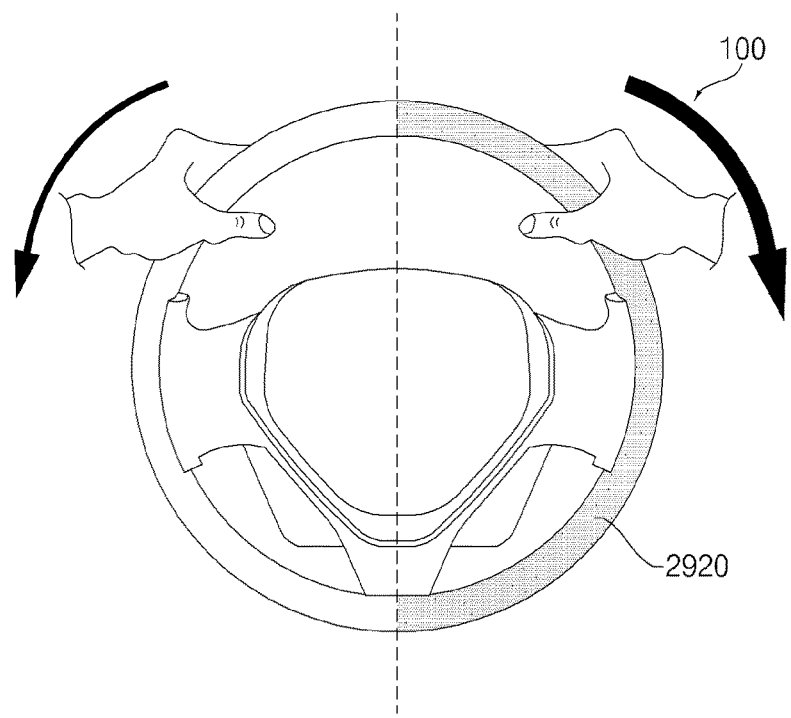

FIGS. 28 to 29B illustrate an operation of outputting a manipulation sensitivity through a manipulation sensitivity output unit according to an embodiment of the present invention.

Referring to FIG. 28, the processor 170 may control the manipulation sensitivity output unit 150. The manipulation sensitivity output unit 150 may be disposed in one region of the steering wheel rim.

The processor 170 may display manipulation sensitivity information about steering wheel rotation inputs through the manipulation sensitivity output unit 150. Herein, the manipulation sensitivity information may include manipulation sensitivity status information or manipulation sensitivity change information.

When the manipulation sensitivity to steering wheel rotation inputs is divided into a plurality of levels, the processor 170 may display, through the manipulation sensitivity output unit 150, information 2810 indicating a level for the manipulation sensitivity status of a steering wheel rotation input among the levels.

The manipulation sensitivity output unit 150 may include at least one light emitter. The processor 170 may match may match the levels of manipulation sensitivity with colors. The processor 170 may control the light emitter to emit light of a color corresponding to the manipulation sensitivity.

Referring to FIGS. 29A and 29B, when the manipulation sensitivity of the steering wheel is adjusted such that the manipulation sensitivity to a first-direction rotation input is different from the manipulation sensitivity to a second-direction rotation input, the processor 170 may display the statuses of manipulation sensitivity of the steering wheel to the first-direction rotation input and the second-direction rotation input through the display.

The manipulation sensitivity output unit 150 may include a first manipulation sensitivity output unit and a second manipulation sensitivity output unit. The first manipulation sensitivity output unit may be disposed on the left side of the steering wheel rim. The second manipulation sensitivity output unit may be disposed on the right side of the steering wheel rim.

As illustrated in FIG. 29A, when information indicating a predetermined event is received, and thus the manipulation sensitivity to the first-direction rotation input of the steering wheel is lowered or increased from the level before the event, the processor 170 may output manipulation sensitivity information 2910 through the first manipulation sensitivity output unit. Herein, the manipulation sensitivity information may include manipulation sensitivity status information or manipulation sensitivity change information.

For example, the processor 170 may control a light emitter included in the first manipulation sensitivity output unit to emit light.

As illustrated in FIG. 29B, when information indicating a predetermined event is received, and thus the manipulation sensitivity to the second-direction rotation input of the steering wheel is lowered or increased from the level before the event, the processor 170 may output manipulation sensitivity information 2920 through the second manipulation sensitivity output unit. Herein, the manipulation sensitivity information may include manipulation sensitivity status information or manipulation sensitivity change information.

For example, the processor 170 may control a light emitter included in the second manipulation sensitivity output unit to emit light.

As is apparent from the above description, the present invention has one or more of the following effects.

First, manipulation sensitivity of a steering wheel to a rotation input may be adjusted based on objects such that the user is alerted.

Second, providing a proper steering input may be enabled. Thereby, traffic accidents may be prevented.

Third, manipulation sensitivity of a steering wheel to a rotation input may be properly adjusted according to characteristics of each object. Thereby, the driver may be guided to provide steering inputs corresponding to various situations encountered during driving.

Effects of the present invention are not limited to the aforementioned effects, and other effects of the present invention which are not mentioned above will become apparent to those having ordinary skill in the art from the claims.

The present invention described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the invention may be implemented in the form of a carrier wave (e.g., transmission over the Internet). In addition, the computer may include the processor 170 or the controller 770. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steering input apparatus comprising:
   a power provision unit configured to provide power to a rotation input through a steering wheel;
   an interface configured to receive information; and
   a processor configured to adjust a manipulation sensitivity to the rotation input of the steering wheel by controlling the power provision unit based on the information,
   wherein the processor is further configured to:
   divide the manipulation sensitivity to the rotation input of the steering wheel into a plurality of levels according to object information for a detected object received by the interface, to adjust the manipulation sensitivity, and
   adjust the manipulation sensitivity to the rotation input of the steering wheel by dividing the manipulation sensitivity into a plurality of different levels according to the type of the detected object, and
   wherein the processor is further configured to:
   adjust the manipulation sensitivity to the rotation input of the steering wheel to one of the plurality of different levels according to an expected weight or expected size of the detected object, and
   adjust, as the expected weight or the expected size of the detected object increases, the manipulation sensitivity to the rotation input of the steering wheel to a level indicating a lower manipulation sensitivity,
   wherein the interface is further configured to receive, from a camera module for acquiring a front view image of a vehicle, object information indicating an object detected in the front view image,
   wherein the processor is further configured to adjust the manipulation sensitivity to the rotation input of the steering wheel based on the object information,
   wherein the interface is further configured to receive travel speed information about the vehicle,
   wherein the object information is information indicating a driving lane in front of the vehicle,
   wherein the processor is further configured to adjust the manipulation sensitivity to the rotation input of the steering wheel based on the driving lane information and the travel speed information,
   wherein the processor is further configured to adjust the manipulation sensitivity to the rotation input of the steering wheel according to a curvature of the driving lane when the driving lane is a curved lane,
   wherein the interface is further configured to receive position information about the vehicle,
   wherein the processor is further configured to adjust the manipulation sensitivity to the rotation input of the steering wheel when understeer occurs during travel of the vehicle in the curved lane such that a manipulation sensitivity to a rotation input of the steering wheel corresponding to a direction of occurrence of the understeer is lower than a manipulation sensitivity to a rotation input of the steering wheel corresponding to a direction opposite to the direction of occurrence of the oversteer,
   wherein the object information comprises location information about a large vehicle, a median strip, a median barrier, a guardrail, a street tree or a streetlight, wherein the processor is further configured to adjust the manipulation sensitivity to the rotation input of the steering wheel such that a manipulation sensitivity to a rotation input of the steering wheel corresponding to a direction in which the vehicle faces the object is lower than a manipulation sensitivity to a rotation input of the steering wheel corresponding to a direction opposite to the direction in which the vehicle faces the object, and wherein the processor is further configured to gradually lower manipulation sensitivity to a rotation input of the steering wheel corresponding to a direction in which the vehicle faces the object when the vehicle approaches the object.

2. The steering input apparatus according to claim 1, wherein the processor is configured to adjust the manipulation sensitivity to the rotation input of the steering wheel such that a manipulation sensitivity to a first-direction rotation input of the steering wheel is different from a manipulation sensitivity to a second-direction rotation input of the steering wheel.

3. The steering input apparatus according to claim 2, wherein the processor is configured to adjust the manipulation sensitivity to the rotation input of the steering wheel such that the manipulation sensitivity to the second-direction rotation input of the steering wheel is lower than the manipulation sensitivity to the first-direction rotation input of the steering wheel.

4. The steering input apparatus according to claim 3, wherein the processor is configured to adjust the manipulation sensitivity to the rotation input of the steering wheel such that when the second-direction rotation input is received with the steering wheel rotated by a first rotational displacement in a first direction, the manipulation sensitivity to the second-direction rotation input is lower than the manipulation sensitivity to the first-direction rotation input with respect to the first rotational displacement.

5. The steering input apparatus according to claim 1, wherein the processor is configured to gradually lower the manipulation sensitivity to the rotation input of the steering wheel when a rotational displacement of the steering wheel increases according to the rotation input of the steering wheel.

6. The steering input apparatus according to claim 1, wherein the processor is configured to control the power provision unit to rotate the steering wheel by a predetermined displacement in a second direction when a first-direction rotational displacement is greater than or equal to a reference value.

7. The steering input apparatus according to claim 1, wherein the power provision unit comprises a hydraulic power provision apparatus, an electrohydraulic power provision apparatus or a motor-driven power provision apparatus.

8. The steering input apparatus according to claim 1, wherein the processor is configured to adjust the manipulation sensitivity to the rotation input of the steering wheel according to the travel speed information when the driving lane is a straight lane, and the travel speed information is higher than or equal to a reference speed.

9. The steering input apparatus according to claim 1,
wherein the processor is configured to adjust the manipulation sensitivity to the rotation input of the steering wheel when oversteer occurs during travel of the vehicle in the curved lane such that a manipulation sensitivity to a rotation input of the steering wheel corresponding to a direction of occurrence of the oversteer is lower than a manipulation sensitivity to a rotation input of the steering wheel corresponding to a direction opposite to the direction of occurrence of the oversteer.

10. The steering input apparatus according to claim 1, wherein the interface is configured to receive information indicating a strong wind section of a road, and wherein the processor is configured to adjust the manipulation sensitivity to the rotation input of the steering wheel when the vehicle travels in the strong wind section such that the manipulation sensitivity to the rotation input of the steering wheel is lower than when the vehicle travels on a section of the road other than the strong wind section.

11. The steering input apparatus according to claim 10, wherein the interface is configured to receive information indicating a wind direction, and wherein the processor is configured to adjust the manipulation sensitivity to the rotation input of the steering wheel such that a manipulation sensitivity to a rotation input of the steering wheel corresponding to a direction in which the vehicle faces wind is lower than a manipulation sensitivity to a rotation input of the steering wheel corresponding to a direction opposite to the direction in which the vehicle faces the wind.

12. The steering input apparatus according to claim 1, wherein the object information comprises information indicating light infiltrating the vehicle, a pothole located in a driving lane, a slippery section, or a construction section, and wherein the processor is configured to adjust the manipulation sensitivity to the rotation input of the steering wheel when the object information is received such that the manipulation sensitivity is lower than when the object information is not received.

13. The steering input apparatus according to claim 12, wherein the processor is configured to gradually lower the manipulation sensitivity to the rotation input of the steering wheel when the vehicle approaches the object.

14. The steering input apparatus according to claim 1, wherein the processor is configured to adjust the manipulation sensitivity to the rotation input of the steering wheel according to a number of detected vehicles.

15. The steering input apparatus according to claim 1, wherein the interface is configured to receive lane change information, and wherein the processor is configured to adjust the manipulation sensitivity to the rotation input of the steering wheel according to the lane change information such that a manipulation sensitivity to a rotation input of the steering wheel corresponding to a direction of a guide on a lane change is higher than a manipulation sensitivity to a rotation input corresponding to a direction opposite to the direction of the guide on the lane change.

16. The steering input apparatus according to claim 1, wherein the interface is configured to receive, from a camera module for acquiring a surroundings image of a vehicle, object information indicating an object detected in the surroundings image, and wherein the processor is configured to adjust the manipulation sensitivity to the rotation input of the steering wheel based on the object information.

17. The steering input apparatus according to claim 16, wherein the object information is information indicating another vehicle located in a lane neighboring a driving lane of the vehicle and behind the vehicle, and wherein the processor is configured to adjust the manipulation sensitivity to the rotation input of the steering wheel such that a manipulation sensitivity to a rotation input of the steering wheel corresponding to a direction in which the vehicle faces the other vehicle is lower than a manipulation sensitivity to a rotation input of the steering wheel corresponding to a direction opposite to the direction in which the vehicle faces the other vehicle.

18. The steering input apparatus according to claim 1, wherein the interface is configured to receive driver status information, and
   wherein the processor is configured to adjust the manipulation sensitivity to a rotation input of the steering wheel based on the driver status information.

19. The steering input apparatus according to claim 1, further comprising a manipulation sensitivity output unit,
   wherein the processor is configured to output information about the manipulation sensitivity to a rotation input of the steering wheel through the manipulation sensitivity output unit.

20. The steering input apparatus according to claim 1, further comprising a grip position sensor configured to sense a grip position on a rim of the steering wheel,
   wherein the processor is configured to adjust the manipulation sensitivity to a rotation input of the steering wheel according to the grip position.

21. The steering input apparatus according to claim 1, further comprising a grip pressure sensor configured to sense a grip pressure on a rim of the steering wheel,
   wherein the processor is configured to adjust the manipulation sensitivity to a rotation input of the steering wheel according to the grip pressure.

22. A vehicle comprising the steering input apparatus according to claim 1.

* * * * *